United States Patent [19]
Gugler

[11] Patent Number: 5,815,595
[45] Date of Patent: Sep. 29, 1998

[54] METHOD AND APPARATUS FOR IDENTIFYING TEXT FIELDS AND CHECKBOXES IN DIGITIZED IMAGES

[75] Inventor: Sean Gugler, Santa Clara, Calif.

[73] Assignee: Seiko Epson Corporation, Tokyo, Japan

[21] Appl. No.: 580,845

[22] Filed: Dec. 29, 1995

[51] Int. Cl.$^6$ .................................................. G06K 9/34
[52] U.S. Cl. ..................... 382/173; 382/176; 382/282; 382/286; 382/291
[58] Field of Search ..................................... 382/173, 175, 382/176, 177, 282, 311, 317, 199, 286, 291; 707/508, 520, 521

[56] References Cited

U.S. PATENT DOCUMENTS

| | | |
|---|---|---|
| 4,553,206 | 11/1985 | Smutek et al. . |
| 5,001,769 | 3/1991 | Reid-Green et al. . |
| 5,025,484 | 6/1991 | Yamanari et al. . |
| 5,050,222 | 9/1991 | Lee . |
| 5,073,953 | 12/1991 | Westdijk . |
| 5,140,139 | 8/1992 | Shepard . |
| 5,140,650 | 8/1992 | Casey et al. . |
| 5,182,656 | 1/1993 | Chevion et al. . |
| 5,191,525 | 3/1993 | LeBrun et al. . |
| 5,253,305 | 10/1993 | Lin . |
| 5,363,214 | 11/1994 | Johnson . |
| 5,416,849 | 5/1995 | Huang . |
| 5,418,865 | 5/1995 | Bloomberg . |
| 5,430,808 | 7/1995 | Baird et al. . |
| 5,555,325 | 9/1996 | Burger ................................. 382/311 |

*Primary Examiner*—Phuoc Tran
*Attorney, Agent, or Firm*—Eric B. Janofsky

[57] ABSTRACT

An interactive graphics system for precisely locating a boundary of a user-selected text field on a digitized form, enabling the user to accurately enter information into the text field. Upon receiving a user-selected coordinate of a point within the selected text field, the graphics system automatically determines the boundary of the text field by searching the neighboring area for particular obstructions based upon a user-provided type indication. Generally, the graphics system includes a means for receiving information pertaining to a selected text field, including the user-selected coordinate and text field type. A text field identifier associated with the indicated text field type determines the boundary of the selected text field. The text field identifier implements one or more boundary locators, each specifically configured to search for particular obstruction and to determine a text field boundary associated with that obstruction.

36 Claims, 35 Drawing Sheets

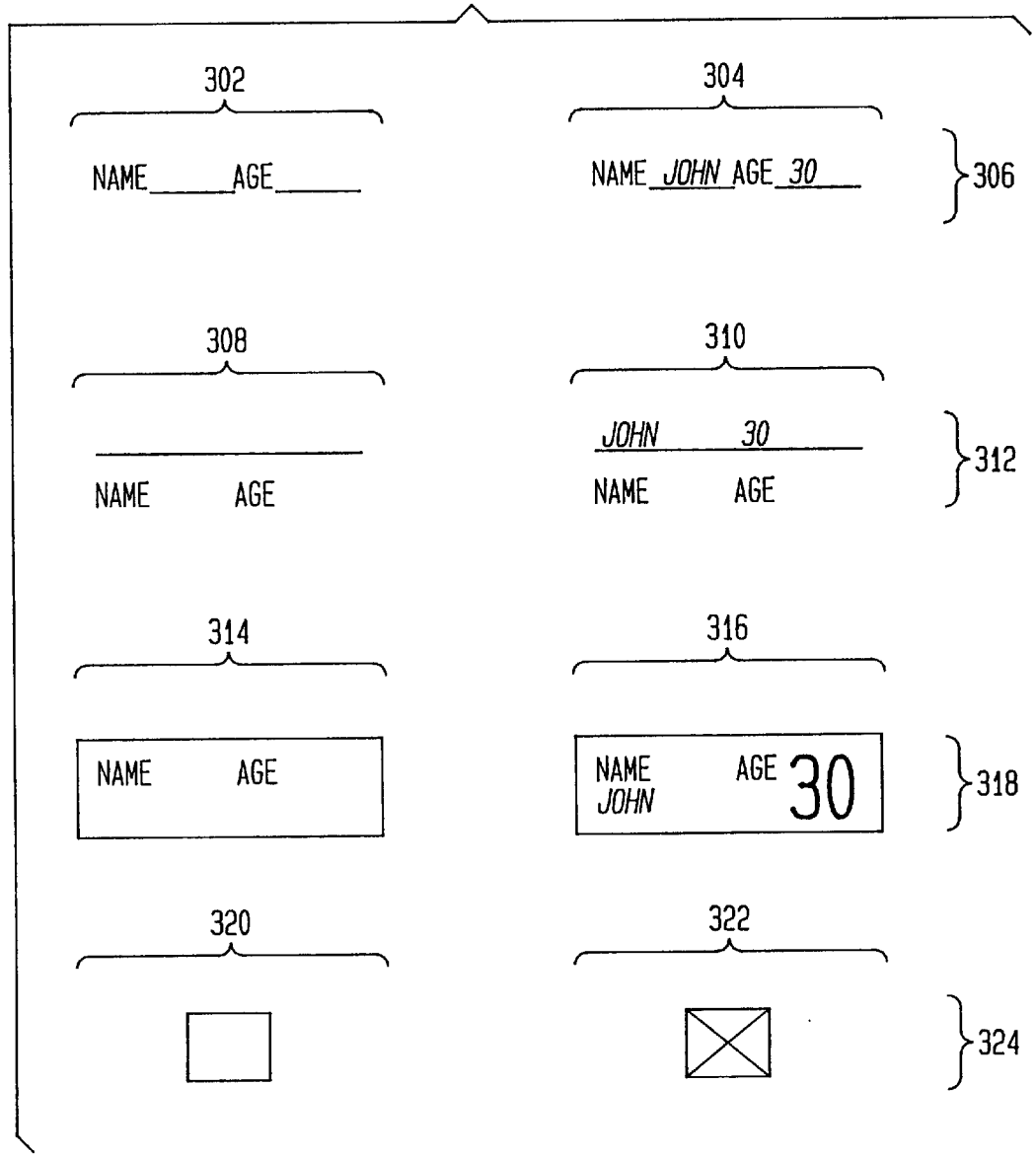

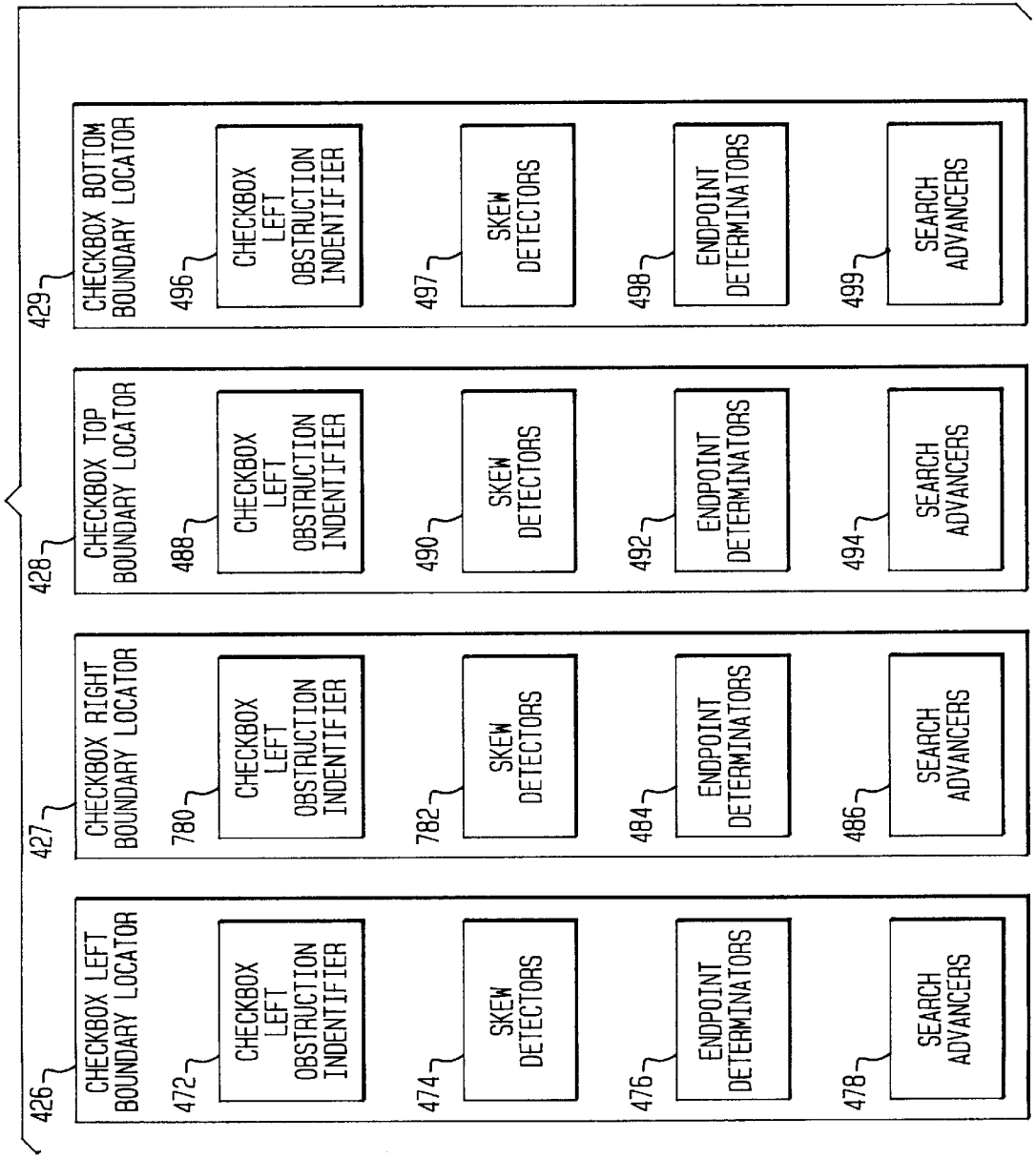

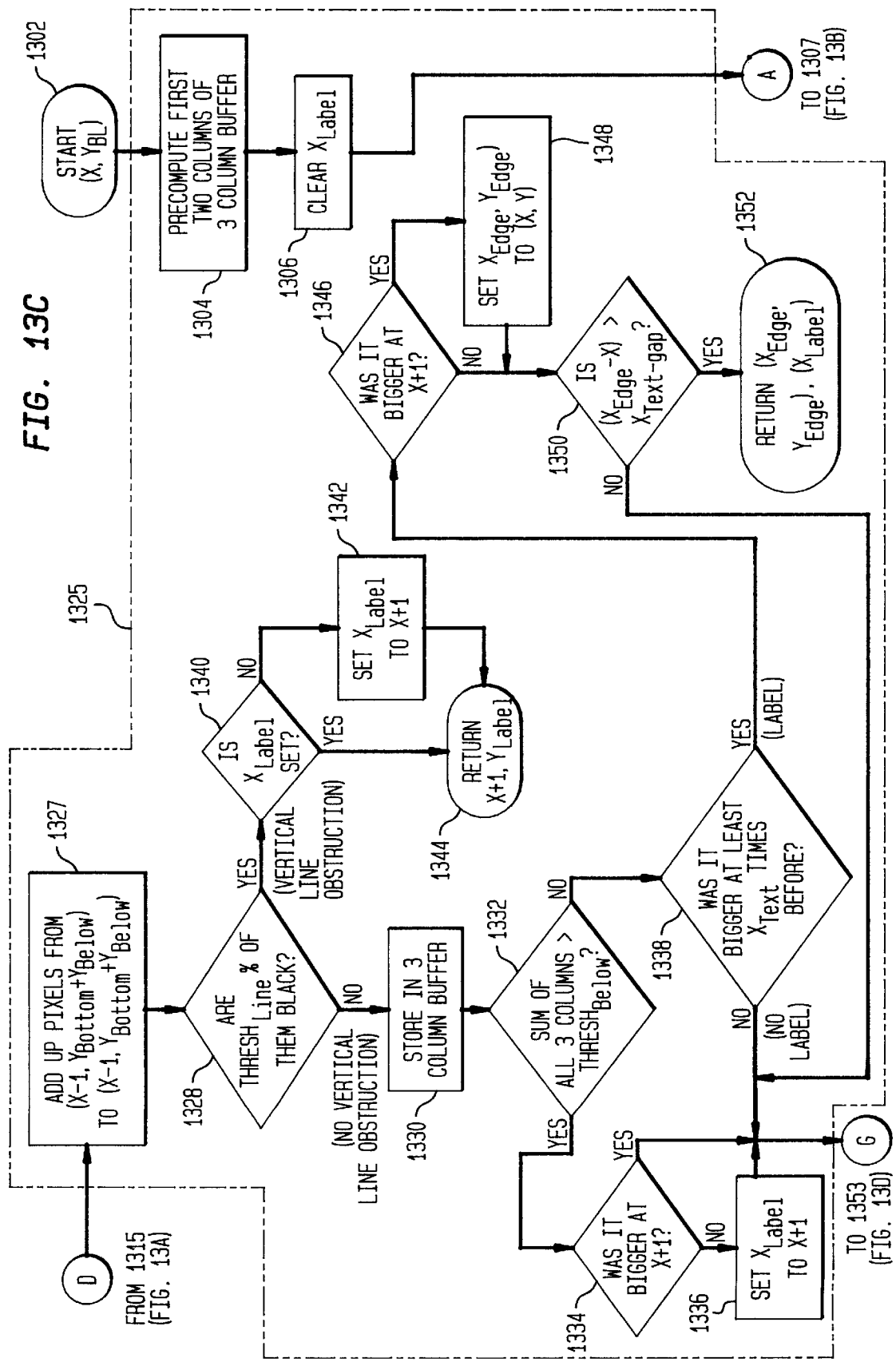

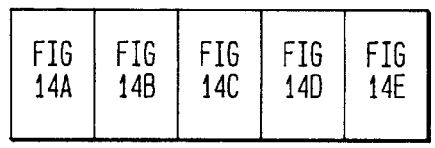
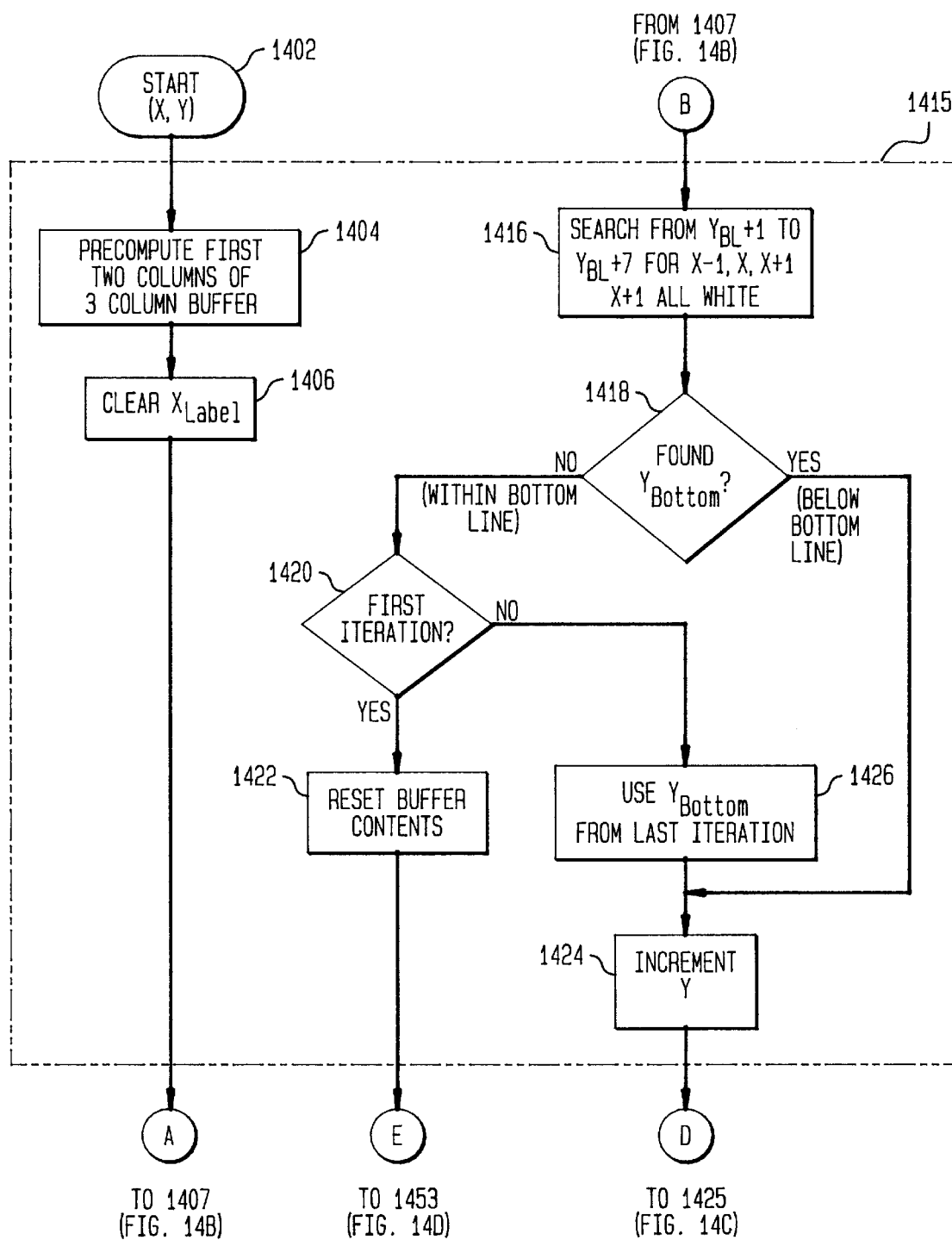
FIG. 14
FIG. 14A

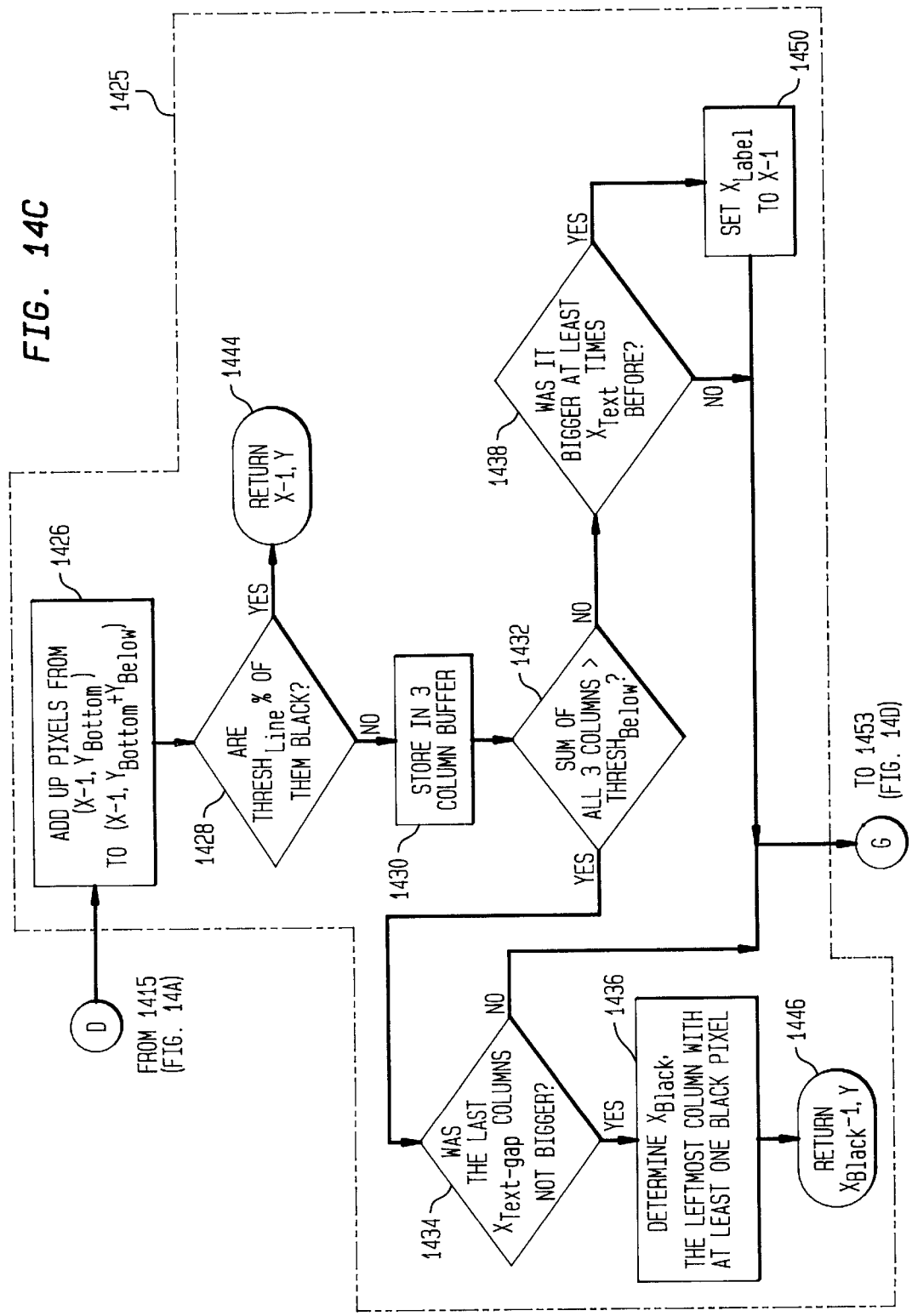

METHOD AND APPARATUS FOR IDENTIFYING TEXT FIELDS AND CHECKBOXES IN DIGITIZED IMAGES

BACKGROUND OF THE INVENTION

1. Field of the Invention

This invention relates generally to the interpretation of scanned images, and more particularly, to techniques for determining text fields and checkboxes in digitized images.

2. Description of the Related Art

Preprinted forms provide an effective way to gather and communicate information. Generally, preprinted forms that require a user to enter information into the form are configured so as to provide a series of text and checkbox fields, referred to generally as fields, into which the user enters information. To assist the user, the fields generally include a substantially horizontal text entry line (TEL) to provide a reference along which the user can enter the information. In addition, each field generally has associated with it a label indicating the type of information that is to be entered into the text field.

Generally, the user enters the information onto the form by hand, e.g., with pen, pencil, or typewriter. Alternatively, the form may be input into a computer system in the form of a bit-mapped image, enabling the user to manually locate fields and enter information into these fields via the computer making pixel-by-pixel adjustments by hand to properly overlay the entered text with the form field. Such systems typically provide mixed-mode editing capabilities, combining text data with bit-mapped image data.

Typically, another conventional approach is to process the entire form, attempting to make an algorithmic determination of where the fields are located and, once located, creating a rectangular boundary in which the user-entered information is to be located. The text field boundary is determined based upon the location of neighboring obstructions, such as the text entry line, text field label, as well as neighboring labels and text adjacent to the field.

Generally, the form is optically scanned to create an electronic image, or transmitted via facsimile, in which an electronic image of the form is received by the computer system. The electronic image is written in a bitmapped image as a rectangular array of 0's and 1's representing white and black subareas or pixels. The image is often subject to scanner noise which can manifest itself as vertical black streaks or pepper noise (isolated black pixels in white regions, or vice versa). Additionally, misregistration of the form and imperfections of the mechanical feed may cause skewing of the image. An additional problem particular to the transmission of the image via facsimile is the appearance of thin horizontal lines of black pixels in white regions, or vice versa, due to noise in the telephone line.

Due to these and other problems regarding the quality of bit-mapped images, conventional systems tend to be inaccurate and considerably time consuming. For example, after many minutes of processing, conventional systems that process the entire form often do not locate all the fields in the form, and/or misidentify white space on the form as a field.

Furthermore, even when conventional systems correctly recognize a field, oftentimes the resulting boundary is not precisely created. This results in the misalignment of user-entered information in both horizontal and vertical directions on the form, commonly resulting in the overwriting of the associated label, adjoining text, or the text entry line.

What is needed, therefore, is a means for efficiently and precisely identifying text and checkbox fields in an imperfect digitized image of a form.

SUMMARY OF THE INVENTION

The present invention is an interactive graphics system for precisely locating a boundary of a user-selected field on a digitized form, enabling the user to accurately enter information into the field. Upon receiving a user-selected coordinate of a point within the selected field, the graphics system automatically determines the boundary of the field by searching the neighboring area for particular obstructions based upon a user-provided type indication.

Generally, the graphics system includes a means for receiving information pertaining to a selected field, including the user-selected coordinate and field type. A field identifier associated with the indicated field type determines the boundary of the selected field. The field identifier implements one or more boundary locators, each specifically configured to search for particular obstruction and to determine a field boundary associated with that obstruction.

Specifically, the graphics system includes a field identifier for performing high level functions such as receiving the user-provided information and implementing a specific mode of operation specific to the selected field type. More specifically, the field identifier consists of a plurality of specialized field identifiers, each configured to determine the boundary of a specific type of field. These include, for example, a text field having an associated label above the text entry line, a text field having an associated label below the text entry line, a text field wherein the text entry line is part of a text box with an associated label located within that box, and a checkbox field wherein the field is a checkbox with no associated label.

The boundary locators utilize a unique search array when searching for an obstruction, enabling it to simultaneously consider many pixel values to distinguish dirt, smudges, and other erroneous markings from a true obstruction such as the text entry line.

A number of novel side (i.e., left and right) boundary locators accurately track the text entry line for text and line obstructions above and below the line, accounting for irregularity in straightness, thickness, and continuity in the text entry line. In addition to utilizing the unique search array to identify true obstructions, these boundary locators also utilize the search array for distinguishing text from line obstructions as well as to identify the left and right edges of text obstructions. Furthermore, these boundary locators utilize a recursive technique as well as multiple verification processes to avoid misinterpreting discontinuities in the line as its end, repeatedly searching beyond and around line gaps for any potential continuation of the line.

Advantageously, the present invention operates interactively with the user to precisely establish a field boundary in a quick, resource-efficient manner by invoking the present invention only when a user selects a point in a field. This enables the graphics system to respond immediately with the boundary of only the selected field. In addition, this eliminates the time associated with processing the complete form, thereby reducing the time the user must wait prior to entering information into the form. Furthermore, utilization of a user-identified field type with the selected coordinate enables the present invention to quickly and precisely identify the field boundary by searching for only those obstructions specific to the selected field type.

Further features and advantages of the present invention as well as the structure and operation of various embodiments of the present invention are described in detail below with reference to the accompanying drawings. In the drawings, like reference numbers indicate identical or functionally similar elements. Additionally, the left-most one or two digits of a reference number identifies the drawing in which the reference number first appears.

BRIEF DESCRIPTION OF THE DRAWINGS

For a fuller understanding of the nature of the invention, reference should be had to the following detailed description taken in connection with the accompanying drawings, in which:

FIG. 3 illustrates the various types of text fields and checkbox fields that may be included in a form;

FIGS. 4A–4D are functional block diagrams of the preferred embodiment of the graphics system of the present invention;

DETAILED DESCRIPTION OF THE PREFERRED EMBODIMENTS

TABLE OF CONTENTS

A. Graphics System Hardware Environment
B. Graphics System
C. High Level Functions—Field Identifier
   1. Type 1 (Label Over Text Entry Line) Field Identifier
   2. Type 2 (Label Under Text Entry Line) Field Identifier
   3. Type 3 (Textbox) Field Identifier
   4. Type 4 (Checkbox) Field Identifier
D. Low-Level Functions—Boundary Locators and Line Gap Identifiers
   1. Bottom Line Boundary Locator
   2. Above Text Entry Line Left Boundary Locator
   3. Above Text Entry Line Right Boundary Locator
   4. Top Boundary Locator
   5. Below Text Entry Line Left Boundary Locator
   6. Below Text Entry Line Right Boundary Locator
   7. Left Line Gap Identifier
   8. Right Line Gap Identifier
   9. Textbox Top Boundary
   10. Checkbox Top Boundary Locator
   11. Checkbox Bottom Boundary Locator
   12. Checkbox Right Boundary Locator
   13. Checkbox Left Boundary Locator
E. Summary

A. OPERATING ENVIRONMENT

Figure 1:
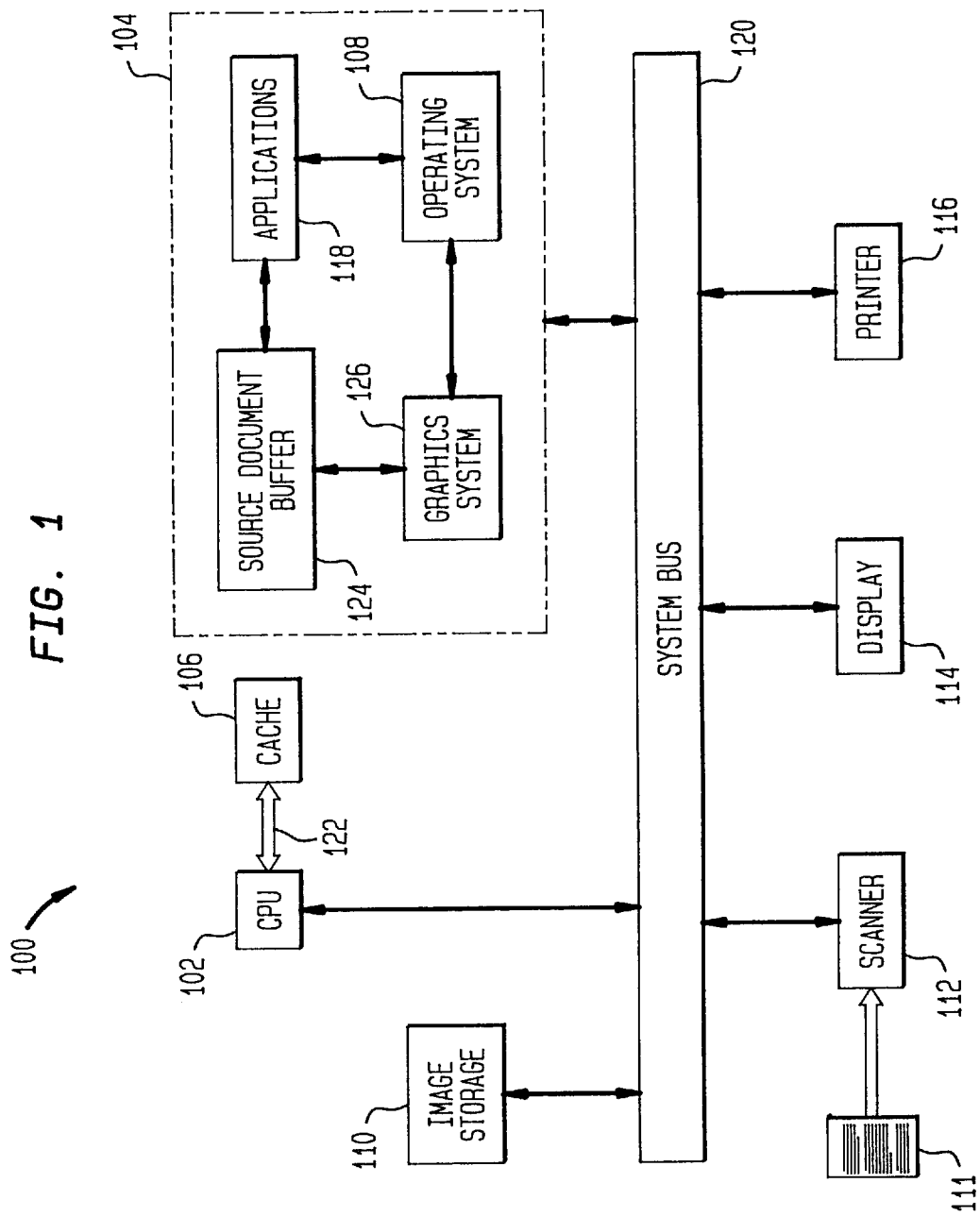
FIG. 1 is a functional block diagram illustrating the hardware environment in which the graphics systems of the present invention may operate.

FIG. 1 illustrates a representative hardware environment suitable for the present invention. The depicted computer system 100 includes a central-processing unit (CPU) 102, which performs operations on, and interacts with, a computer memory including a system memory 104 and a cache memory 106. System memory 104 typically includes volatile or random-access memory (RAM) for temporary storage of information, including portions of the computer's basic operating system 108. The system typically also includes read-only memory (ROM) for permanent storage of the computer's configuration and additional portions of the basic operating system 108, and at least one mass storage device 110, such as a hard disk and/or CD-ROM drive, for storing, among other things, images to be processed.

The system also includes several peripheral devices for accepting information from and presenting information to the user. These include a scanner 112, which optoelectronically converts text and/or image patterns present on an input document into electrical signals; a display 114, and a printer 116. Operation of these components is governed by a series of application programs 118 contained in system memory 104. For example, the electrical signals generated by scanner 112 are processed by an optical character recognition package or an image-processing program, and printer 116 operations may be governed by driver programs stored in memory 104. As used herein, the term "application program" refers broadly to any body of software and/or hardware operating under the control of CPU 102 and operating system 108 for processing information of interest to the user and which involves pixel operations. All components of the system other than memory cache 106 communicate over a bidirectional system bus 120. Cache 106 communicates directly with CPU 102 over a local bus 122.

Of primary interest with regard to the present invention are image-processing programs that reduce text, graphics or images (obtained, for example, from scanner 112) into a digital format for storage in a computer memory. For simplicity, the following discussion assumes that the image is present in the form of binary pixels that specify either a blank space or a monochromatic dot, referred to as a bit-mapped image. In the illustrative embodiment, the bit-mapped image defined by an application 118 is stored in a document buffer 124. Buffer 124 is ordinarily a partition of system memory organized into a "bitwise" grid.

Figure 2:
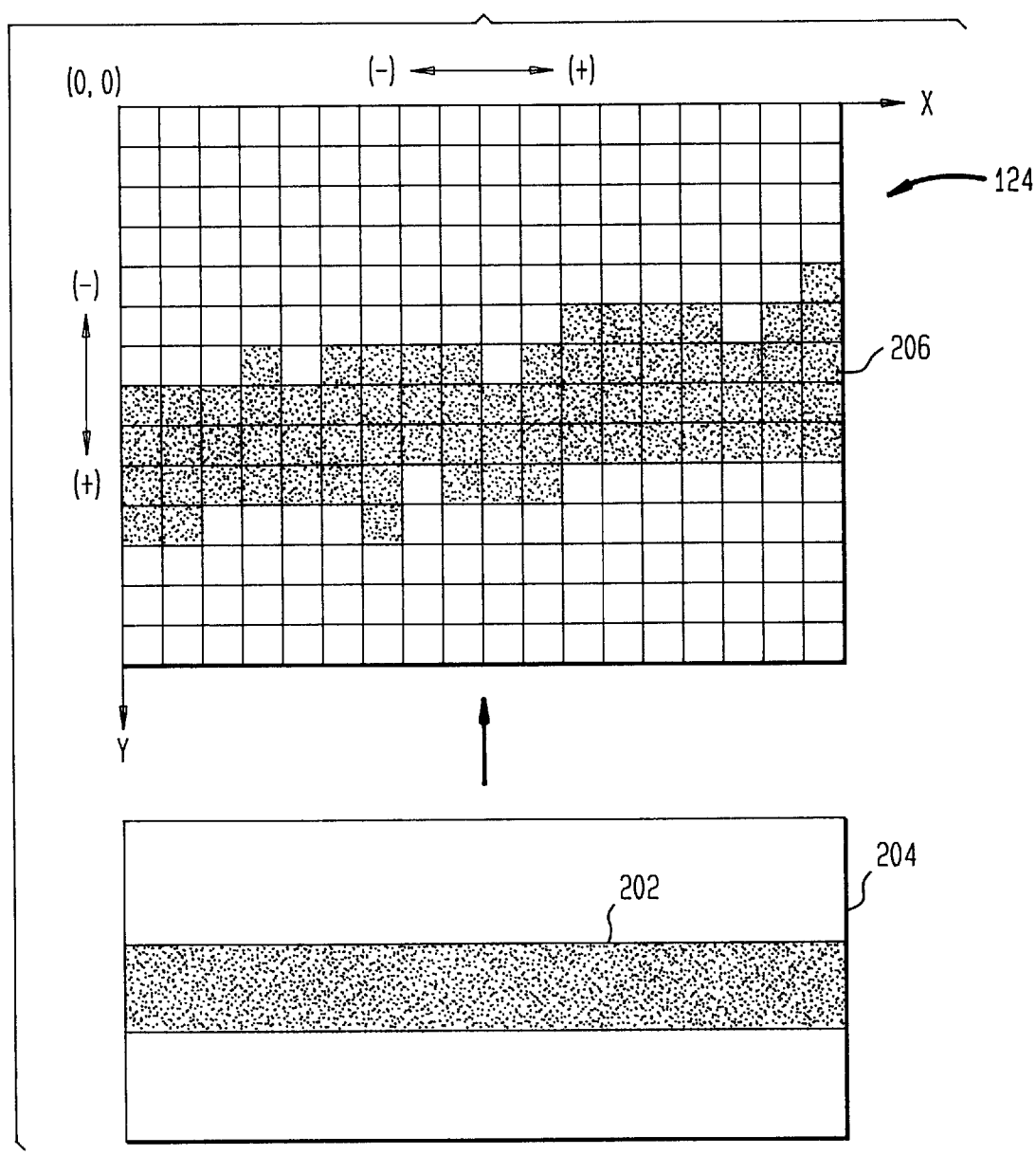
FIG. 2 schematically illustrates the manner in which a straight horizontal line may be misrepresented in a bit-mapped image buffer.

In a representative mode of operation, a source document 111 is scanned by scanner 112, processed into a digital image by an application 118 and stored in buffer 124. Because of inaccuracies and noise in the scanner, the application program or both, straight lines appearing in the source document may be represented imperfectly in buffer 124. An example of this effect is illustrated in FIG. 2, where a straight line 202 present in a fragment 204 of a source document becomes distorted following scanning. In particular, the corresponding line 206 stored in buffer 124 is represented in thickness by an average of, for example, four pixels, but this thickness varies irregularly and the line wanders upward across the field of the buffer. Idiosyncratic thickness variation can be due to erratic scanner performance, while line wander can occur as a result of slight misalignment of the document with respect to the scanner. Other artifacts can include spurious gaps that interrupt what should be a contiguous line, and random thickness variations.

B. GRAPHICS SYSTEM

The present invention is an interactive graphics system for precisely locating a boundary of a user-selected text field or checkbox field (generally referred to as "fields") on a digitized form, enabling the user to accurately enter information into the selected field. Upon receiving a user-selected coordinate of a point within the selected field, the graphics system automatically determines the boundary of the field by searching the neighboring area for particular obstructions based upon a user-provided type indication.

Form document 111 includes one or more fields into which a user is to enter information. The inventor has determined that the configuration of the fields in a form may be categorized into a specific number of categories or types as illustrated in FIG. 3. In the preferred embodiment, four types of fields are recognized.

Type 1

In a Type 1 field 306, the field is a text field and the label identifying the contents of the text field is typically above the text entry line and to the left of the area in which the user is to enter information in the form. In this type of field, the user enters text above the line and to the right of the label. Two examples are illustrated; example 302 illustrates a Type 1 field without information entered into the form; example 304 illustrates a completed Type 1 field.

Type 2

In a Type 2 field 312, the field is as text field and the label is located below the text entry line. Typically, the user enters in information above the line in substantial vertical alignment with the first letter of the label. Two examples are illustrated; example 308 illustrates a Type 2 field without information entered into the form; example 310 illustrates a completed Type 2 field.

Type 3

In a Type 3 field 318, the field is a text field configured as a textbox into which the user is to enter information. The label for the text field is typically located at the top left of the textbox as shown in FIG. 3. The user enters the information in the box either below in substantial vertical alignment with the first letter of the label or adjacent to the label. Two examples are illustrated; example 314 illustrates a Type 3 field without information entered into the text field; example 316 illustrates a completed Type 3 field. In Example 316, the text "John" is entered below the label "name" whereas the text "30" is entered adjacent to the label "age".

Type 4

In a Type 4 field 324, the field is a checkbox field into which the user is to enter a single character, often in the form of an "X" or "✓". There is typically no label provided for checkboxes. Two examples are illustrated; example 320 illustrates a Type 4 field without information entered into the field; example 322 illustrates a completed Type 4 field.

The graphics system 126 communicates with display 114, receiving information pertaining to a text field selected by the user. Specifically, the graphics system receives the user-selected coordinate, typically a mouse click point, indicating a point within the text field that the user has selected. The user is prompted is some known manner (for example, a dialog box) to identify the type of the selected field. As noted, in the illustrative embodiment, there are four types of fields from which the user selects one. It is understood, however, that any means may be provided to enable a user to enter the necessary information.

Significantly, and as will be described in detail below, the present invention utilizes a search buffer 401 containing a search array of pixel values when searching for certain obstructions. Preferably the search array is a multi-column/multi-row array that enables the present invention to consider the values of many pixels when determining whether a true obstruction exists as well as to distinguish the types of obstructions. For example, some boundary locators discussed below utilize the search array to tally multiple neighboring columns of pixels to distinguish dirt, smudges, and other erroneous markings from a true obstruction such as a line or text. In other boundary locators, the search array is used to distinguish vertical and horizontal lines from text obstructions.

Figure 4A:
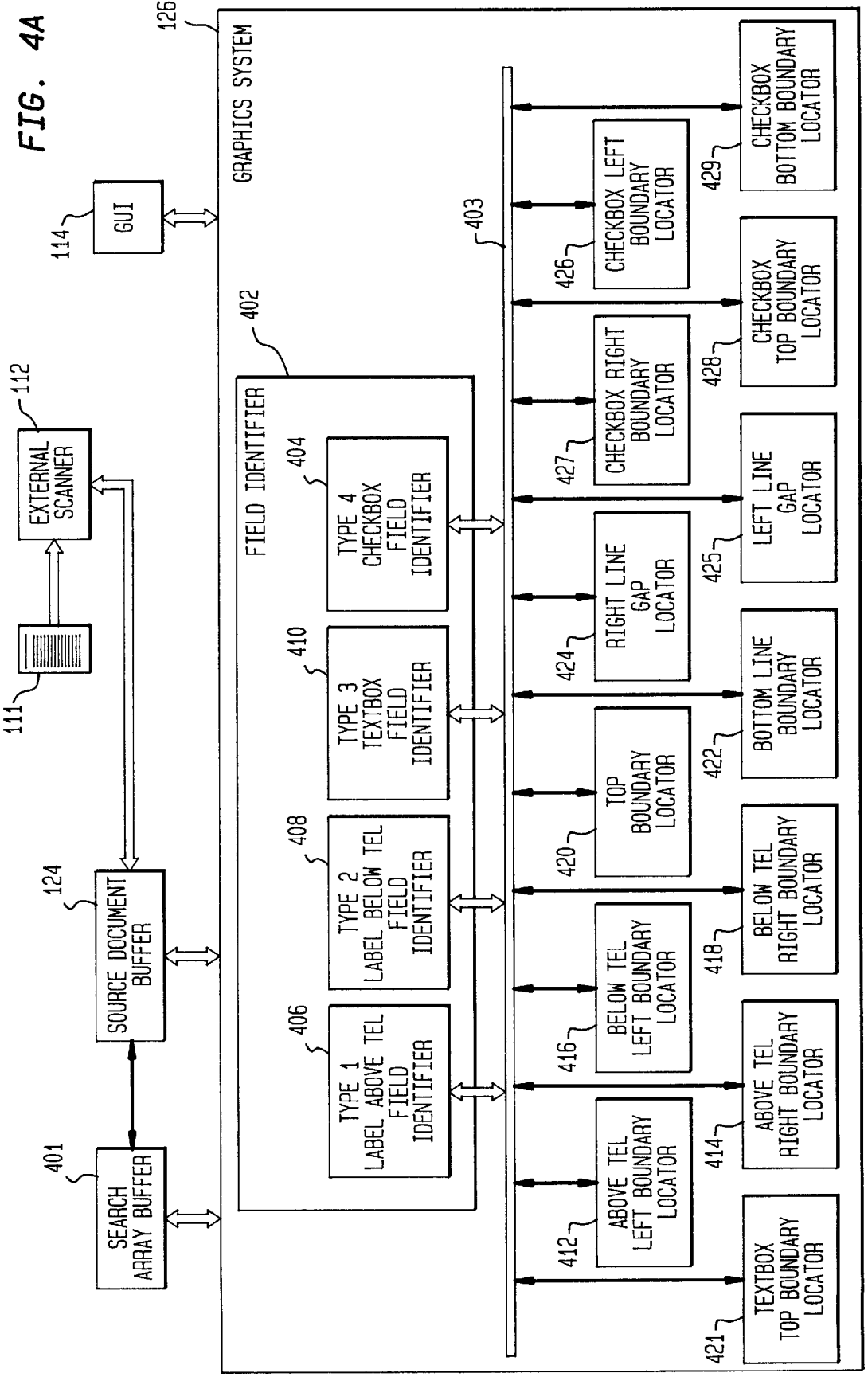
Figure 4B:
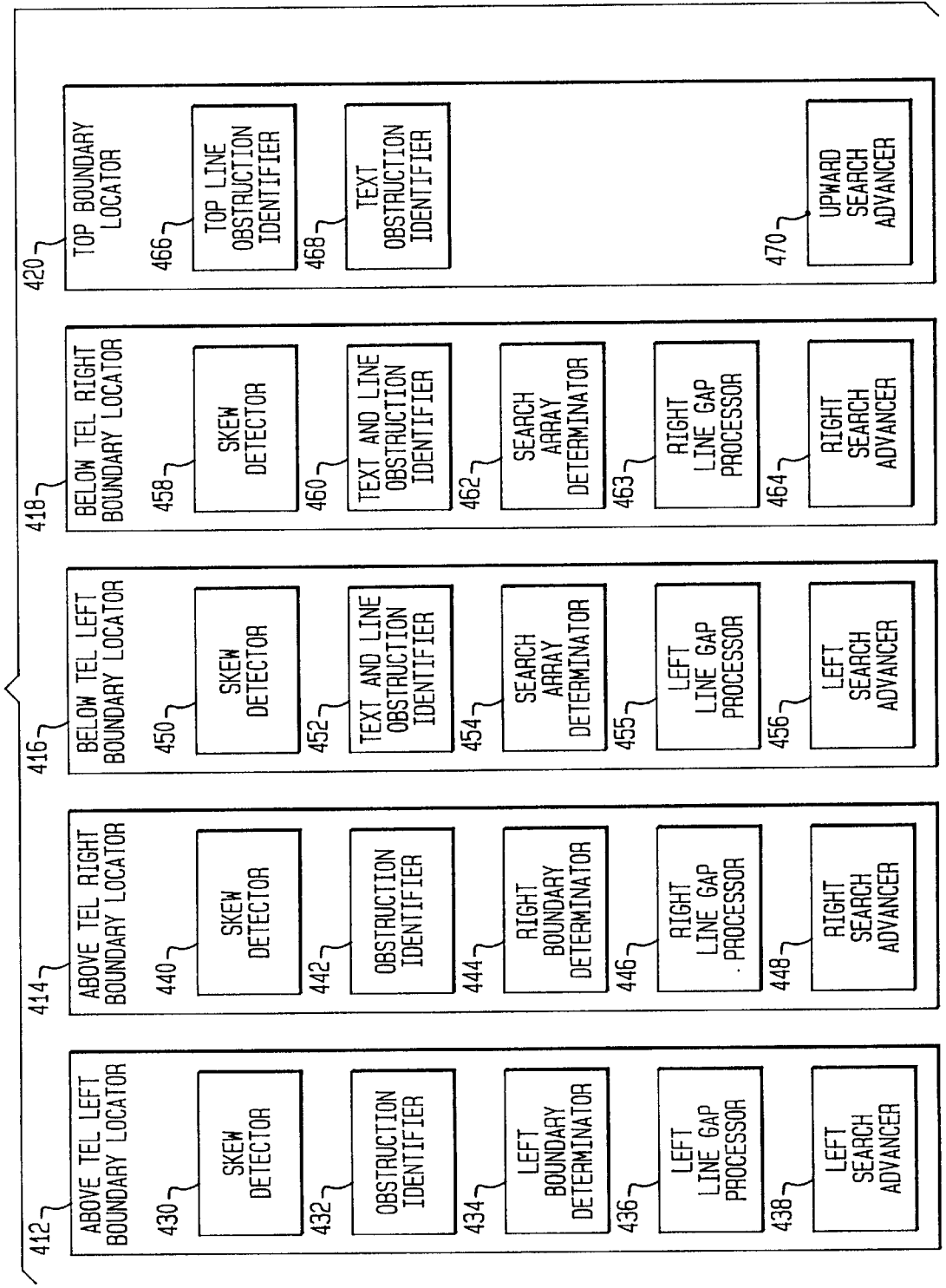

Referring to FIGS. 4A–4C, the graphics system includes a means for receiving information pertaining to a selected field, including the user-selected coordinate and field type. A field identifier associated with the indicated field type determines the boundary of the selected field. The field identifier implements one or more boundary locators, each specifically configured to search for a particular obstruction and to determine a field boundary associated with that obstruction.

Specifically, the graphics system includes a field identifier for performing high level functions such as receiving the user-provided information and implementing a particular mode of operation directed to the selected field type. More specifically, the field identifier includes a plurality of specialized text and checkbox field identifiers, each configured to determine the boundary of a specific type of field. There are preferably four types of fields addressed in the preferred embodiment of the graphics system of the present invention. As noted, these types include 3 types of text fields and a checkbox field. These include a type 1 field which is a text field having an associated label above the text entry line, a type 2 field which is a text field having an associated label below the text entry line, a type 3 field wherein the text entry line is part of the textbox and an associated label is located within that box, and a type 4 field which is a checkbox with no associated label.

In the preferred embodiment, there is a one-to-one relationship between fields and field identifiers. Thus, in the preferred embodiment, there are four field identifiers. A Type 1 field identifier 406 performs the functions shown in FIG. 5 to determine the field boundary for a type 1 text field. A Type 2 field identifier 408 performs the functions shown in FIG. 6 to determine the boundary for a type 2 field. A Type 3 field identifier performs the functions shown in FIG. 7 to determine the boundary of a type 3 field. A Type 4 field identifier 404 performs the functions shown in FIG. 8 to determine the boundary of a type 4 field.

In the preferred embodiment of the present invention, the field identifiers are implemented as software routines, and the boundary locators and line gap identifiers are implemented as subroutines called by these routines. Graphics system 126 provides an application interface for issuing subroutine calls, enabling any of the above routines 404–410 to invoke any number or combination of subroutines 412–429. In addition, the subroutines may invoke other subroutines also by issuing subroutine calls through the applications interface. The lower level subroutines comprise a number of functional blocks of code, referred to herein as code segments, for performing selective obstruction searching and identification functions. Each of the subroutines are briefly described below.

The bottom line boundary locator 422 searches downward from a user-selected coordinate for a substantially horizontal text entry line. The bottom line boundary locator is called by Types 1, 2 and 3 field identifiers.

The above text entry line left boundary locator 412 locates an obstruction to the left of the column containing the user-selected coordinate above the text entry line and, based on the location of the obstruction, determines the left-side boundary of the field. The locator 412 is called by the Type 1 and Type 3 field identifier routines 406 and 410. Likewise, the above text entry line right boundary locator 414 locates an obstruction to the right of the column containing the user-selected coordinate above the text entry line and, based on the location of the obstruction, determines the right-side boundary of the field. The locator 414 is called by the Type 1 and Type 3 field identifiers.

The top boundary locator 420 searches upward from the row containing the bottom line boundary for an obstruction in the form of either a horizontal line or text. The top boundary locator is called by the Type 1, Type 2 and Type 3 field identifier routines.

The below text entry line left boundary locator 416 locates an obstruction to the left of the user-selected coordinate below the text entry line and, based on the location of the obstruction, determines the left-side boundary of the field. The locator 416 is called by the Type 2 and Type 3 field identifier routines.

Likewise, the below text entry line right boundary locator 418 locates an obstruction to the right of the user-selected coordinate below the text entry line and, based on the location of the obstruction, determines the right-side boundary of the field. The locator 418 is called by the Type 2 and Type 3 field identifier routines.

The left line gap locator 425 distinguishes a gap in a line from the actual termination of the line by searching the vicinity of a line endpoint for a continuation of the line. The identifier 425 is called by other subroutines that search left across the digital image, following the text entry line.

The right line gap locator 424 distinguishes a gap in a line from the actual termination of the line by searching the vicinity of a line endpoint for a continuation of the line. The locator 424 is called by other subroutines that search right across the digital image, following the text entry line.

The textbox top boundary locator 421 locates a line obstruction above the user-selected coordinate. The locator 421 is called by the Type 3 text field identifier routine.

The checkbox top boundary locator 428 locates a top obstruction above the row containing the user-selected coordinate. The locator 428 is called by the Type 4 field identifier routine.

The checkbox bottom boundary locator 429 locates a bottom obstruction below the row containing the user-selected coordinate. The locator is called by the Type 4 field identifier routine.

The checkbox right boundary locator 427 locates a vertical obstruction to the right of the column containing the user-selected coordinate and, based on the location of the obstruction, determines the right-side boundary of the checkbox field. The locator 427 is called by the Type 4 field identifier routine.

The checkbox left boundary locator 426 locates a vertical obstruction to the left of the column containing the user-selected coordinate and, based on the location of the obstruction, determines the left-side boundary of the checkbox field. The locator 426 is called by the Type 4 field identifier routine.

Referring to FIGS. 4B and 4C, a number of the above lower level functions are comprised of one or more code elements for performing specific searching and identification functions. These code elements and their interrelationship are described in detail below.

Figure 4D:
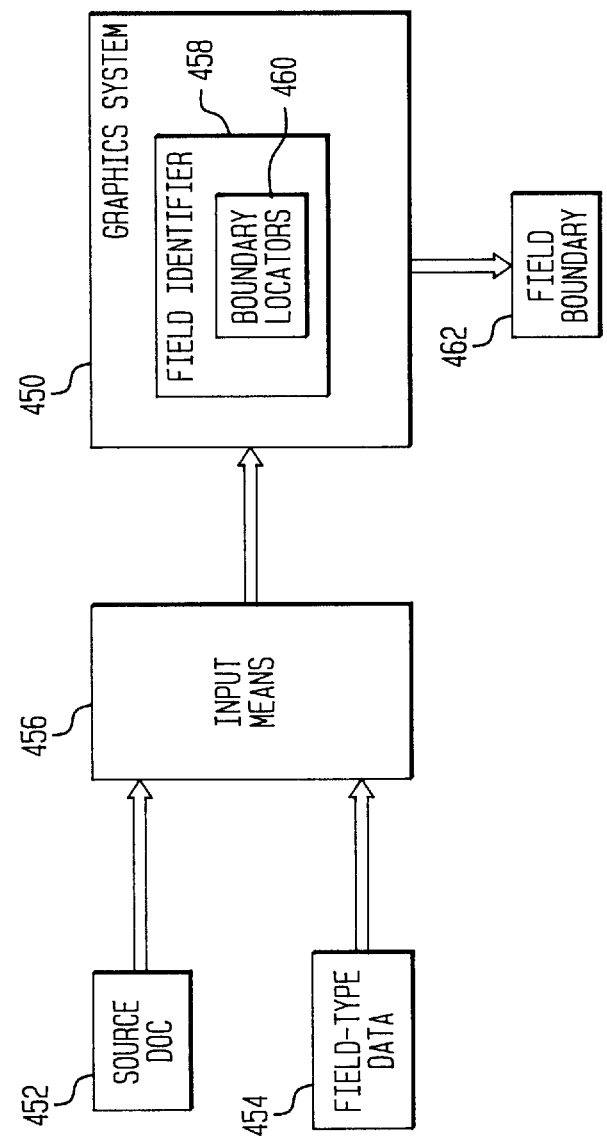

FIG. 4D is a high level block diagram of the graphics system of the present invention. Graphics system 450 receives source document 452 and field type data 454 through an input means 456. Graphics system 450 includes a field identifier 458, including one or more boundary locators 460, that determine the boundary of the selected field based upon the field type data provided.

C. FIELD IDENTIFIERS

As noted, there are multiple field identifiers, each specifically configured to search for obstructions particular to a certain type of field and to determine the boundary of the associated text field or checkbox field for the user to enter the requested information. Referring to FIGS. 4A and 4B, the field identifiers are described in detail below.

1. Type 1 (Label Over Text Entry Line) Field Identifier

The Type 1 field identifier 406 is described below with reference to FIGS. 4A and 5. As noted, the Type 1 field identifier is preferably implemented as a software routine. The Type 1 field identifier 406 is invoked when the user has selected an approximate location of a preferred field, and has identified the selected field as a Type 1 field, i.e., a text field with the label located above the entry line at which the user is to enter information. The Type 1 field identifier is provided with the coordinate of the user-selected point, and returns the coordinates for the field rectangle.

Figure 5:
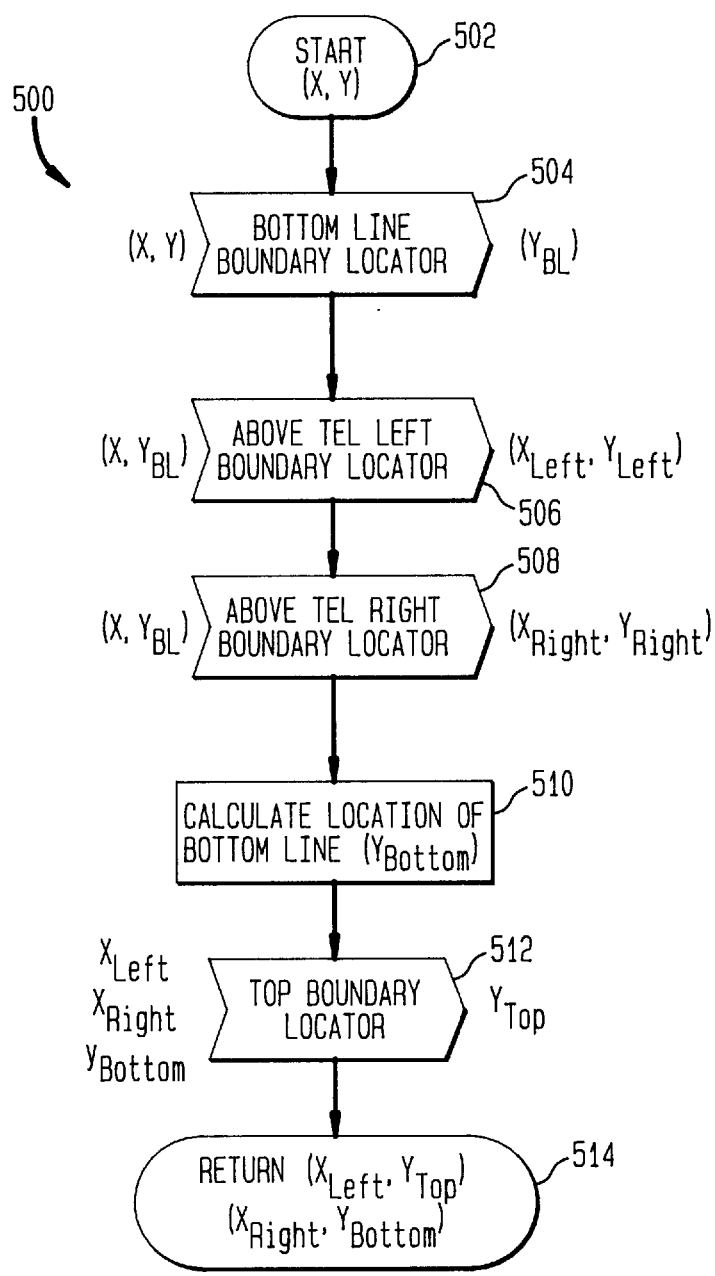
FIG. 5 is a flow chart of the functions performed by the Type 1 (label above text entry line) field identifier of the present invention.

Referring to FIG. 5, the functions performed by the Type 1 field identifier 404 begins at start block 502 with the receipt of the (X,Y) coordinate selected by the user. Field identifier 404 performs a number of functions to determine the four sides of the rectangular text field boundary within the surrounding obstructions. As noted, in the preferred embodiment, these functions are primarily performed in subroutines called by this routine issuing subroutine calls through the applications interface.

At block 504 the Type 1 field identifier 406 invokes a bottom line boundary locator 422 to search downward from the user-selected coordinate for a substantially horizontal text entry line. When invoked, the bottom line boundary locator 422 is supplied with the coordinate of the user-selected coordinate. The bottom line boundary locator 422 returns a coordinate having a Y-axis value of the first row at which the bottom line boundary has been located, referred to as $Y_{BL}$. The bottom line boundary locator is described in detail below with reference to FIG. 9.

Once the bottom line obstruction has been located, the Type 1 field identifier 406 locates the left and right boundaries of the text field. Specifically, in block 506 a subroutine call is made to an above text entry line left boundary locator 412 to locate an obstruction to the left of the column of the bit-mapped image containing the user-selected coordinate above the text entry line and, based on the location of the obstruction, determine the left-side boundary of the text field. When invoked, the locator 412 is provided with the $(X, Y_{BL})$ coordinate. The locator 412 returns the coordinate $(X_{Left}, Y_{Left})$, representing the left-side boundary. The above text entry line left boundary locator process is described in detail below with reference to FIG. 10.

Similarly, in block 508 a subroutine call is made to an above text entry line right boundary locator 414 to locate an obstruction to the right of the column containing the user-selected click coordinate above the text entry line and, based on the location of the obstruction, determine the right-side boundary of the text field. When invoked, the locator 414 is provided with the $(X, Y_{BL})$ coordinate. The locator 414 returns the coordinate $(X_{Right}, Y_{Right})$, representing the right-side boundary. The above text entry line right boundary locator process is described in detail below with reference to FIG. 11.

At block 510, the average height of the bottom line is determined based upon the values $Y_{Left}$ and $Y_{right}$. This value, referred to as $Y_{bottom}$, is then used to determine the height of the text field. $Y_{bottom}$ is calculated simply as $(Y_{Left} + Y_{right})/2$.

In the preferred embodiment, the image is deskewed as necessary prior to performing the process of the present invention. For example, if the user observes that the image is skewed, the user may first select a well known deskewing algorithm that will perform a rotation of the image. It is noted that the performance of the present invention is optimized when such a procedure has been first applied to the bit-mapped image when necessary.

It is also preferred that a second process be performed on the bit-mapped image prior to the application of the present invention. This process is a procedure to straighten lines that are jagged or slightly wander. This process is described in a commonly owned U.S. patent application entitled "Method and Apparatus For Identifying And Fixing Horizontal and Vertical Lines in Digitized Images," Ser. No. 08/433,127, filed May 3, 1995, herein incorporated by reference in its entirety.

Once $Y_{bottom}$ is determined, the height of the text field is determined in block 512. As shown, a procedure call is made to a top boundary locator 420 to search upward from the row containing the bottom line boundary ($Y_{BL}$) until it finds an obstruction in the form of either a horizontal line or text. The top boundary locator 420 is provided the endpoints of the bottom line boundary along the X axis ($X_{Left}$ and $X_{Right}$) and the Y coordinate ($Y_{BL}$) from which to start the upward search. The top boundary locator returns the Y coordinate, $Y_{Top}$, of the first row at which the top boundary begins.

It should be noted that in the preferred embodiment, height detection is automatically determined at block 512. However, under certain circumstances, height detection may not be necessary or desirable. For example, in cases where the font size is restricted to a predetermined point size, the height of the text field may be constant. In such a circumstance, the process shown in FIG. 12 may be replaced or provided as a user-selectable option.

If such a process is not performed, other methods may be implemented to estimate the height of the text field. For example, the height may be a predetermined distance less than $Y_{Field}$ above the horizontal line located at $Y_{bottom}$. Alternatively, the top of the text field may be easily determined to be equidistant from the user-selected point as $Y_{Bottom}$. In other words, the selected point is assumed to be in the center of the text field.

Finally, the Type 1 field identifier completes its process at return block 514 wherein it returns 2 coordinates defining the rectangular boundary of the field, $(X_{Left}, Y_{Top})$ and $(X_{Right}, Y_{Bottom})$.

2. Type 2 (Label Under Text Entry Line) Field Identifier

The Type 2 field identifier 408 is described below with reference to FIGS. 4A and 6. As noted, the Type 2 field identifier is preferably implemented as a software routine. The Type 2 field identifier 408 is invoked when the user has selected an approximate location of a preferred field and has identified the selected field as a Type 2 field, i.e., a text field with the label located below the entry line at which the user is to enter information. The Type 2 field identifier is provided with the coordinate of the user-selected point, and returns the coordinates of the rectangular boundary of the field.

Figure 6:
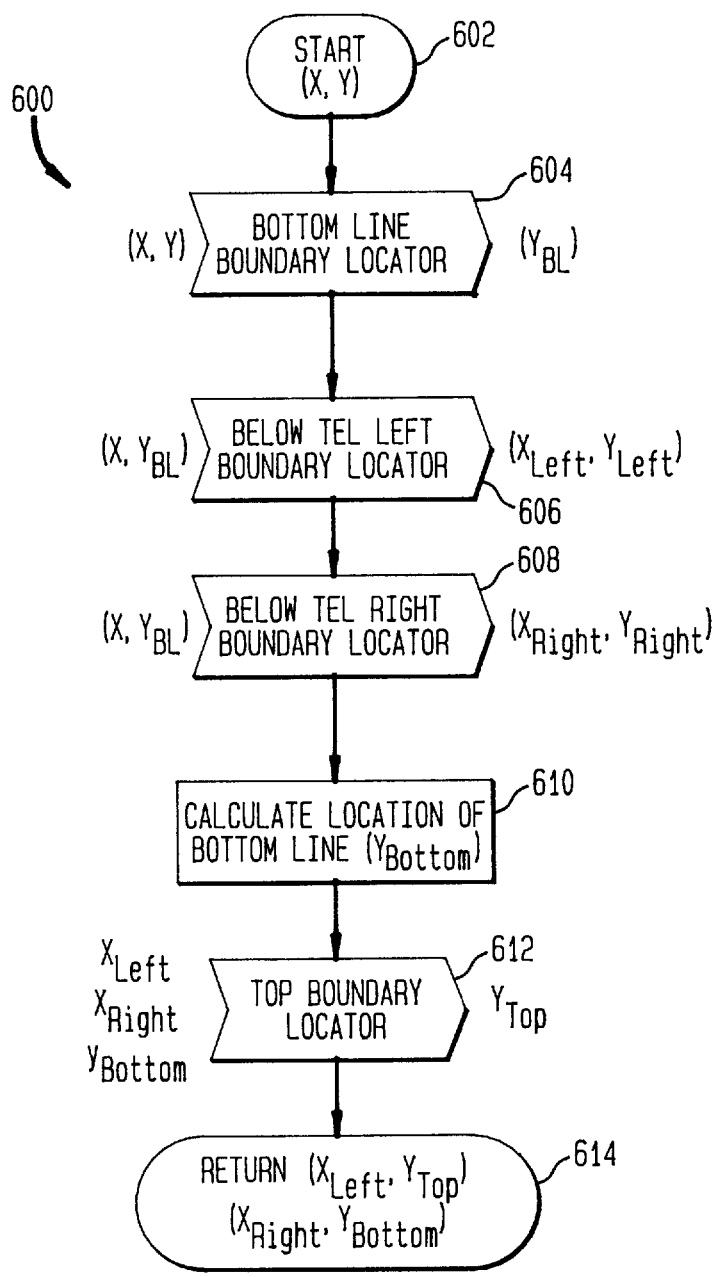
FIG. 6 is a flow chart of the functions performed by the Type 2 (label below text entry line) field identifier of the present invention.

Referring to FIG. 6, except as noted below, the functions performed by the Type 2 field identifier 408 are similar to those performed by the Type 1 field identifier 406 described above. The Type 2 field identifier calls below text entry line left and right locator subroutines, each returning the same information as their counterpart subroutines described above.

3. Type 3 (Label Within TextBox) Field Identifier

The Type 3 field identifier 408 is described below with reference to FIGS. 4 and 7. As noted, the Type 3 field identifier is preferably implemented as a software routine. The Type 3 field identifier 408 is invoked when the user has selected an approximate location of a preferred field, and has identified the selected field as a Type 3 field, i.e., a field located inside a textbox with an associated label. The Type 3 field identifier is provided with the coordinate of the user-selected point, and returns the coordinates of rectangle boundary of the field.

Figure 7:
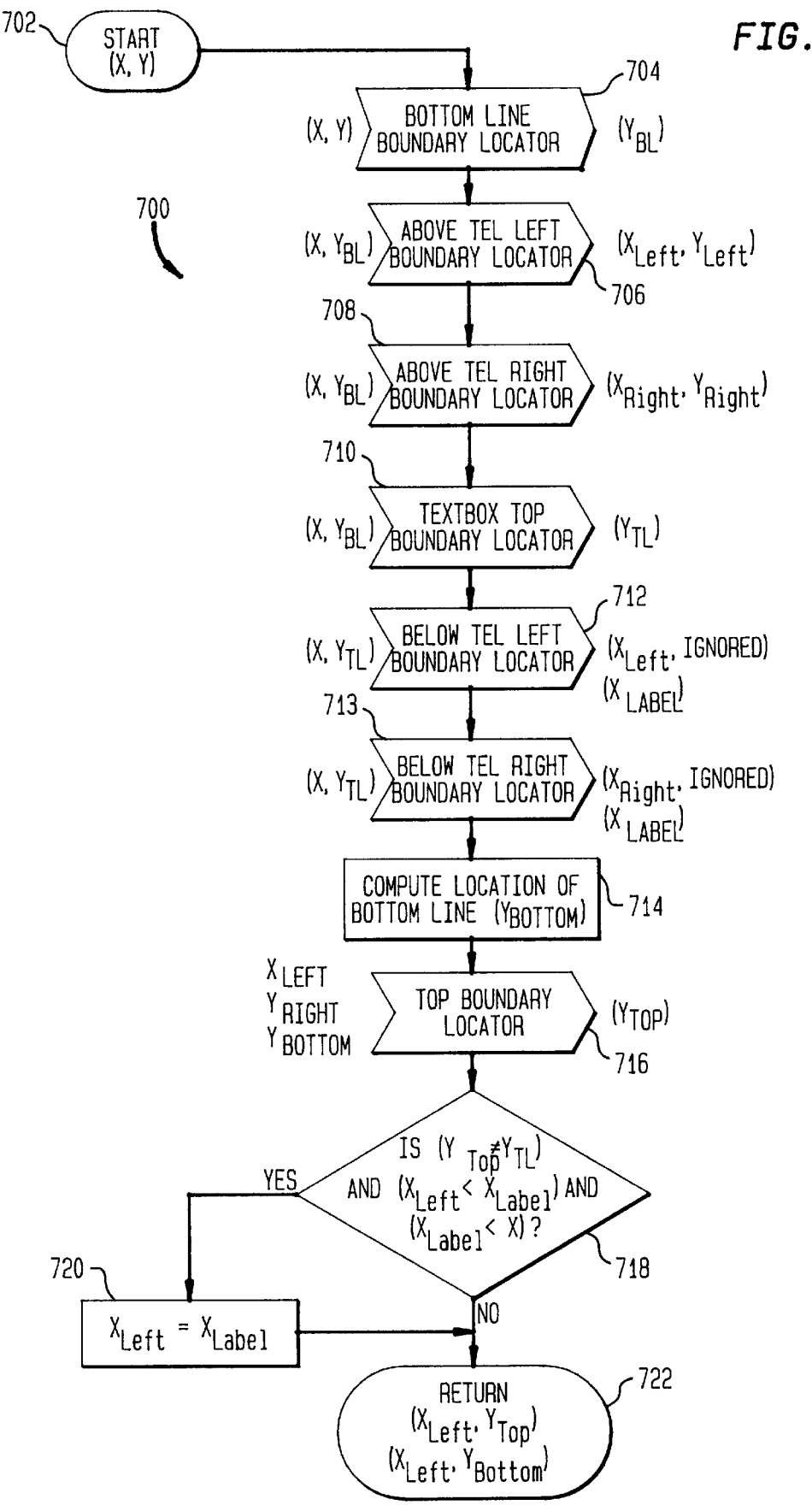
FIG. 7 is a flow chart of the functions performed by the Type 3 (textbox) field identifier of the present invention.

Referring to FIG. 7, the functions performed by the Type 3 field identifier 408 begins at start block 702 with the receipt of the (X,Y) coordinate selected by the user. Field identifier 408 performs a number of functions to determine the rectangular field boundary within the surrounding obstructions.

At block 704 the Type 3 field identifier 408 invokes a bottom line boundary locator 422 to search downward from the user-selected coordinate for a substantially horizontal text entry line. The locator 422 is supplied with the user-selected coordinate and returns $Y_{BL}$. The bottom line boundary locator is described in detail below with reference to FIG. 9.

Similar to the Type 1 field identifier, at blocks 706 and 708 the Type 3 field identifier 408 locates the left and right boundaries of the field with calls to the above text entry line left boundary locator 412 and above text entry line right boundary locator 414.

Figure 17:
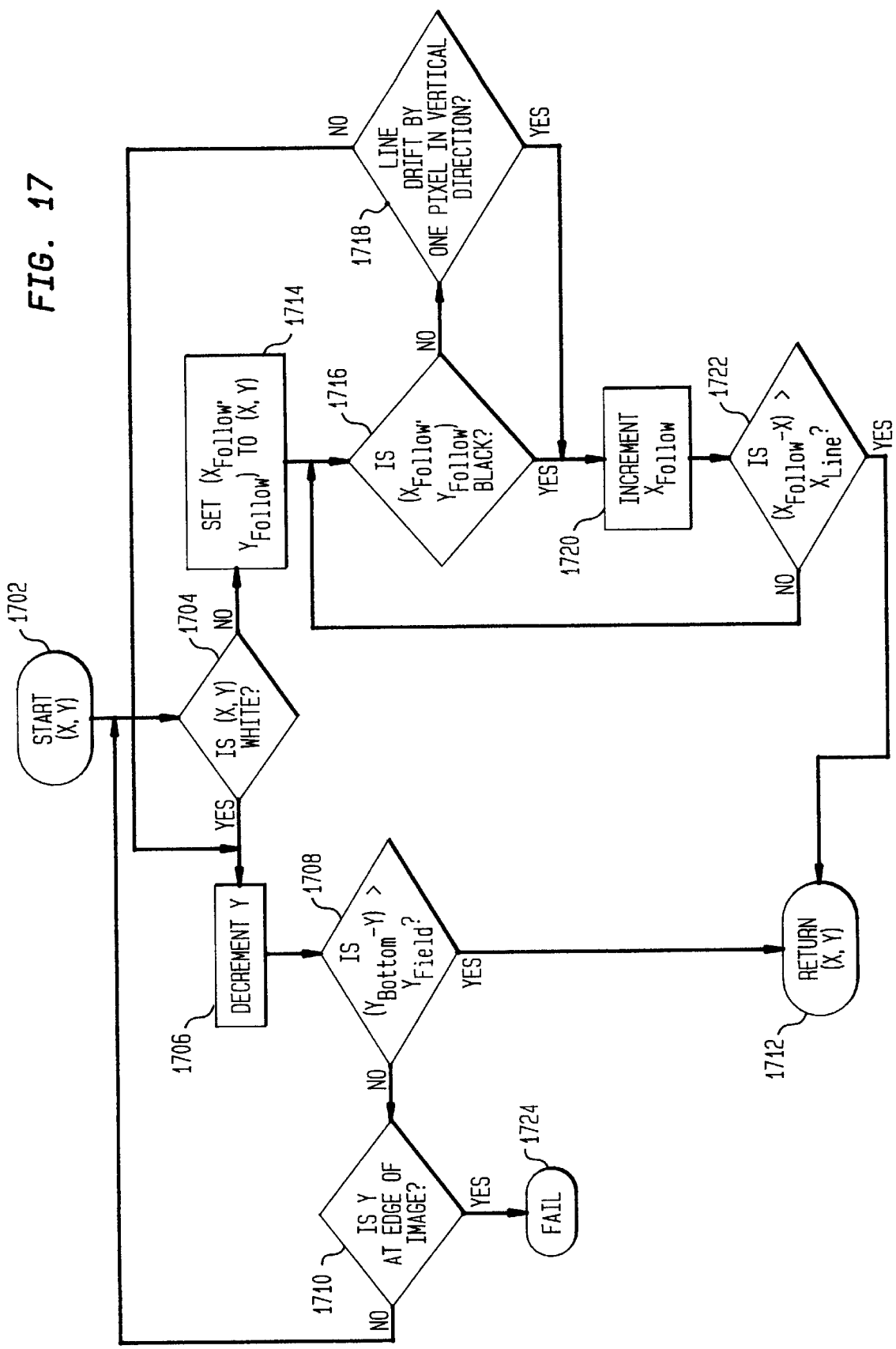
FIG. 17 is a flow chart of the functions performed by the text box top boundary of the present invention.

At block 710 the Type 3 field identifier calls a textbox top boundary locator 421 to search upward for the top of the textbox. When invoked, the locator 421 is supplied with the initial user selected coordinate (X,Y), and returns the row, $Y_{TL}$ at which the top boundary was located. The textbox top boundary locator is described in detail below with reference to FIG. 17.

At blocks 712 and 714, the identifier locates the label in the box, including the left and right boundaries of the label itself, with calls to below text entry line left and right boundary locators 416, 418. Significantly, the present invention automatically formats the entered text to fit under the label as well as adjacent to the label, depending upon the location of the selected point by the user. Note that the Y value of the (X,Y) coordinate returned by the locators 416, 418 is ignored because identifier 410 located the top boundary itself at block 710.

In addition, the locator also truncates the left and right boundaries if necessary. For example, if a vertical line is not scanned properly and a large gap appears in it near the connection with the bottom edge of the box, the Above TEL locators may miss it and scan too far, possibly into the next box. If the line connects properly with the top of the box, the below TEL locators will catch it and truncate the erroneous boundary of the box.

At block 714 the bottom line location is computed, averaging the left and right endpoints of the bottom line.

Once $Y_{Bottom}$ is determined, the height of the text field is determined in block 716. As shown, a procedure call is made to top boundary locator 420 to search upward from the row containing the bottom line boundary ($Y_{BL}$) until it finds an obstruction in the form of either a horizontal line or text. The top boundary locator 420 is provided the endpoints of the bottom line boundary along the X axis ($X_{Left}$ and $X_{Right}$) and the Y coordinate ($Y_{BL}$) from which to start the upward search. The top boundary locator returns the Y coordinate, $Y_{Top}$, of the first row at which the top boundary begins.

In step 718 three tests are performed. First, is the height as detected in step 716 a different height from that detected in step 710? Second, is there a label at all? Third, did the user click to the right of it? If all three tests are satisfied, then the user clicked to the right of the label. If a fixed height font is used and the user had clicked to the right of the label to avoid the fixed height overlapping from the label, the boundary is adjusted to place the field next to the label; otherwise, the field is placed underneath the label.

4. Type 4 (Checkbox) Field Identifier

The Type 4 field identifier 404 is described below with reference to FIGS. 4A and 8. As noted, the Type 4 field identifier is preferably implemented as a software routine. The Type 4 field identifier 404 is invoked when the user has selected an approximate location of a preferred field, and has identified the selected field as a Type 4 field, that is, a checkbox. The Type 4 field identifier is provided with the coordinate of the user-selected point, and returns four coordinates valves for the checkbox, thereby enabling the user to enter information, typically an "X".

Figure 8:
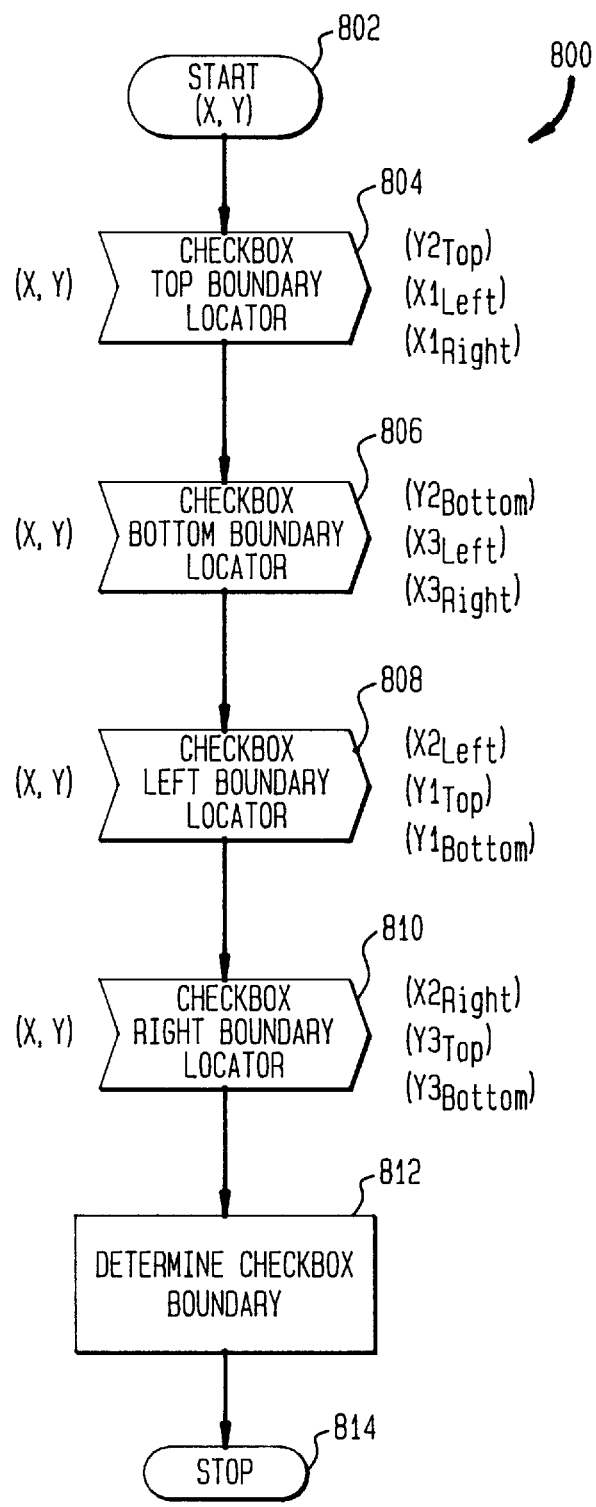
FIG. 8 is a flow chart of the functions performed by the Type 4 checkbox field identifier of the present invention.

Referring to FIG. 8, the functions performed by the Type 4 field identifier 404 begins at start block 802 with the receipt of the (X,Y) coordinate selected by the user. Field identifier 404 performs a number of functions to determine the four sides of the rectangular field boundary within the surrounding vertical and horizontal line obstructions.

Beginning with the user-selected (X,Y) coordinate, the checkbox identifier 404 calls four locators, each performing a search in one of the cardinal directions. A checkbox top boundary locator 428 is called at block 804 to locate a top obstruction above the user-selected coordinate. When invoked, locator 428 is provided with the current (X,Y) coordinate and the locator 428 returns a Y-coordinate value ($Y2_{Top}$), representing the row at which the top obstruction was located.

A checkbox bottom boundary locator 429 is called at block 806 to locate a bottom obstruction below the user-selected coordinate. When invoked, locator 429 is provided with the current (X,Y) coordinate and returns a Y-coordinate value ($Y2_{Bottom}$), representing the row at which the bottom obstruction was located.

At block 808, the checkbox left boundary locator 426 is called to locate a vertical obstruction to the left of the user-selected coordinate. When invoked, locator 426 is provided with the current (X,Y) coordinate and returns a Y-coordinate value ($X2_{Left}$), representing the column at which the left obstruction was located.

At block 810, the checkbox right boundary locator 427 is called to locate a vertical obstruction to the right of the user-selected coordinate. When invoked, locator 427 is provided with the current (X,Y) coordinate and returns a Y-coordinate value ($X2_{Right}$), representing the column at which the right obstruction was located.

At block 808, the checkbox boundary is determined based upon these returned values.

E. LOW-LEVEL FUNCTIONS—BOUNDARY LOCATORS AND LINE GAP IDENTIFIERS

As noted above with reference to FIGS. 4A and 4B, a number of second tier or low-level functions are performed in support of the field identifier functions described above. In the preferred embodiment of the present invention, these functions are implemented as software subroutines, called by the first tier routines. However, as would be apparent to one skilled in the relevant art, these functions may be implemented in any manner suitable for a particular application. For example, the second tier functions may be incorporated into the first tier routines. Each of the second tier functions is described below.

1. Bottom Line Boundary Locator

The bottom line boundary locator 422 searches downward from the user-selected coordinate for a substantially horizontal text entry line. As noted, the bottom line boundary locator is preferably invoked by Types 1, 2, and 3 text field identifiers. When invoked, the bottom line boundary locator 422 is supplied with the coordinate of the user-selected coordinate. The bottom line boundary locator 422 returns a Y-axis value of the first row at which the bottom line boundary has been located, referred to as $Y_{BL}$.

Figure 9:
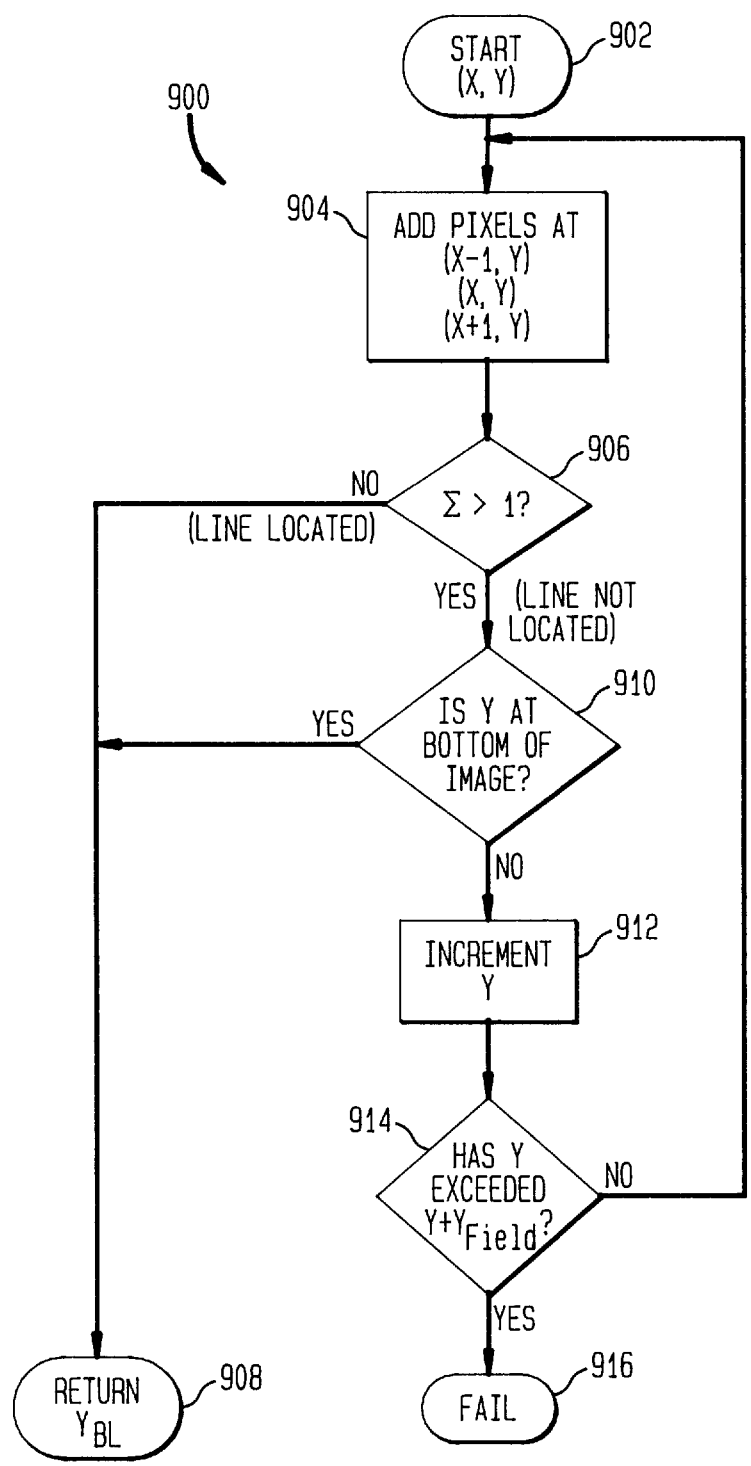
FIG. 9 is a flow chart of the functions performed by the bottom line boundary locator of the present invention.

Referring to FIG. 9, the functions performed by locator 422 are shown in process flow chart 900. Generally, locator 422 advances a search vertically downward for a predetermined distance, searching for an obstruction in the form of a substantially horizontal line. In the preferred embodiment, a line obstruction is distinguished from erroneous markings when at least two of the pixels in a row of the 3 column buffer are black. Thus, the pixels at each row are summed in succession to determine the number of black and white pixels contained in that row.

The convention implemented in the preferred embodiment of the present invention is that black pixels have a logical value of zero while white pixels have a logical one value. Thus, in block 904, locator 422 determines whether there are one or more white pixels in the 3 pixel row. That is, if the summation of the three pixel values is a value that is greater than one, then there are two or three white pixels—and not at least two black pixels—in the selected row of three pixels.

If there are at least two black pixels in the row, that row is considered to contain a line obstruction and locator 422 terminates the process and returns the Y coordinate to the calling routine for further processing. However, if it is determined that there are not at least 2 black pixels in the current row, then it is determined whether the search has continued past the bottom of the image in conditional block 910. If so, the $Y_{BL}$ coordinate is returned, treating the bottom of the image as the "line". This allows the present invention to accommodate the scenario when the bottom line of a table did not quite fit in the scanned image, with the vertical lines extending to the bottom of the page.

If the bottom line boundary locator has not advanced to the edge of the image, then the value of Y is incremented in block 912. As noted, the value of the Y coordinate increases as a search progresses down the digital image. Thus, incrementing Y advances the search down the form by one row of pixels.

At block 914 it is determined whether the search has advanced to a row that has exceeded a predetermined value, referred to as $Y_{Field}$, representing the maximum anticipated height of a field. In other words, assuming the user selected a point at the top-most row of the field, there is no need to search for the bottom line over a distance greater that the total height of the field. In the preferred embodiment, $Y_{Field}$ is set to a constant value of one inch (200 pixels). However, it is understood that this value may be a variable quantity dynamically determined based upon the various parameters, such as the size and the type of text field, the configuration of the form, etc.

If it is determined that the search has continued downward to the extent that the current value of Y has exceeded $Y+Y_{Field}$, then the search fails at block 916. However, if it is determined that $Y+Y_{Field}$ has not been exceeded then the above process is repeated for the next row of 3 pixels in the search array.

Thus, locator 422 provides the top-most row of the bottom or text entry line for a selected text field.

2. Above Text Entry Line Left Boundary Locator

The above text entry line left boundary locator 412 locates an obstruction above the text entry line to the left of the bit-mapped image column containing the user-selected coordinate and, based on the location of the obstruction, determines the left-side boundary of the text field. As noted, the locator 412 is invoked by the Type 1 and Type 3 field identifier routines 406 and 410. When invoked, the locator 412 is provided with the $(X,Y_{BL})$ coordinate, representing the pixel vertically below the user selected click point in the first row at which the bottom line was previously located. The locator 412 returns the coordinate $(X_{Left},Y_{Left})$, representing the lowest pixel of the left-side boundary.

Figure 10:
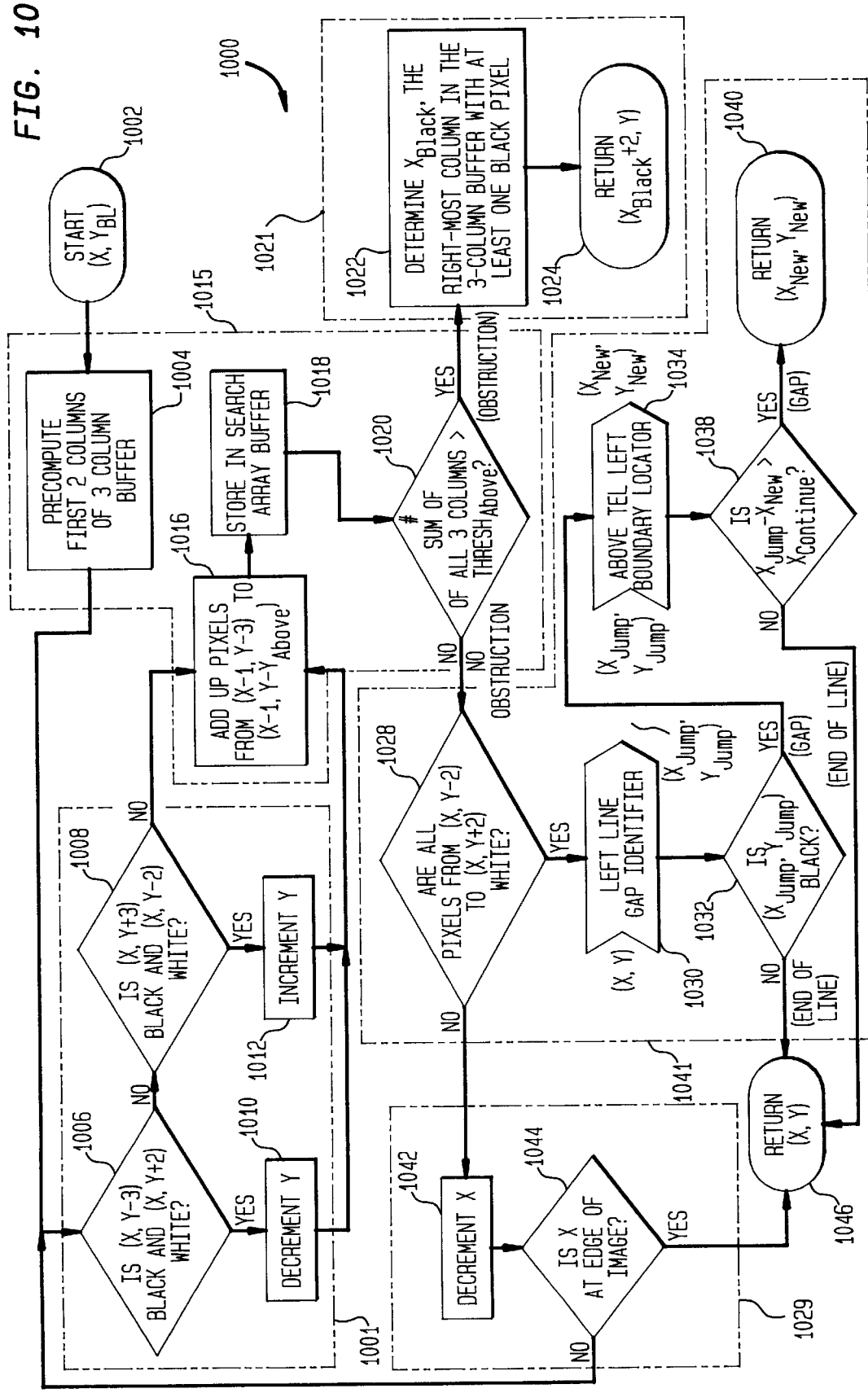
FIG. 10 is a flow chart of the functions performed by the above text entry line left boundary locator of the present invention.

Referring to FIG. 10, the above text entry line left boundary locator 412 includes a number of functional blocks of code, referred to as code segments, each performing a particular function as the locator 412 advances leftward across a digital image above the text entry line searching for an obstruction. Referring to FIGS. 4B and 10, the locator 412 includes a skew detector 430, an obstruction identifier 432, a left boundary determinator 434, a left line gap processor 436, and a left search advancer 438.

Generally, skew detector 430 performs the functions shown in block 1001 to track a skewed horizontal line as it drifts vertically. Obstruction identifier 432 performs the functions shown in block 1015 to sum a predetermined number of columns and rows of pixels to accurately identify an obstruction. Left search advancer 438 performs the functions shown in block 1029 to advance the search leftward to the edge of the image. Left line gap processor 436 performs the functions shown in block 1041 to distinguish line gaps from the end of the line. The processing performed by each of these elements, preferably implemented as code segments, is described in detail below with reference to the flow chart of FIG. 10.

Subroutine 1000 is invoked at start block 1002 with the receipt of an $(X,Y_{BL})$ coordinate from a calling routine. The $(X,Y)$ coordinate is the $(X,Y_{BL})$ coordinate generated by the bottom line boundary locator 422 when called by both, the Type 1 and Type 3 routines.

The process performed by the skew detector code segment 430 is shown as block 1001. Code segment 430 determines whether the line is drifting and, if so, adjusts the search direction to follow the line in the direction in which it is drifting. The conditional checks performed in blocks 1006 and 1008 are symmetrical; 1006 identifies upward drift, 1008 identifies downward drift. Significantly, the skew detection code segment 430 does not test the pixels immediately surrounding the bottom line. Instead, it determines line drift by testing pixels that are relatively far from the current coordinate. In the preferred embodiment, the skew detection code segment 430 checks for two conditions: whether the pixel located at (X,Y−3) is black and whether the pixel located at (X,Y+2) is white. If these conditions are met, the line is skewed such that it is drifting upward as the search progresses leftward across the digital image. In such a case, processing advances to block 1010 wherein the value of the Y coordinate is decremented to follow the line upward. If it is determined that the line is not drifting upward, a similar process is performed in blocks 1008 and 1012 to determine whether the line is drifting downward, and if so, to track it accordingly.

As noted, in the preferred embodiment, the specific pixels tested to determine line drift are 3 above/2 below and 3 below/2 above the current pixel coordinate. The inventor has found that checking only these four values is a fast, accurate, and resource efficient method to determine vertical line drift. Note that if the line has drifted by two pixels rather than three at a particular distance from the current coordinate, the above routine will not detect the drift; however, should the line continue to drift in the same direction, the above routine will begin to track on it at three pixels of drift and adjust accordingly. This prevents the locator 430 from needlessly tracking minor deviations as the line drifts slightly in either or both directions. It should be noted, however, that other pixels may be tested in addition to or instead of those noted above in the preferred embodiment.

The obstruction identification code segment 432 sums a predetermined number of columns and rows of pixels to accurately identify a boundary, utilizing a novel recursive technique and repeated verifications to distinguish erroneous markings from a true obstruction. Specifically, the obstruction identification code segment utilizes the search array buffer 401, loading it with a 3 column array of pixel values for rows Y−3 through Y−$Y_{Above}$. The threshold value $Y_{Above}$ is a predetermined value representing the maximum distance above the line to search for an obstruction. Utilization of a multi-column buffer enables the present invention to efficiently distinguish actual obstructions from erroneous markings.

The selected range above the Y value of the current (X,Y) coordinate is three rows (Y−3) because a textual obstruction will be at least that far above the bottom line. Furthermore, this avoids incorrectly identifying pixels related to the line itself as an obstruction. The threshold value $Y_{Above}$ is a predetermined value representing the maximum distance above the line to search for an obstruction. In the preferred embodiment, $Y_{Above}$ is set to a constant value of 20 pixels. However, alternative values are contemplated and may be variable, user-defined or automatically determined based upon the same or different factors.

Furthermore, any number of columns may be used in search array 401 to support a desired level of sensitively appropriate to a particular application. As noted, the subroutine 1000 advances leftward in one-column increments from X to X−1. As this occurs, the pixels in the new column X−1 are summed at block 1016. That is, the pixels from (X−1,Y−3) to (X−1,Y−$Y_{Above}$) are summed and the resulting total is stored in the search array buffer at block 1018. The buffer has three fields, each assigned to a particular column, and each containing the summed value determined in block 1016.

Significantly, the present invention utilizes a search array buffer 401 containing a search array of pixel values when searching for certain obstructions. Utilizing a search array enables the present invention to consider many pixel values when determining whether an obstruction exists. As utilized by locator 412, multiple neighboring columns of pixels are tallied to distinguish dirt, smudges, and other erroneous markings from true obstructions such as a line or text.

In block 1020 the sum of all the pixel values in the current three columns is determined and the total number of black pixels is compared to a predetermined threshold value $Thresh_{Above}$, which is the minimum number of black pixels that must be in the three columns of pixels for an obstruction to be considered to exist.

Since the above process is based upon the assumption that the buffer contains three legitimate columns of pixel summation values, initially in block 1004 the sum for the first two columns (X+1,Y) and (X,Y) of the 3 column buffer were pre-computed. This results in the sum of pixel values from (Y−3) through (Y−$Y_{Above}$) for columns (X+1), (X), and (X−1) is accurately determined at block 1020 during the first iteration of process 1000.

If it is determined at block 1020 that the number of black pixels is greater than the predetermined threshold $Thresh_{Above}$, then an obstruction has been found and the search is halted. Processing continues at left boundary determinator code segment 434 wherein the process at block 1021 is performed to determine the left boundary of the selected text field.

At block 1022 the right most column, referred to as $X_{Black}$, in the three column search array that contains at least one black pixel is determined. In other words, $X_{Black}$ is the right-most column of the lefthand obstruction.

The left boundary determinator code segment 434 determines the left-side boundary as two columns to the right of the left-side obstruction, and returns the coordinate ($X_{Black}$+ 2, Y). The addition of two pixels sets the left-side boundary at 2 pixel columns to the right of $X_{Black}$, providing a gap between the user-entered text and the obstruction constituting the left-side boundary.

Above text entry line left boundary locator 412 also includes a left line gap processor 436, which performs the functions shown n block 1041. As the search continues left across the digital image, it progresses until the end of the line is reached. However, the line may be appear to have terminated for a number of reasons other than the search being at the end of the line. For example, there may be a gap in the line due to poor image quality from facsimile or photocopying. Left line gap processor 436 distinguishes a gap in the bottom line from the actual end of the line.

At block 1028, the left line gap processor code segment 436 determines whether the search has progressed left to the extent that there is no longer a horizontal line. In the preferred embodiment, a gap is identified by determining whether there are any black pixels along a vertical region extending from two pixels above the current Y coordinate to 2 pixels below. Thus, if any one of these pixels is black, then the line is continuing left beyond the current search point. Conversely, if all the pixels are white, then there is at least a gap in the line and possibly the line has ended.

If in block 1028 it is determined that the current position is potentially at a gap, then a left line gap identifier 425 is invoked at block 1030 to determine whether the white space is a gap. The left line gap identifier 425 is discussed in detail below with reference to FIG. 15. The left line gap identifier 425 returns a ($X_{Jump}$, $Y_{Jump}$) coordinate at which the search should continue. As will be discussed in detail below, the ($X_{Jump}$, $Y_{Jump}$) coordinate may be the same or different than the current (X,Y) coordinate.

Importantly, the left line gap processor 436 includes a number of verification processes to prevent the search from inadvertently continuing past the end of the line due to it falsely interpreting an erroneous marking as the continuation of the line after a gap. The first verification process is performed at conditional block 1032 wherein the value of the returned ($X_{Jump}$,$Y_{Jump}$) coordinate is tested. If the pixel at the returned coordinate ($X_{Jump}$,$Y_{Jump}$) is white, then the left line gap identifier subroutine has returned with the same coordinate as the current coordinate (described below), thereby indicating that the white space is not a gap and that the line does not continue. Processing then continues at return block 1046 wherein the (X,Y) coordinate is returned. If at conditional block 1032 it is determined that the pixel at the returned coordinate is black, then the white space is considered to be a gap and the returned coordinate is considered to be where the continuation of the bottom line begins.

In order to determine the complete line and to prevent the inadvertent continuation of the line beyond its ending coordinate, processing continues at block 1034 wherein the above text entry line left boundary locator function is repeated with a recursive call to itself.

Once the recursive procedure is completed, a second verification process is performed to verify that the next ($X_{Jump}$,$Y_{Jump}$) coordinate, referred to as ($X_{New}$,$Y_{New}$), represents a reasonable continuation of the line. That is, after jumping that gap, the left line gap processor follows the line for a reasonable distance to verify that it actually is part of the line and not misidentified noise. This is accomplished with a second validation test at conditional block 1038.

At conditional block 1038, the difference between $X_{Jump}$ and $X_{New}$ is compared with a predetermined threshold value, $X_{Continue}$, representing the minimum line length after the gap to be part of the same line. In the preferred embodiment, this value is set to zero so that any continuation is considered valid, thereby, effectively disabling this verification. However, it is understood that other threshold values may be used.

If the line after the gap was of sufficient length, then processing continues at block 1040 wherein the coordinate ($X_{New}$,$Y_{New}$) is returned. On the other hand, if the pixels after the gap were not of sufficient length to constitute continuation of the line, then it will be ignored and the current coordinate is considered to be the end of the line. In such a circumstance, the coordinate value (X,Y) is returned at return block 1046.

Search advance code segment 1029 advances the search leftward across the digital image in search of the left boundary or until the left edge of the image is reached. In block 1042, the X coordinate value is decremented, advancing the search leftward by a single column from X to X−1. In block 1044, it is determined whether this advancement has brought the search to the left edge of the digital image. If so, then the process returns the value at which it reached the edge of the image. Otherwise, the above routines are repeated, continuing testing new arrays of pixel values.

3. Above Text Entry Line Right Boundary Locator

The above text entry line right boundary locator 414 locates an obstruction above the text entry line to the right of the column in the bit-mapped image that contains the user-selected coordinate and, based on the location of the obstruction, determines the right-side boundary of the text field. As noted, the locator 414 is preferably a subroutine, called by the Type 1 and Type 3 field identifier routines 406 and 410. When invoked, the locator 414 is provided with the $(X, Y_{BL})$ coordinate, representing the pixel vertically below the user selected click point in the first row at which the bottom line was previously located. The locator 414 returns the coordinate $(X_{Right}, Y_{Right})$, representing the right-side boundary.

Figure 11:
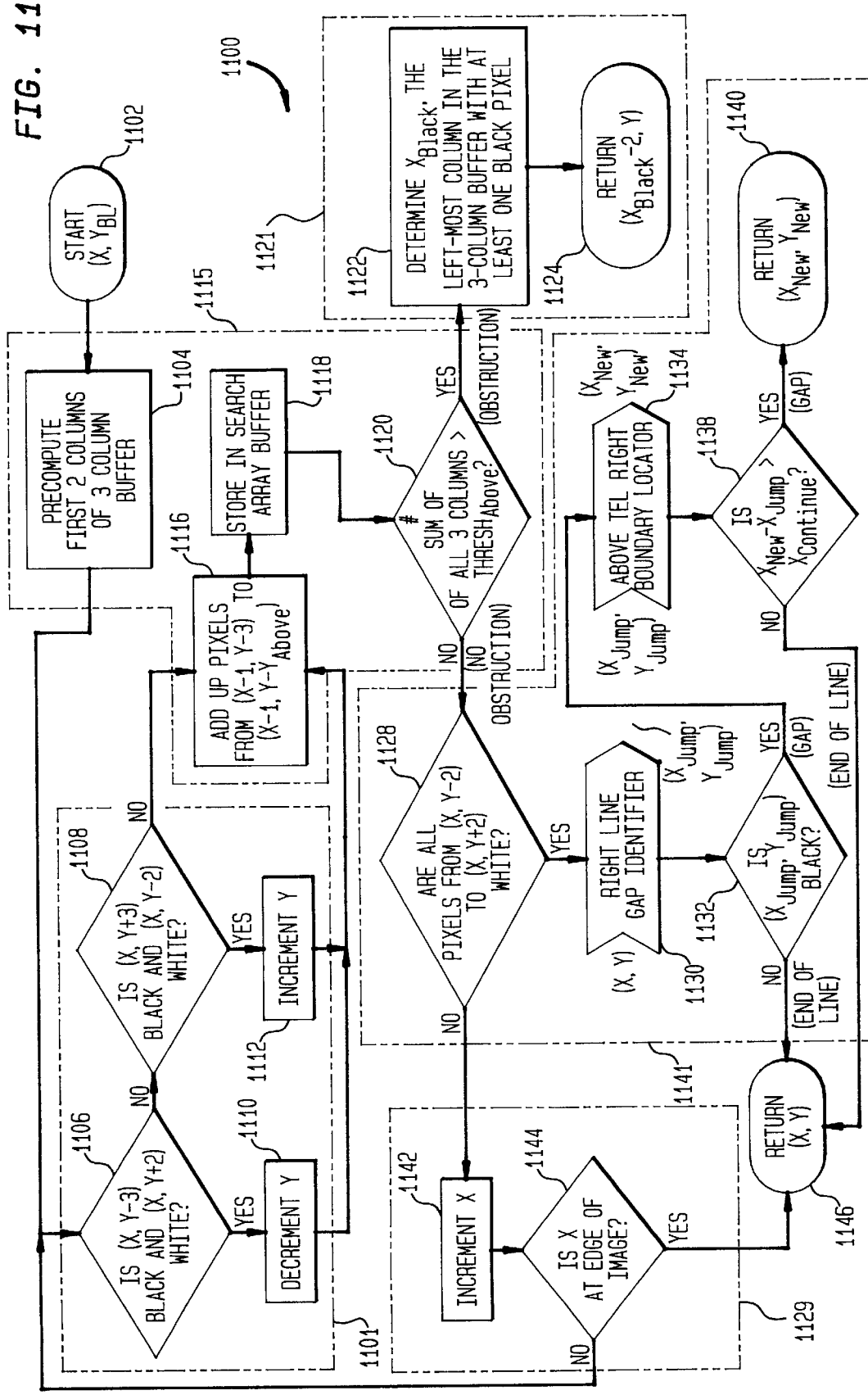
FIG. 11 is a flow chart of the functions performed by the above text entry line right boundary locator of the present invention.

Referring to FIG. 11, the above text entry line right boundary locator 414 includes a number of code segments, each performing a particular function as the locator 414 advances right across a digital image above the text entry line searching for an obstruction. Referring to FIGS. 4B and 11, the locator 414 includes a skew detector 440, an obstruction identifier 442, a right boundary determinator 444, a right line gap processor 446, and a right search advancer 448.

Except as noted below, these code segments perform the same functions as analogous code segment described above with reference to the above text entry line left boundary locator 412. In particular, right search advancer 448 increments the value of the X coordinate at block 1130 to advance the search right across the digital image. In addition, the right boundary determinator 444 subtracts two columns from the X coordinate of the right most column in the 3 column buffer in which an obstruction was located to place the right-side boundary 2 columns to the left of the obstruction.

4. Top Boundary Locator

The top boundary locator 420 searches upward from row containing the previously-located bottom line boundary $(Y_{BL})$ until it finds an obstruction in the form of either a horizontal line or text. As noted, the top boundary locator is preferably a subroutine called by the Type 1, Type 2 and Type 3, field identifier routines. The top boundary locator 420 is provided the endpoints of the bottom line boundary along the X axis $(X_{Left}$ and $X_{Right})$ and the Y coordinate $(Y_{BL})$ from which to start the upward search. The top boundary locator returns the Y coordinate of the first row at which the top boundary begins.

Figure 12:
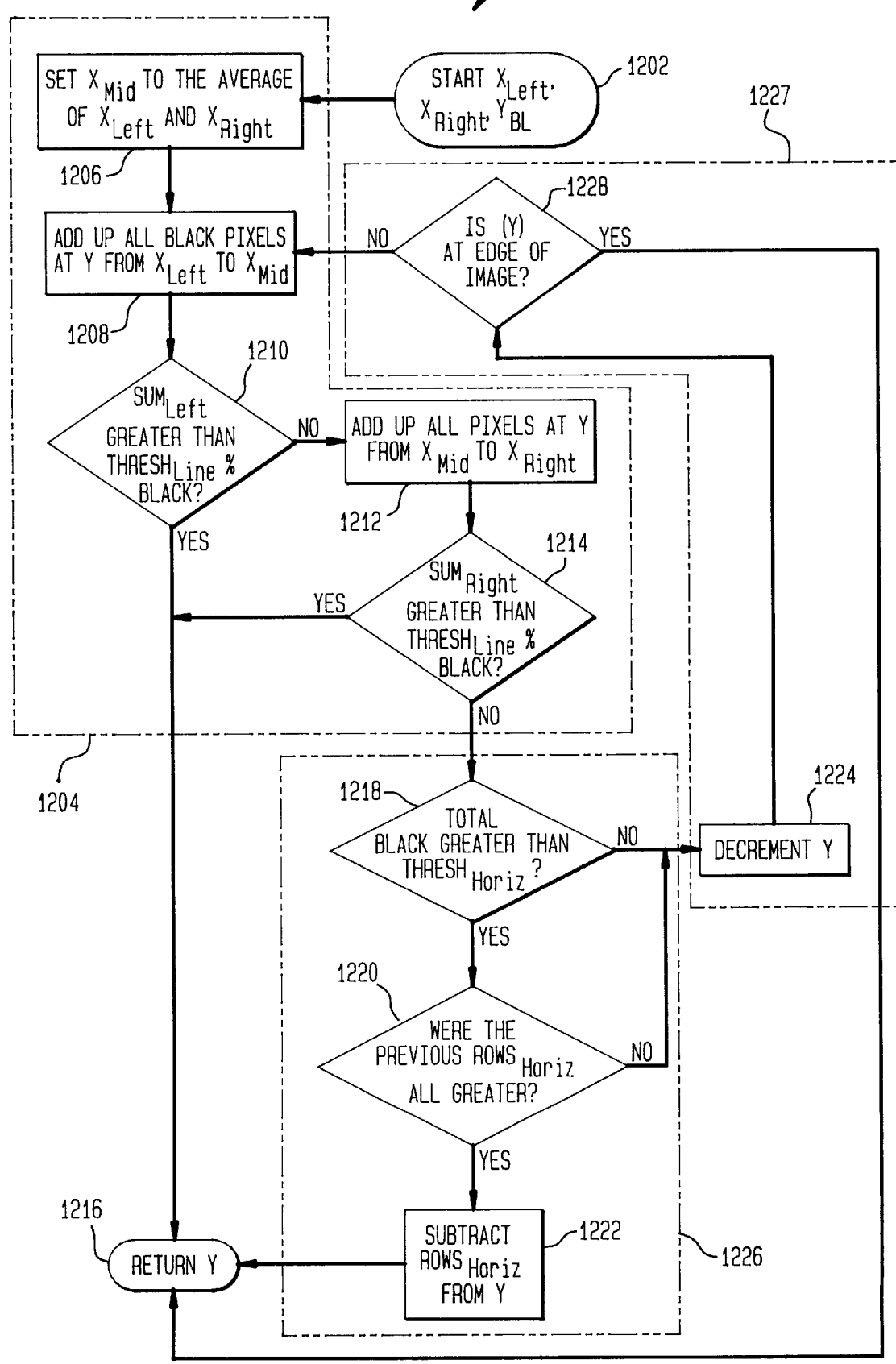
FIG. 12 is a flow chart of the functions performed by the top boundary locator of the present invention.

Referring to FIG. 12, the functions performed by locator 420 are shown in process flow chart 1200. Generally, locator 420 advances a search vertically upward for a predetermined distance, searching for an obstruction in the form of a substantially horizontal line or text. Significantly, the present invention utilizes two different obstruction identification techniques to identify line and text obstructions, each particularly suited for the associated obstruction type. For detection of line boundaries, the top boundary locator 420 includes a top line obstruction identifier 466, preferably implemented in a code segment performing the functions illustrated in block 1204. For detection of text boundaries, a text obstruction identifier 468 for performing the functions illustrated in block 1226 is also included. In addition, top boundary locator 420 includes an upward search advancer 470 performing the functions shown in block 1227 to advance the search upward to the edge of the image.

At start block 902, the coordinates of the bottom horizonal line endpoints, $(X_{Left}, Y_{Bottom})$ and $(X_{Right}, Y_{Bottom})$ are received. First, top line obstruction identifier 466 is performed to test each row of pixels to determine if the search upward has advanced to include a pixel row that includes a line. Significantly, the top line obstruction identifier 466 determines if an obstruction in the form of a horizontal line is found at a particular row of pixels utilizing a percentage threshold test of portions of the tested pixel row. This compensates for skewed lines and makes the process independent of text field length.

The top line obstruction identifier 466 compares the sum of pixel values with a predetermined threshold, $Thresh_{Line}$ %, which is the percentage of pixels that must be black for a row of pixels to be considered to contain a line obstruction. However, if such a line obstruction exists, it may be skewed. Under such circumstances, the mere summation of the pixel values of a long row may mistakenly miss the line since by definition a fewer number of pixels will be located in a single pixel row.

To overcome this potential problem, the test is conducted on separate portions of the row to increase the percentage of pixels of a skewed line that will be in a single row of pixels. If there is any skew along the line, addressing the line in portions increases the likelihood of identifying the skew.

When conducting the above search the present invention selects the portions of the line so as to begin and end on an 8-bit boundary to take advantage of the fact that bilevel images store eight pixels per byte. Because the raster is a bilevel bitmap, the scanning procedure can examine a multi-bit byte of data with each instruction cycle, accelerating the scanning by a factor of eight as compared with pixel-by-pixel examination. However, if an endpoint is not on an 8-bit boundary, the per-byte routine is still used up to the nearest included boundary, and the remaining pixels are then examined on a per-pixel basis. In the preferred embodiment of the present invention, the pixel row is divided in half. Thus, in block 1206, the middle pixel of the row, referred to as $(X_{Mid}, Y)$, is determined.

In blocks 1208 and 1210, the top line obstruction identifier 466 tests the left portion of the current pixel row to determine if it contains a sufficient percentage of black pixels for the tested row of pixels to be considered to include a line. In block 1208 the pixels are summed at row Y from $X_L$ to $X_{Mid}$. This value is converted to a percentage of the total pixels in the left portion of the row, $Sum_{Left}$, and, in block 1210, compared to a threshold value, $Threshold_{line}$, representing the requisite percent of black pixels for an obstruction to be considered a line.

If there are an insufficient number of black pixels, the same process is repeated for the right portion of the current pixel row in blocks 1212 and 1214. If it is determined that either the left or right portions of the row contain a line, then processing continues at return block 1216, wherein the Y value of the that row is returned.

If there is not a sufficient percent of black pixels in the tested pixel row to constitute a line obstruction, a text obstruction identifier code segment 468 is invoked to test the row to determine if it includes an obstruction in the form of text. The functions performed by the text obstruction identifier code segment 468 is shown in block 1226 of FIG. 12.

In block 1218 the total pixel value of the tested row is compared with a predetermined threshold value, Threshold$_{Horiz}$, which is the minimum number of pixels in a row that would be sufficient to categorize the row as containing the beginning of a text obstruction. In the preferred embodiment, Threshold$_{Horiz}$ is set to a constant value of 8 pixels. However, it would be apparent to those skilled in the art that other values may be used appropriate for a particular application.

If there is no textual obstruction, then upward search advancer 470 advances the search to the next row. In code segment 1227, block 1224, Y is decremented and the search progresses upward, unless it is determined at block 1228 that the top edge of the image has been reached, at which time the Y value is returned at Block 1216.

Importantly, the text obstruction identifier 468 does not accept the results of the test at block 1218 as the sole criteria in determining a text obstruction. In addition to the current row of pixels having the necessary number of black pixels to constitute a text obstruction, if an obstruction is identified, the present invention determines if it is a true obstruction by considering its length. Thus, in block 1220, a predetermined number of previously-tested rows are considered together to determine if the obstruction has continued for a sufficient number of rows to guarantee that the obstruction is not an erroneous marking, but is indeed text.

An additional advantage of the present invention is the utilization of a constant pixel value as the criteria upon which to determine if an obstruction is included in the row. A fixed number of black pixels causes the identifier 468 to stop on a label regardless of its length, while enabling it to ignore noise. In the preferred embodiment of the present invention, the value of Rows$_{Horiz}$ is set to a constant value of 3. Thus, the present invention considers three rows, each having at least 8 black pixels, to be an obstruction. In such a case, processing proceeds to block 1222 wherein the value Y coordinate associated with the first (lowest) row containing the text obstruction is calculated and subsequently returned in return bock 916.

5. Below Text Entry Line Left Boundary Locator

The below text entry line left boundary locator 416 locates an obstruction to the left of the user-selected coordinate below the text entry line and, based on the location of the obstruction, determines the left-side boundary of the field. As noted, the locator 416 is preferably a subroutine, called by the Type 2 and Type 3 field identifier routines 408 and 410. When invoked the locator 416 is provided with the (X,Y$_{BL}$) coordinate. The locator 416 returns (X$_{Left, YLeft}$) representing the left-side boundary.

Figure 13:
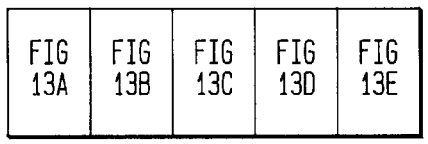
FIGS. 13A–13E are a flow chart of the functions performed by the below text entry line right boundary locator of the present invention.
Figure 13A:
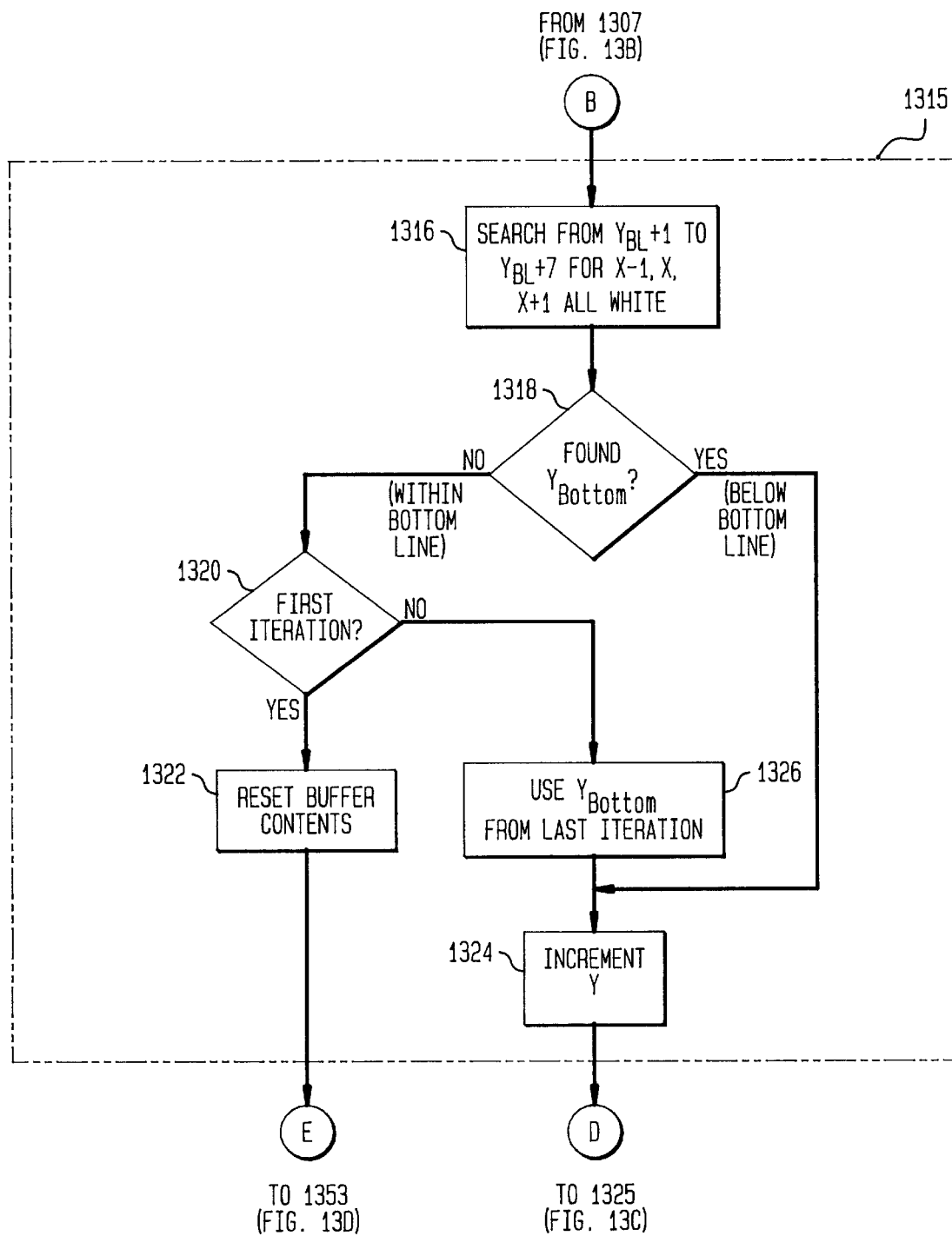
Figure 13B:
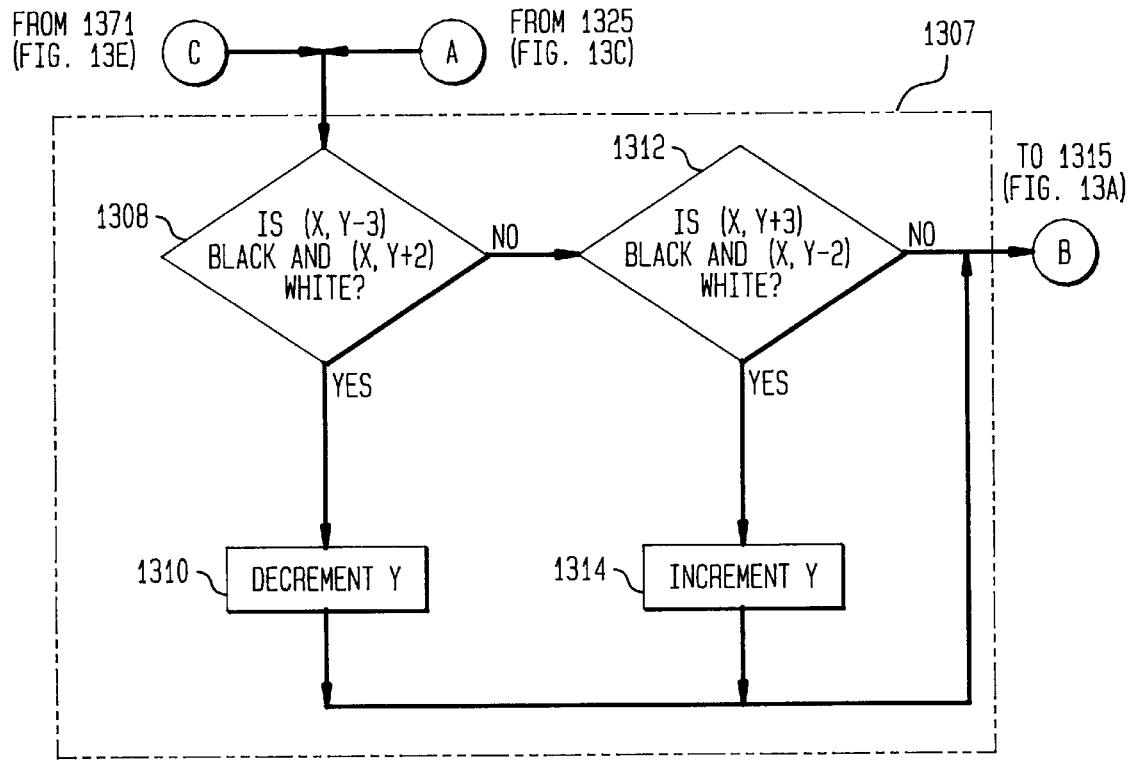
Figure 13E:
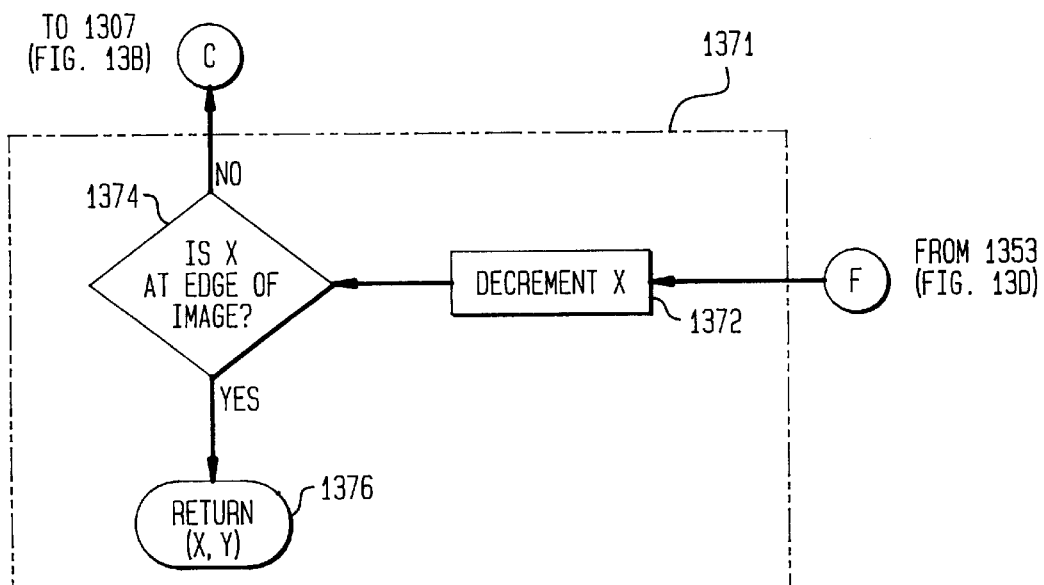
Figure 13D:
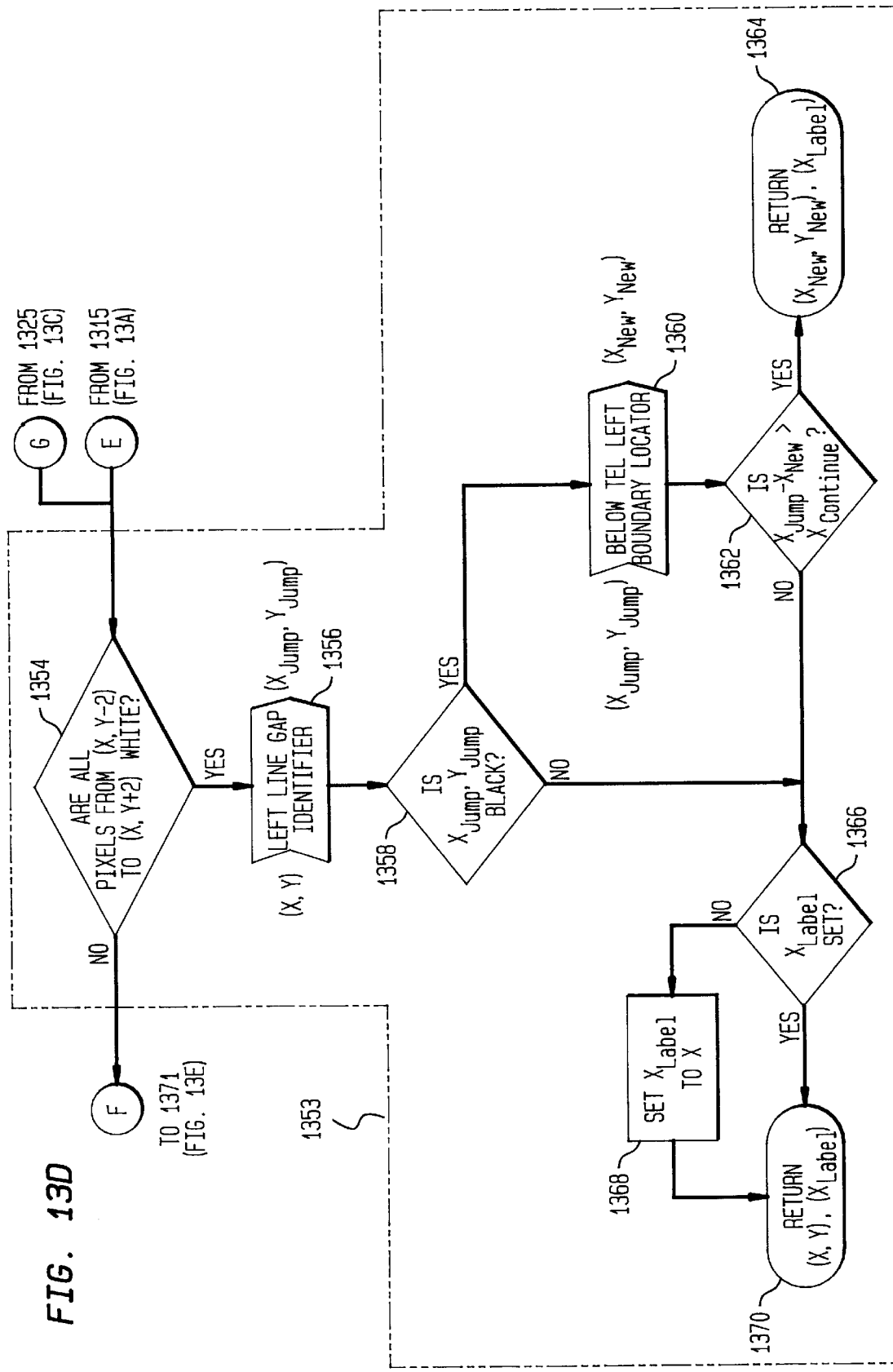

Referring to FIGS. 4B and 13–13E, the below text entry line left boundary locator 416 includes a number of code segments, each performing a particular function as the locator 416 advances leftward across a digital image below the text entry line searching for an obstruction. The locator 416 includes a skew detector 450, a text and line obstruction identifier 452, a search array determinator 454, and a left search advancer 456.

Significantly, the below text entry line left boundary locator 416 also detects the right edge of the label. Type 3 field identifier 410 makes use of this value by substituting it for X$_{Left}$ under certain conditions. Locator 416 returns two X-values: one marks the normal boundary (X$_{Left}$) and the other marks the right edge of the label (X$_{Label}$). The calling routine decides which return value to use. The Type 2 routine, for example, ignores the right edge of the label while Type 3 chooses between X$_{Left}$ and X$_{Label}$ based on the click point, X. Thus, if the user selects a point below the label, the present invention will establish a text field that extends below the label to the left-side vertical wall. On the other hand, if the user selects a point that is adjacent to the label, then the present invention will establish text field that extends to the left-side of the label.

Generally, skew detector 450 performs the functions shown in block 1307 to track a skewed horizontal line as it drifts vertically. Text and line obstruction identifier 460 performs the functions shown in block 1325 to sum a predetermined number of columns and rows of pixels to accurately identify an obstruction. Left search advancer 456 performs the functions shown in block 1371 to advance the search leftward to the edge of the image. Search array determinator 462 performs the functions shown in block 1315 select the array of pixels used to perform the test. The processing performed by each of these elements, preferably implemented as code segments, is described in detail below with reference to the flow chart of FIG. 13.

Subroutine 1300 is invoked at start block 1302 with the receipt of an (X,Y) coordinate from a calling routine. The (X,Y) coordinate is the (X,Y$_{BL}$) coordinate generated by the bottom line boundary locator 422 when called by both, the Type 2 and Type 3 routines.

As noted, skew detector 450 performs the functions shown in block 1307 to track a skewed horizontal line as it drifts vertically. The process performed by the skew detector code segment is shown as block 1307. Code segment 450 determines whether the line is drifting and, if so, adjusts the search direction to follow the line in the direction in which it is drifting. Skew detector 450 includes blocks 1308–1314, and performs the similar functions to those performed by skew detector 430 described above.

Search array determinator 454 establishes the starting point of the leftward search for an obstruction below the previously located bottom line. The search array determinator performs the functions shown in block 1315 to select an array of pixels below the bottom line such that a sufficient number of pixels are included in the search array to test for both text and line boundaries.

The search array determinator 454 skips over the bottom line so as to exclude it from the search array thereby eliminating the need to compensate for it. At block 1316, search array determinator 454 searches downward across 3 columns from the first row at which the bottom line was located, (X,Y$_{Bottom}$), for a completely blank line. The search array determinator 454 searches the 3 column search array from row (Y$_{BL}$+1) to row (Y$_{BL}$+7) for a row than contains three white pixels. This is considered to be the first pixel row below the horizontal bottom line, and is referred to as Y$_{Bottom}$.

At block 1318 the search array dterminator determines if Y$_{Bottom}$ was found within the 7 rows to which it limited the search in block 1316. If so, then at block 1324 the Y coordinate is incremented, increasing the distance between the current coordinate and the bottom line. This is because if the obstruction is a label, then it will be at least this distance below the bottom line. In addition, it will prevent pixels related to the bottom line from being misinterpreted as an obstruction during the search.

If Y$_{Bottom}$ is not found at block 1318, processing continues at block 1320 wherein it is determined whether this is the first iteration of the routine. If it is, then the search array buffer is set to zero at block 1322. If not, then in block 1326 the same Y$_{Bottom}$ is used as in the previous iteration to robustly recover from a temporary inability to track the bottom line. Once Y$_{Bottom}$ is determined, at block 1324 the Y coordinate is incremented.

Text and line obstruction identifier 452 performs the functions in block 1325 shown in FIG. 13C. Significantly, identifier 452 tests for both, textual as well as vertical line obstructions. This ability to detect both types of obstructions enables to present invention to explore the TEL beyond the test label while halting exploration if a line is detected. This is necessary to properly identify multiple-word labels and yet not waste time searching past lines.

At block 1327 the summation of pixel values from $(X-1,Y_{Bottom})$ to $(X-1,Y_{Bottom}+Y_{Below})$ is determined. $Y_{Bottom}$ is the second clear row of pixels below the bottom line, as determined above in processing block in 1315 by the search array determinator 454. $Y_{Below}$ is the distance below the bottom line to which the search for an obstruction should extend. In the preferred embodiment of the present invention, $Y_{Below}$ is set to a constant value of 30 pixels. However, as would be apparent to one skilled in the art, other values may be used.

To determine whether an obstruction in the form of a vertical line exists at the current X−1 column, at block 1328 the percent of black pixels is compared with a predetermined value, referred to as $Thresh_{Line}$ %. $Thresh_{Line}$ % is the percentage of pixels that must be black for the column to be considered to include a line. In the preferred embodiment of the present invention, $Thresh_{Line}$ % has a value of 75%, however any value may be used appropriate for a given application.

If the row from $(X-1,Y_{Bottom})$ to $(X-1,Y_{Bottom}+Y_{Below})$ does not include a vertical line, then at block 1330 the identifier 452 stores the resulting total in a 3 column buffer. However, if in block 1328 it is determined that an obstruction in the form of a vertical line is at column X−1, then processing continues at block 1340 wherein it is determined whether the right edge of the text label, $X_{Label}$, has been previously located. If $X_{Label}$ has been determined, then the search has advanced under the label, and the text field will advance to the vertical wall boundary. The returned coordinate is set to X+1, placing the boundary 2 columns to the right of the vertical line (detected at column X−1) to avoid text that will be entered into the text field to appear to overlay with the vertical line boundary.

If in block 1340 it is determined that $X_{Label}$ was not yet determined, then a vertical line obstruction has ben located prior to a text obstruction, indicating that the Type 3 text field does not have a label in the box. In such a case, the value of $X_{Label}$ is set equal to the value of the current coordinate plus 1, making it the same as the left boundary determined above.

Returning to block 1330, once no vertical line obstruction was found in block 1328 and the value of the pixels stored in block 1330, then in block 1332 the pixel values of all three columns of the search array are summed and the number of black pixels is compared to a predetermined threshold value $Thresh_{Below}$, which is the minimum number of black pixels that must be in the three column search array for an obstruction to be considered to exist.

In the preferred embodiment of the present invention, $Thresh_{Below}$ is set to a constant value of 10 pixels, although other values may be appropriate in other embodiments. Since the above process is based upon the assumption that the buffer contains three legitimate column summation values, initially in block 1304 the sum for the first two columns (X+1,Y) and (X,Y) of the 3 column buffer were precomputed. Thus, in block 1332, the sum of pixel values from (Y−3) through $(Y-Y_{Above})$ for columns (X+1), (X), and (X−1) is accurately determined in the first iteration.

If an obstruction was found at block 1332, then processing continues at block 1334, wherein the obstruction at the row X−1 is compared with that at X+1. If the minimum number of black pixels in X+1 was insufficiently large to constitute an obstruction, then $X_{Label}$ is set to X+1 indicating the column of the right edge of the label. If an obstruction was not found in the search array columns at block 1332 then processing continues at block 1338 wherein a number of prior columns are tested to determine if they contained a label. This value, referred to as $X_{Text}$, is the minimum number of columns for a text label. In the preferred embodiment, $X_{Text}$ is set to 4 columns, although other values may be used. Thus, if in block 1332 it is determined that a text obstruction (a label) does not exist, and in 1338, an obstruction did exist for at least $X_{Text}$ columns to the right of the current X−1 column, then this is considered to be the left side of the label obstruction.

If at block 1332 it is determined that there is no label located at the 3 columns X+1, X, and X−1, and at block 1338 it is determined that there was no label before that (at X+2, X+3 . . . ), then the left line gap processor 455 and left search advancer 456 are invoked (discussed below).

If at block 1338 it is determined that the search has advanced to include an indication of a label in the search array buffer, processing continues at block 1346 wherein it is determined whether the obstruction existed in the previous column when the search array included the pixel columns X+3, X+2, X+1. If so, then the value $(X_{Edge},Y_{Edge})$ is set to the current coordinate indicating the left edge of the label.

Thus, $(X_{Edge}, Y_{Edge})$ is set every time an obstruction is detected twice in a row; that is, when block 1332 branched this time (X) and also last time (1346, X+1). This way, a second obstruction may be detected when block 1332 branches but block 1346 branches . It is known that this is not the first obstruction because block 1338 branched, so at one time previously we had found a label. Therefore, in block 1350, it is determined if the new obstruction is merely a continuation of this label (multiple words, small gap in between) or a completely different label, simply by testing the distance between them against $X_{Text-Gap}$, the minimum distance required to separate labels. The values $(X_{Edge}, Y_{Edge})$ are preserved so that it may be returned after exploration beyond the proper left boundary.

Below text entry line left boundary locator 416 also includes a left line gap identifier 455. The functions performed by left line gap identifier 455 are shown in block 1353 of FIG. 3. Except as note below, left line gap identifier 455 performs the same functions as left line gap processor 436 described above. In particular, the left line gap identifier 455 includes additional steps 1368, 1366 and 1370, ensuring that $X_{Label}$ receives a valid value even when the left edge of the box does not exist, and the line simply terminates.

Left search advancer 456 performs the steps shown in block 1371 to advance the search left across the digital image by decrementing the value of the X coordinate at block 1372. At block 1374 it is determined whether the search has advanced to the edge of the image. If so, the search returns the (X,Y) coordinate at block 1376. Otherwise, the above process is repeated at the skew detection process 1307.

6. Below Text Entry Line Right Boundary Locator

The below text entry line right boundary locator 418 locates an obstruction below the text entry line to the right of the bit-map column containing the user-selected coordinate and, based on the location of the obstruction, determines the right-side boundary of the text field. As noted, the locator 418 is preferably a subroutine, called by the Type 2 and Type 3 text field identifier routines 408 and 410. When invoked the locator 418 is provided with the $(X,Y_{BL})$ coordinate. The locator 416 returns ($X_{Right}$, $Y_{Right}$) representing the right side boundary.

Figure 14B:
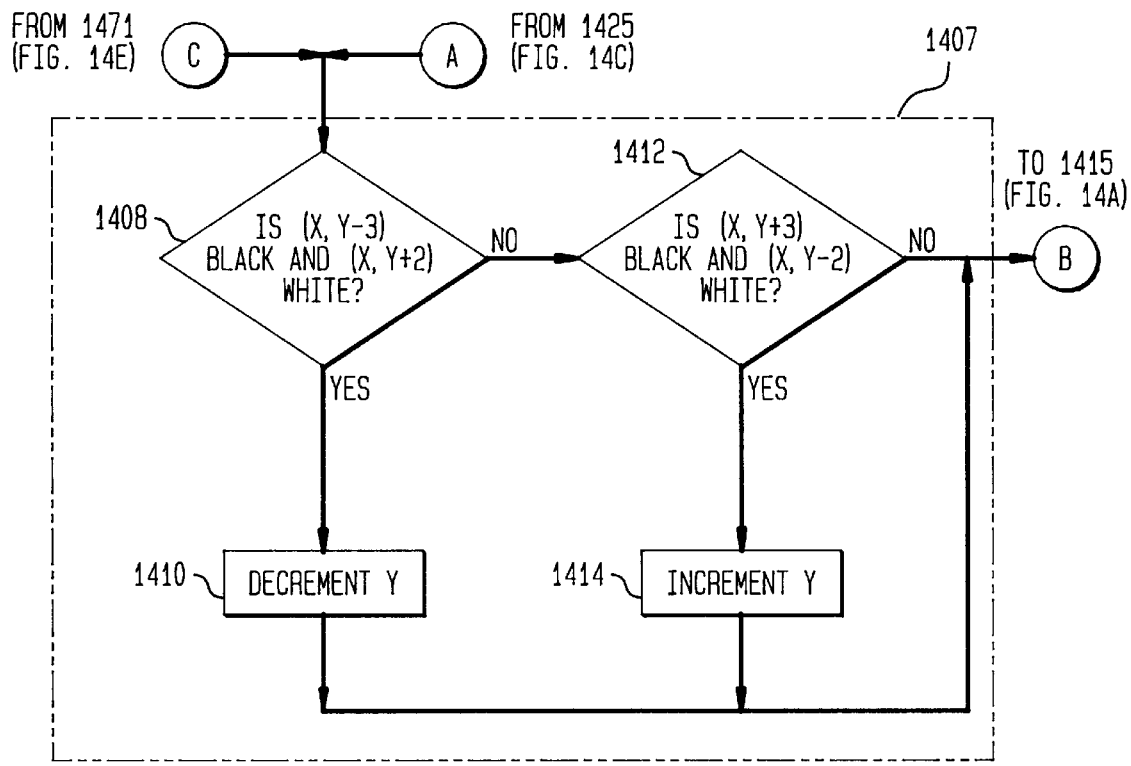
FIG. 14–14E are a flow chart of the functions performed by the below text entry line left boundary locator of the present invention.
Figure 14E:
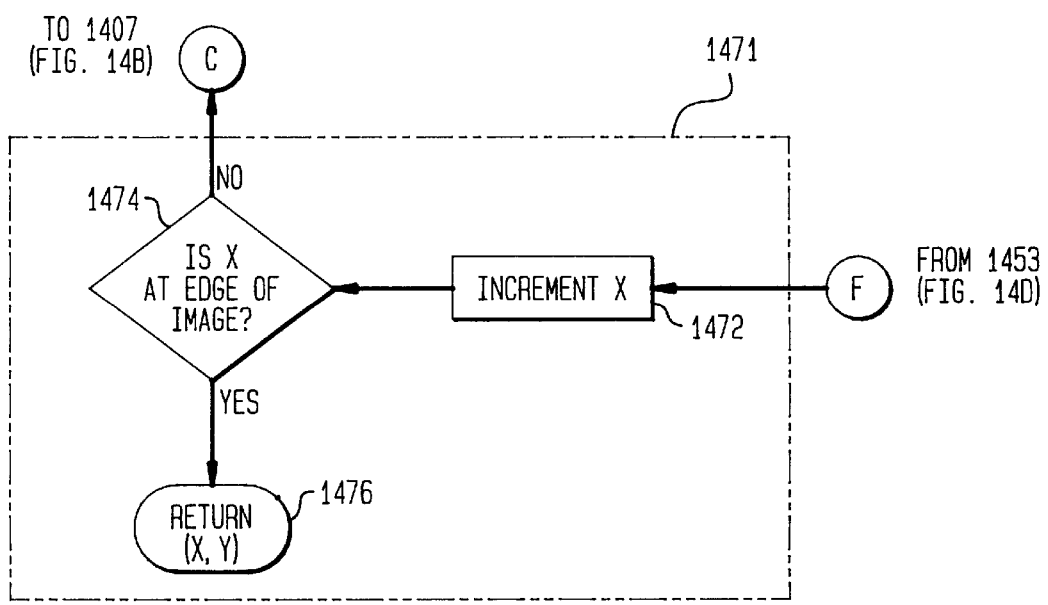
Figure 14D:
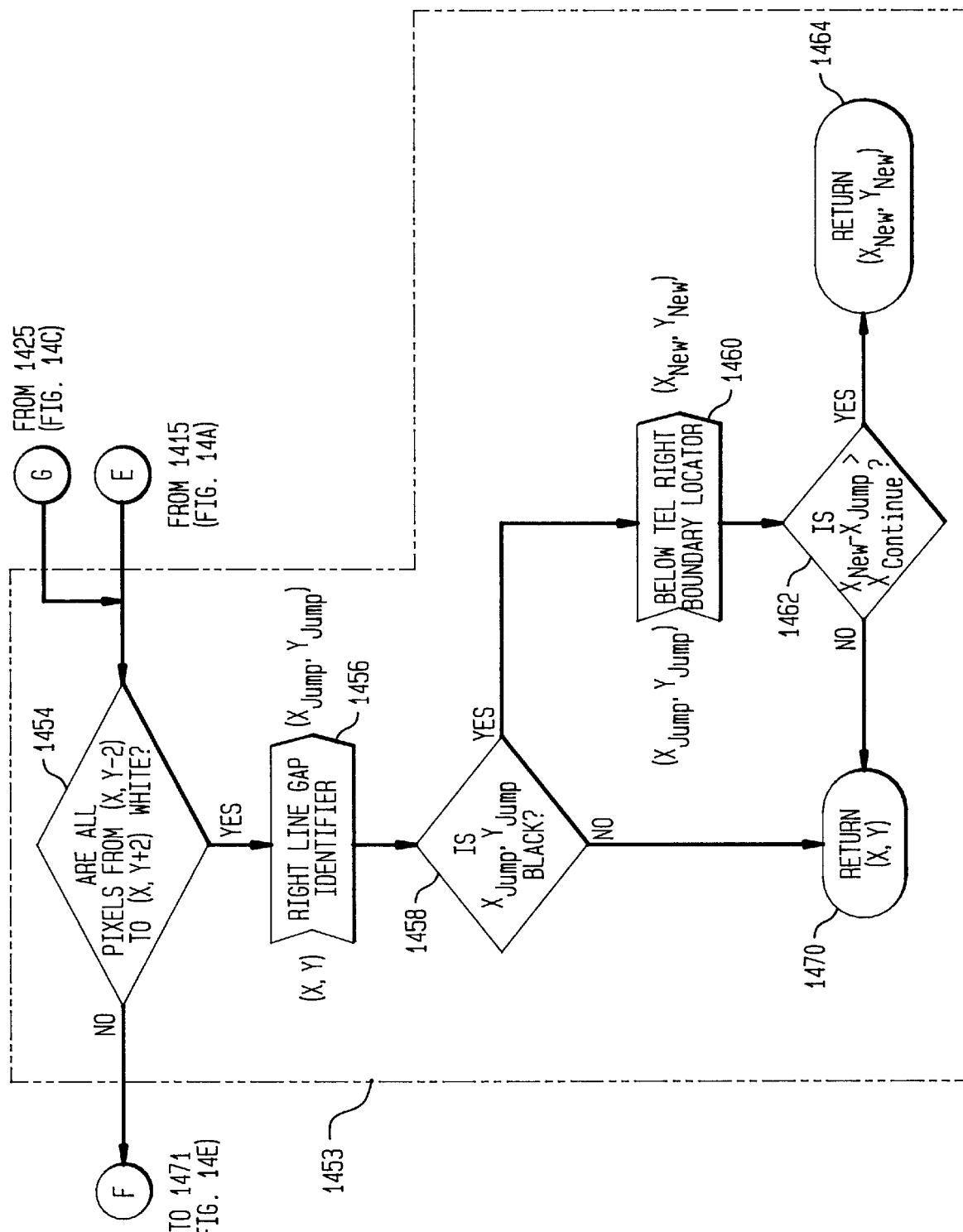

Referring to FIGS. 4B, and 14–14E, the below text entry line right boundary locator 416 includes a number of code segments, each performing a particular function as the locator 416 advances right across a digital image below the text entry line searching for an obstruction. The locator 418 includes a skew detector 458, a text and line obstruction identifier 460, a search array determinator 462, a right line gap processor 463, and a right search advancer 464.

The below text entry line right boundary locator 418 searches right across the digital image below the previously-located bottom line boundary until it finds an obstruction in the form of a horizontal line. Except as note below, the functions performed by this locator are analogous to the functions performed by the below text entry line left boundary locator described above.

At block 1472, the value of the X-coordinate is incremented rather than decremented. In addition, the $X_{Label}$ value defaults to the left boundary if no label is located. Thus, this value is set at block 1340 and 1342 for which there is no analogous functions performed by locator 418.

The search order for obstructions and clear space is reversed. In locator 416, the clear space is ignored until an obstruction is located. The obstruction was required to be at least $X_{Test}$ columns wide, and then the locator looked for $X_{Test-Gap}$ columns of clear space to signal the end of the label. In locator 418 on the other hand, the clear space is counted first. If an obstruction is located after $X_{Test-Gap}$ columns of clear space (step 1436), the search is halted. If $X_{Test-Gap}$ columns are not found before an obstruction, it is assumed that the clock point is below the label, so $X_{Test}$ columns of obstruction is tested for to ensure it is a bale and not dirt. At the end of the obstruction $X_{Label}$ is set (step 1450) and searching is resumed for $X_{Test-Gap}$ columns of clear space. If another obstruction is found sooner than $X_{Test-Gap}$, it is considered to be part of the same (multi-word) label, and $X_{Label}$ is reset at its terminus.

At blocks 1456 and 1460, the Right Line Gap Identifier is called instead of the Left Line Gap Identifier. At block 1462, the value of $X_{New}-X_{Jump}$ is tested to preserve the positive sign.

7. Left Line Gap Identifier

The left line gap identifier 425 distinguishes a gap in a line from the actual termination of the line by searching the vicinity of a discontinuity for a continuation of the line. As noted, the identifier 425 is preferably a subroutine, called by other subroutines that follow the text entry line while searching left across the digital image. The identifier 425 is invoked when, during the following of the bottom line, the calling subroutine determines that there are white pixels in an area above, adjacent, and below the anticipated line. When invoked, the identifier 425 is provided with the current (X,Y) coordinate where upon the column of white pixels is located. The identifier 425 returns the coordinate ($X_{Test}$, $Y_{Test}$), representing the point at which the calling subroutine should continue the search, and is thus referred to as ($X_{Jump}$, $Y_{Jump}$) in the calling subroutines. If the coordinate ($X_{Test}$, $Y_{Test}$) is a white pixel, then the identifier did not find a continuing line in the vicinity and the line is consider to have terminated. However, if the identifier returns a coordinate of a black pixel, then the white pixel(s) are considered a gap, and the line continues at the returned coordinate.

Figure 15:
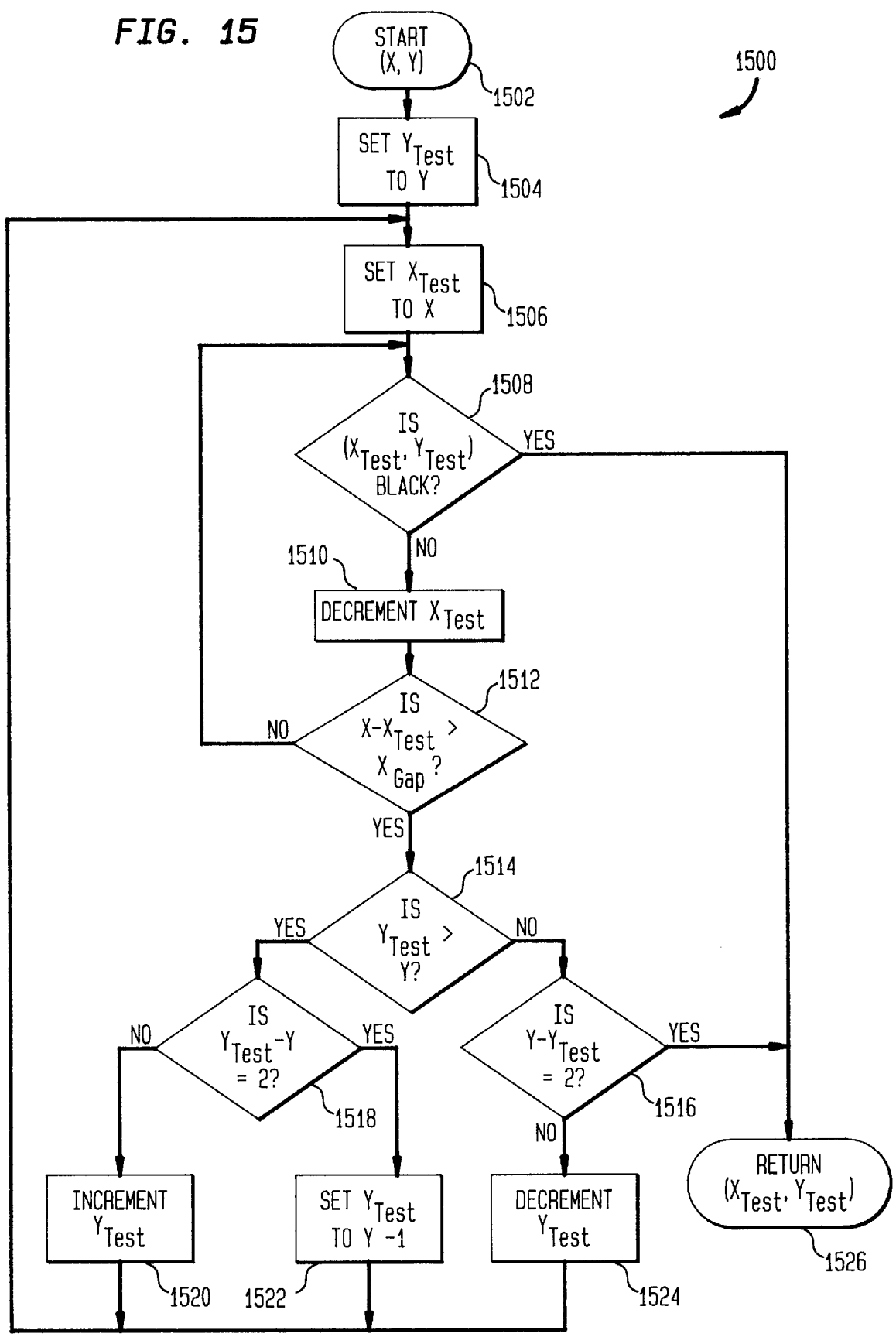
FIG. 15 is a flow chart of the functions performed by the left line gap identifier of the present invention.

Referring to FIG. 15, the left line gap identifier 425 starts upon receipt of the current (X,Y) coordinate at start block 1502. At blocks 1504 and 1506 variables $Y_{Test}$ and $X_{Test}$ are set equal to the received Y and X coordinate values for future use.

In condition block 1508 the pixel value at the ($X_{Test}$, $Y_{Test}$) coordinate determines whether the pixel is black. If not, the value of $X_{Test}$ is decremented at block 1510. If in block 1512 it is determined that the distance from the starting coordinate is less than the maximum number of pixels for a gap in the same line, referred to as $X_{Gap}$, then the search continues left until a black pixel is identified at block 1508, and subsequently returned at return block 1526.

After the row has been searched for the continuing line, processing continues at conditional block 1514–1524 to perform the above search for the two rows above and the two rows below the current coordinate, and for each of these rows, the identifier 425 will search out to the constant $X_{Gap}$ limit.

8. Right Line Gap Identifier

The right line gap identifier 424 distinguishes a gap in a line from the actual termination of the line by searching the vicinity of a discontinuity for a continuation of the line. As noted, the identifier 424 is preferably a subroutine, called by other subroutines that follow the text entry line as they search right across the digital image. The identifier 428 is invoked when, during the following of the bottom line, the calling subroutine determines that there are white pixels in an area of pixels above, adjacent, and below the anticipated line. When invoked the identifier 428 is provided with the current (X,Y) coordinate where upon the column of white pixels is located. The identifier 428 returns the coordinate ($X_{Test}$, $Y_{Test}$), representing the point at which the calling subroutine should continue it search, and is thus referred to as ($X_{Jump}$, $Y_{jump}$) in the calling subroutines.

Figure 16:
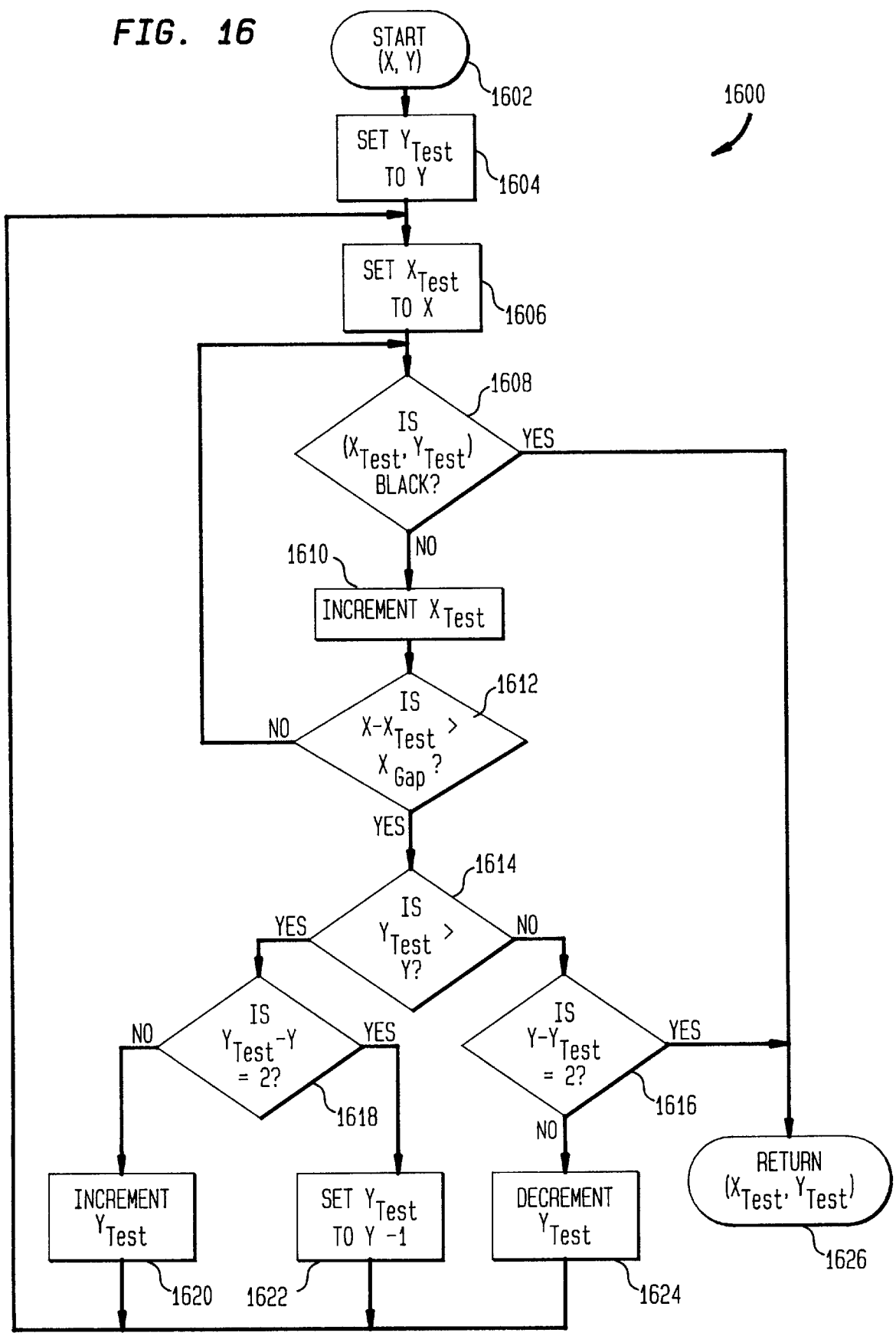
FIG. 16 is a flow chart of the functions performed by right line gap identifier of the present invention.

Referring to FIG. 16, the right line gap identifier 424 performs similar functions to the left line gap identifier 425, except that the search advances right rather than left.

9. Textbox Top Boundary Locator

The textbox top boundary locator 421 locates a line obstruction above the user-selected coordinate. As noted, the locator 421 is preferably a subroutine, called by the Type 3 text field identifier routine 410. When invoked the locator 421 is provided with the (X,Y) coordinate and returns a Y coordinate value, $Y_{TL}$.

Figure 18A:
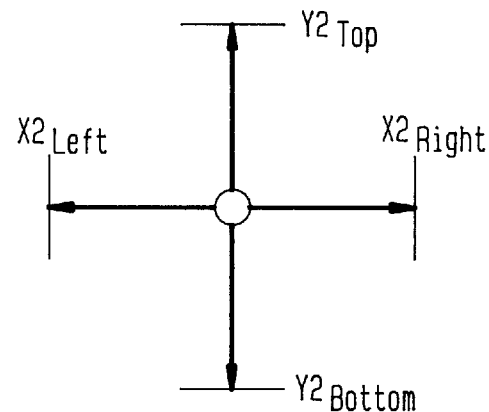
FIGS. 18A and 18B illustrate the searching performed by the checkbox field identifier.
Figure 18B:
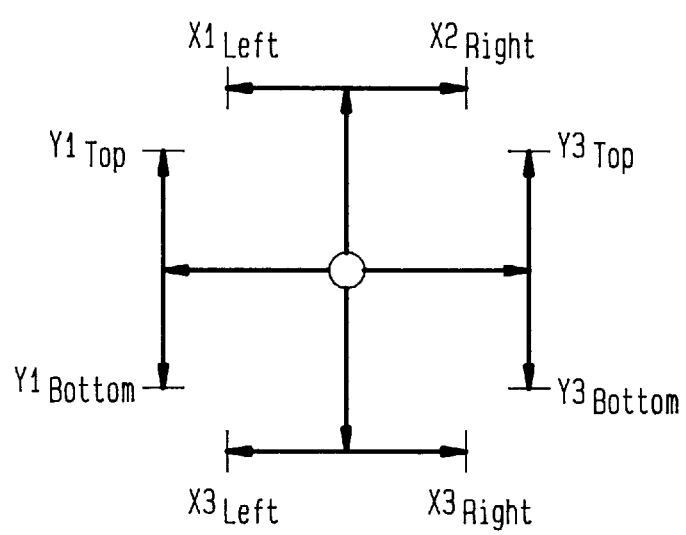
Figure 19A:
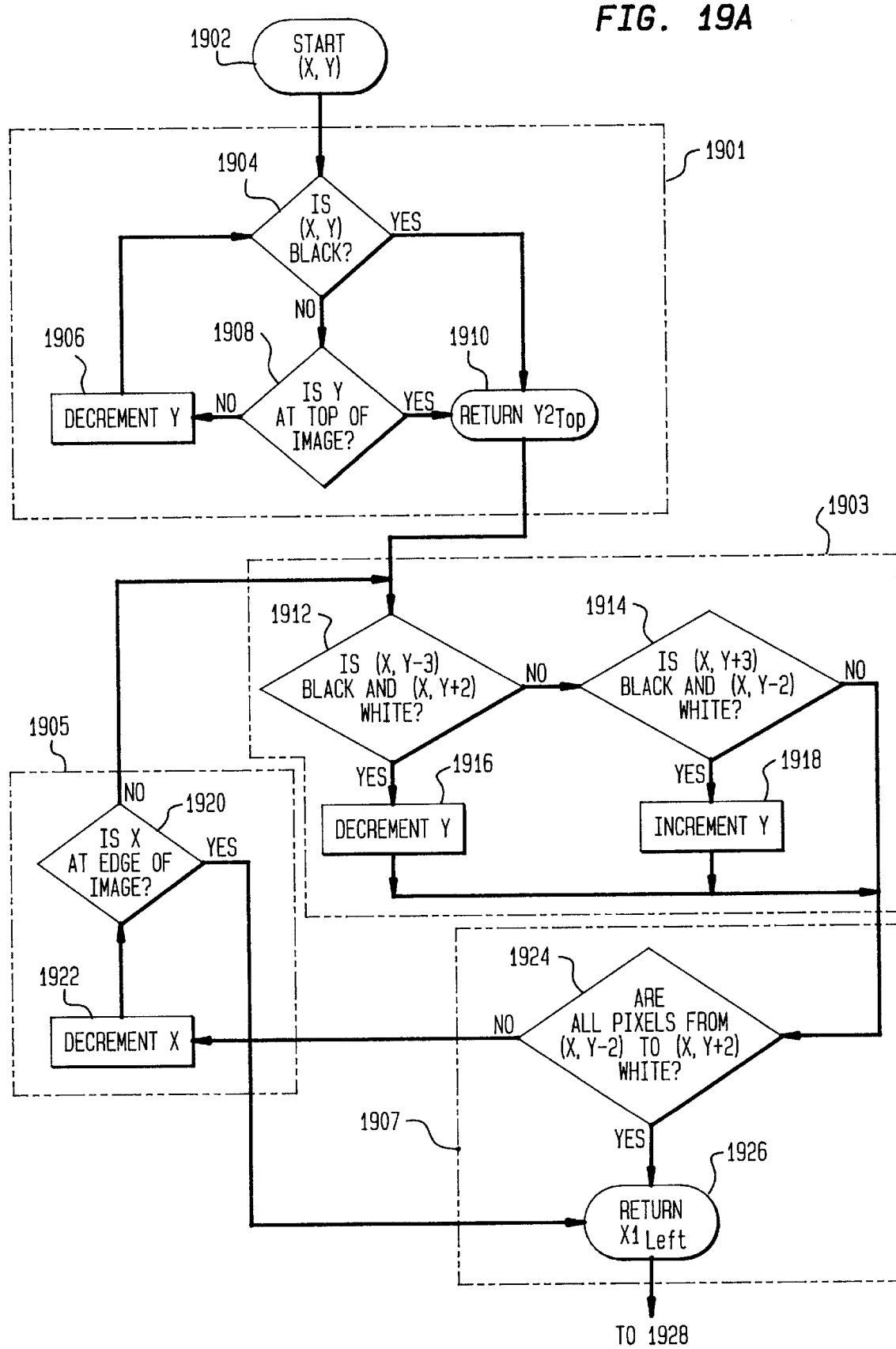
FIG. 19A and 19B are a flow chart of the functions performed by the checkbox top boundary locator of the present invention.
Figure 19B:
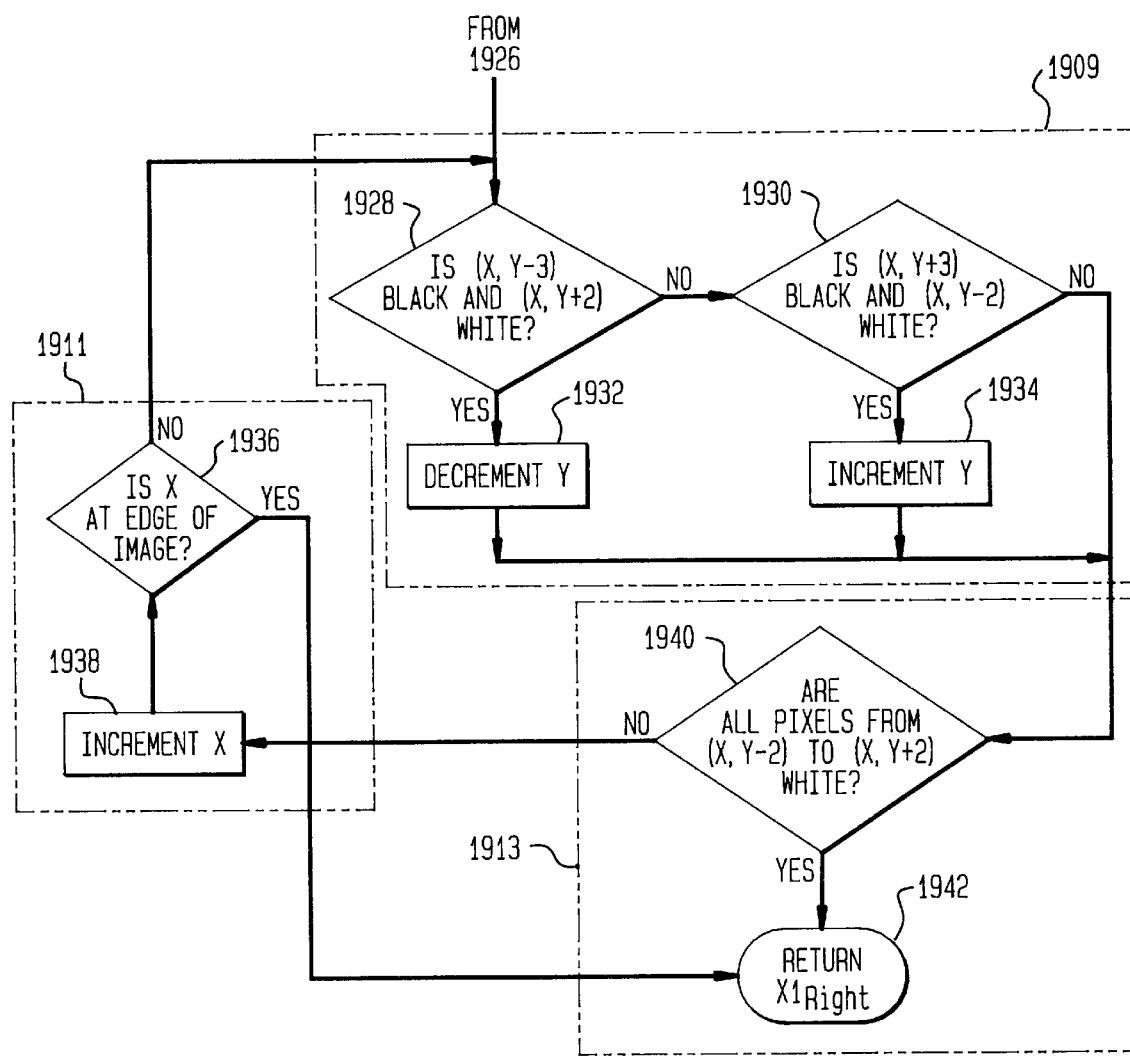
Figure 20A:
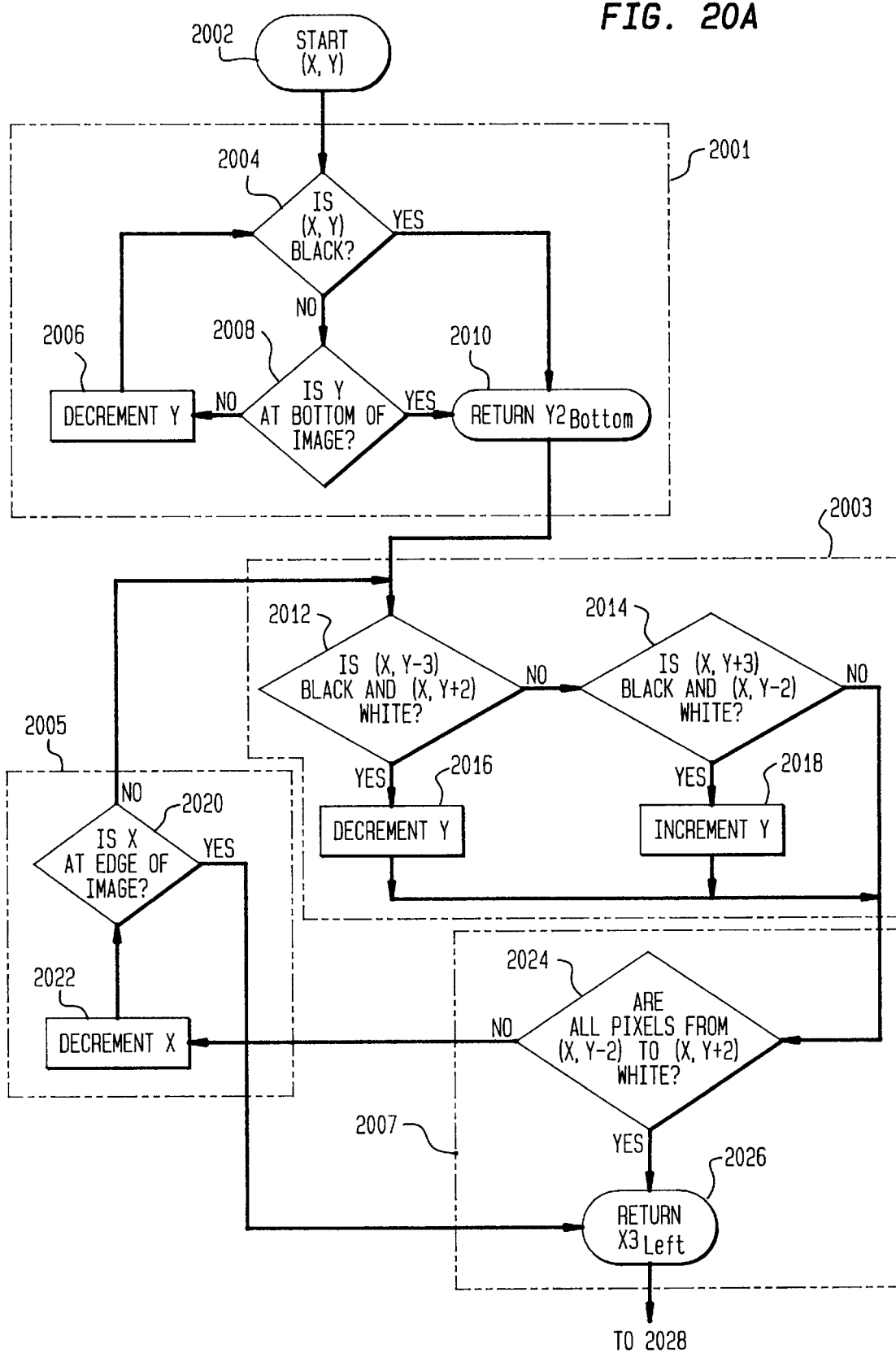
FIG. 20A and 20B are a flow chart of the functions performed by the checkbox bottom boundary locator of the present invention.
Figure 20B:
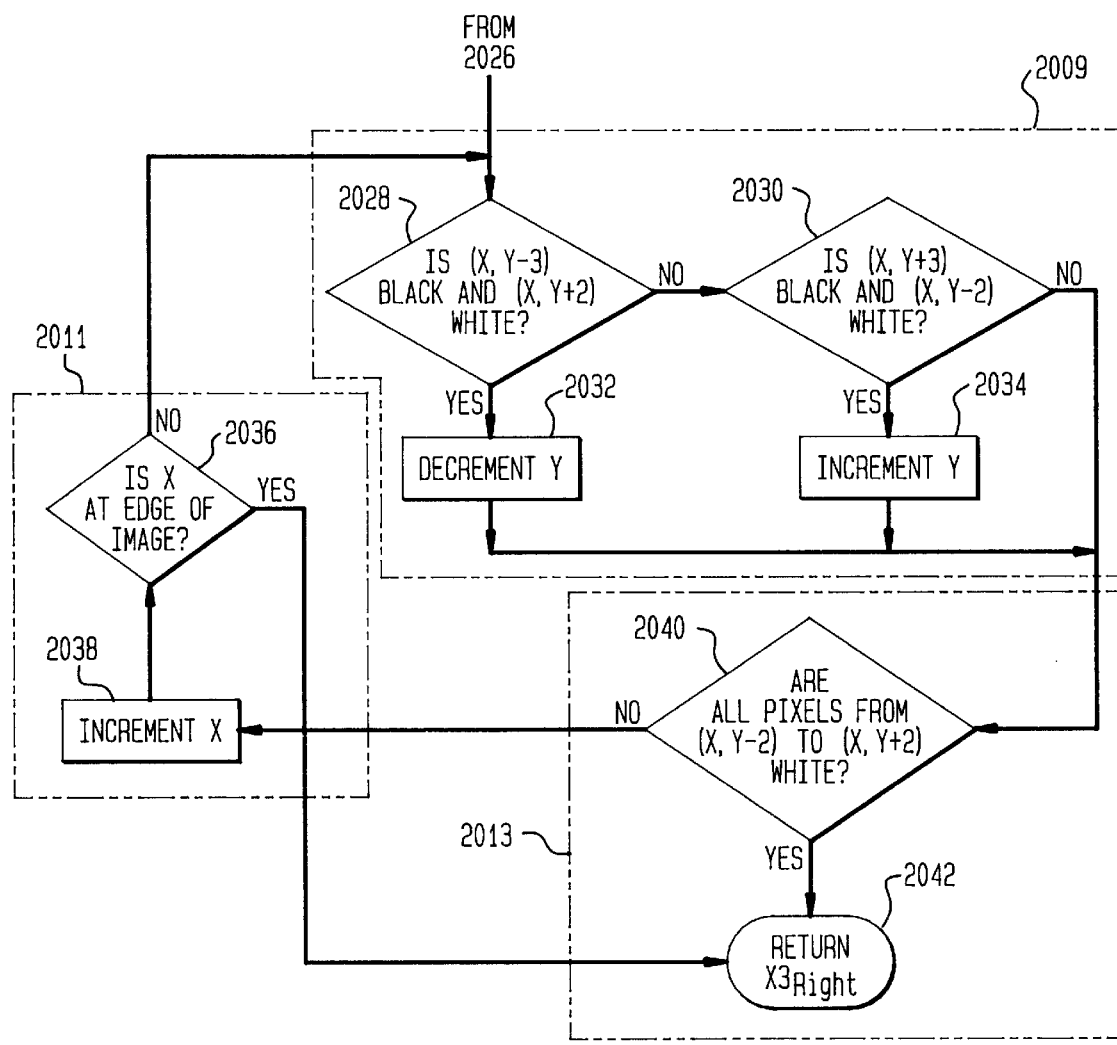
Figure 21A:
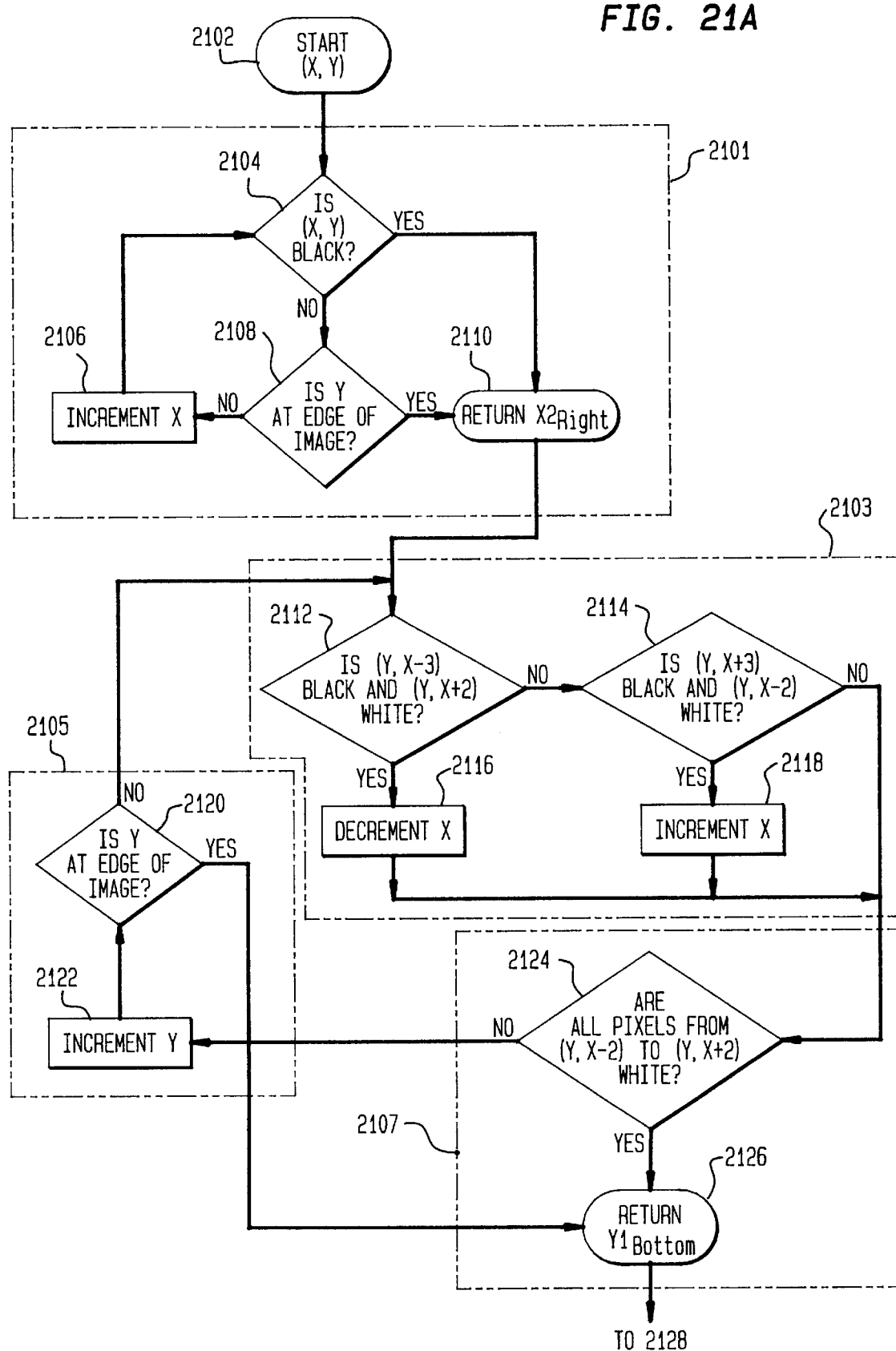
FIG. 21A and 21B are a flow chart of the functions performed by the checkbox right boundary locator of the present invention.
Figure 21B:
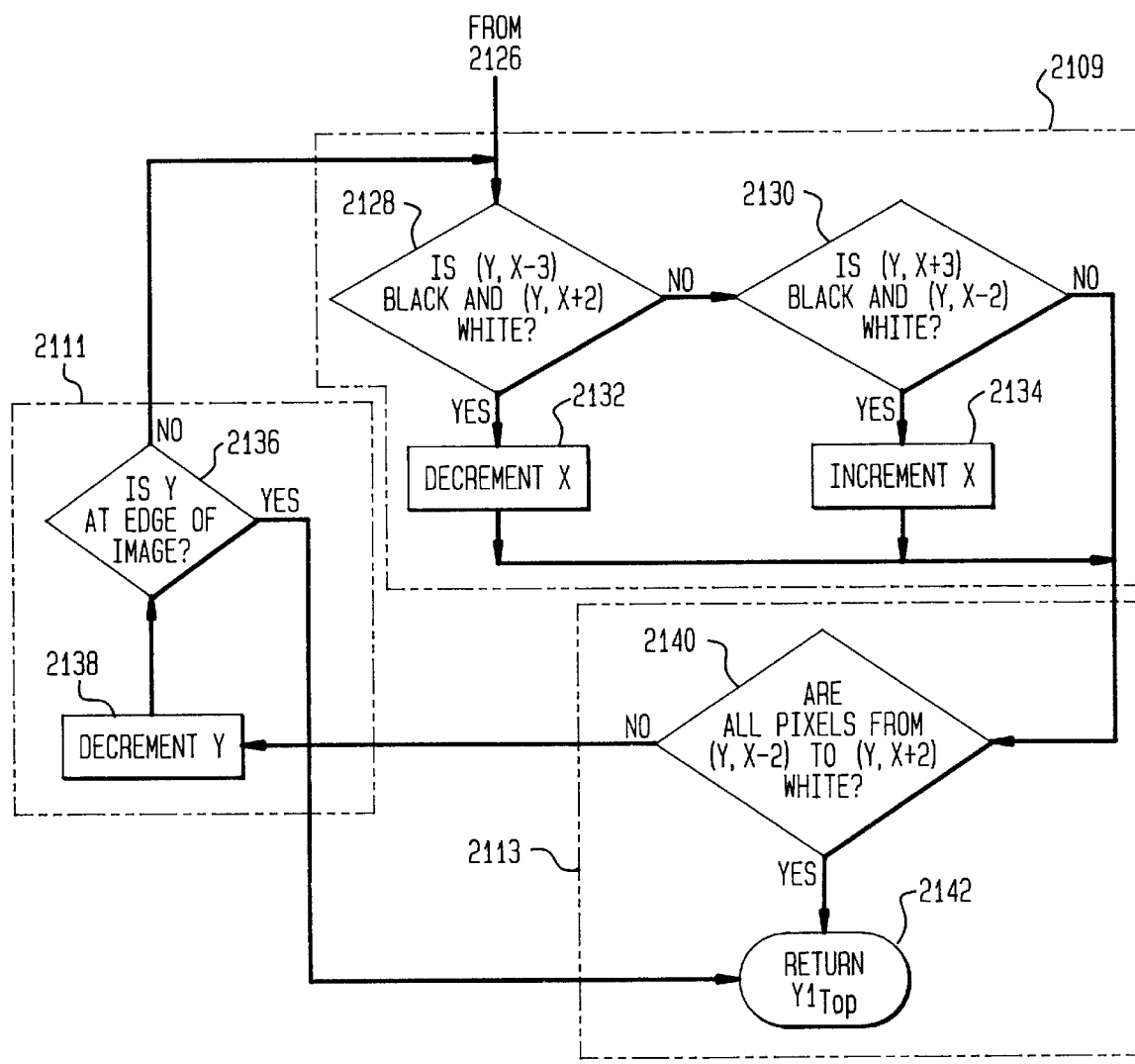
Figure 22A:
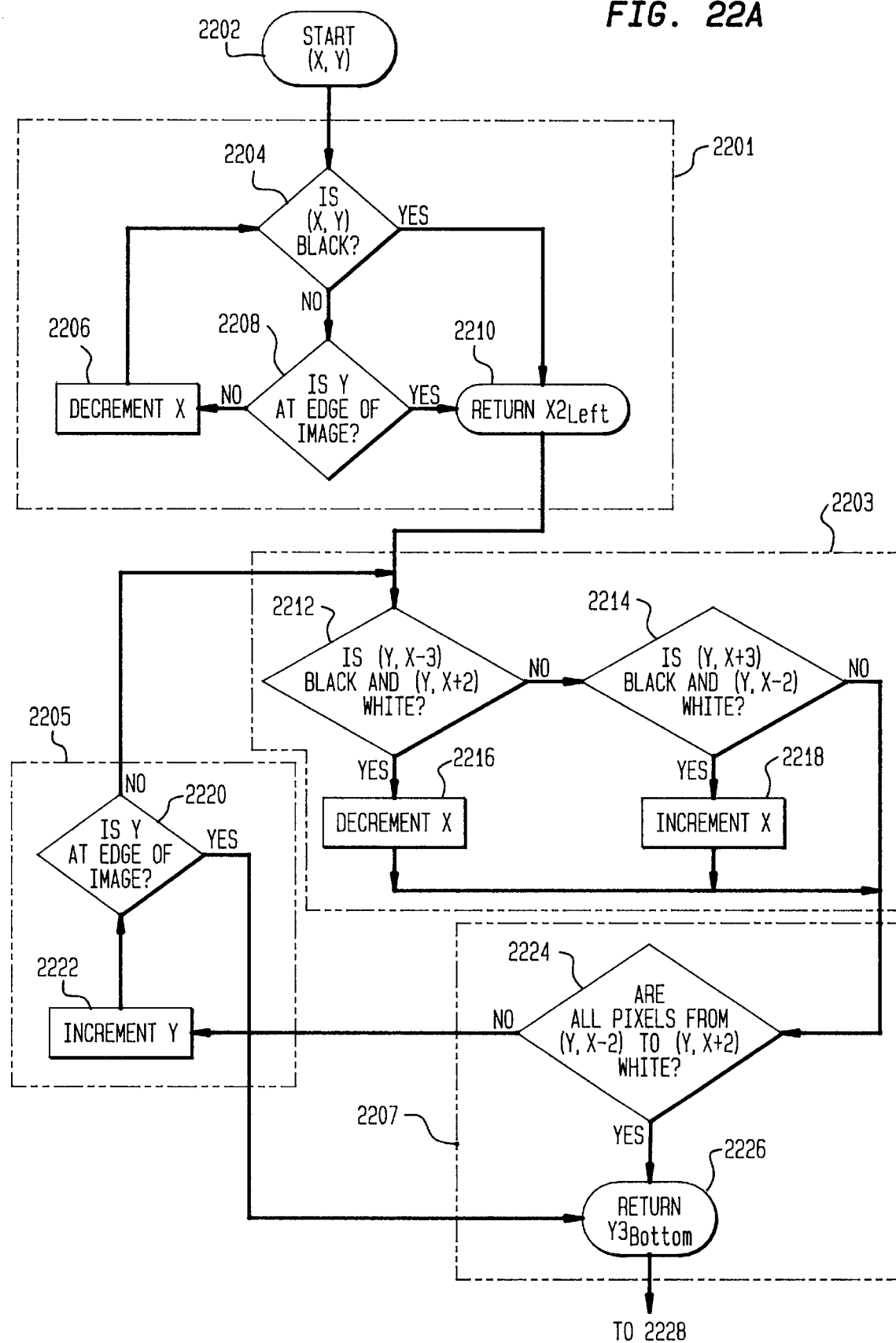
FIG. 22A and 22B are a flow chart of the functions performed by the checkbox left boundary locator of the present invention.
Figure 22B:
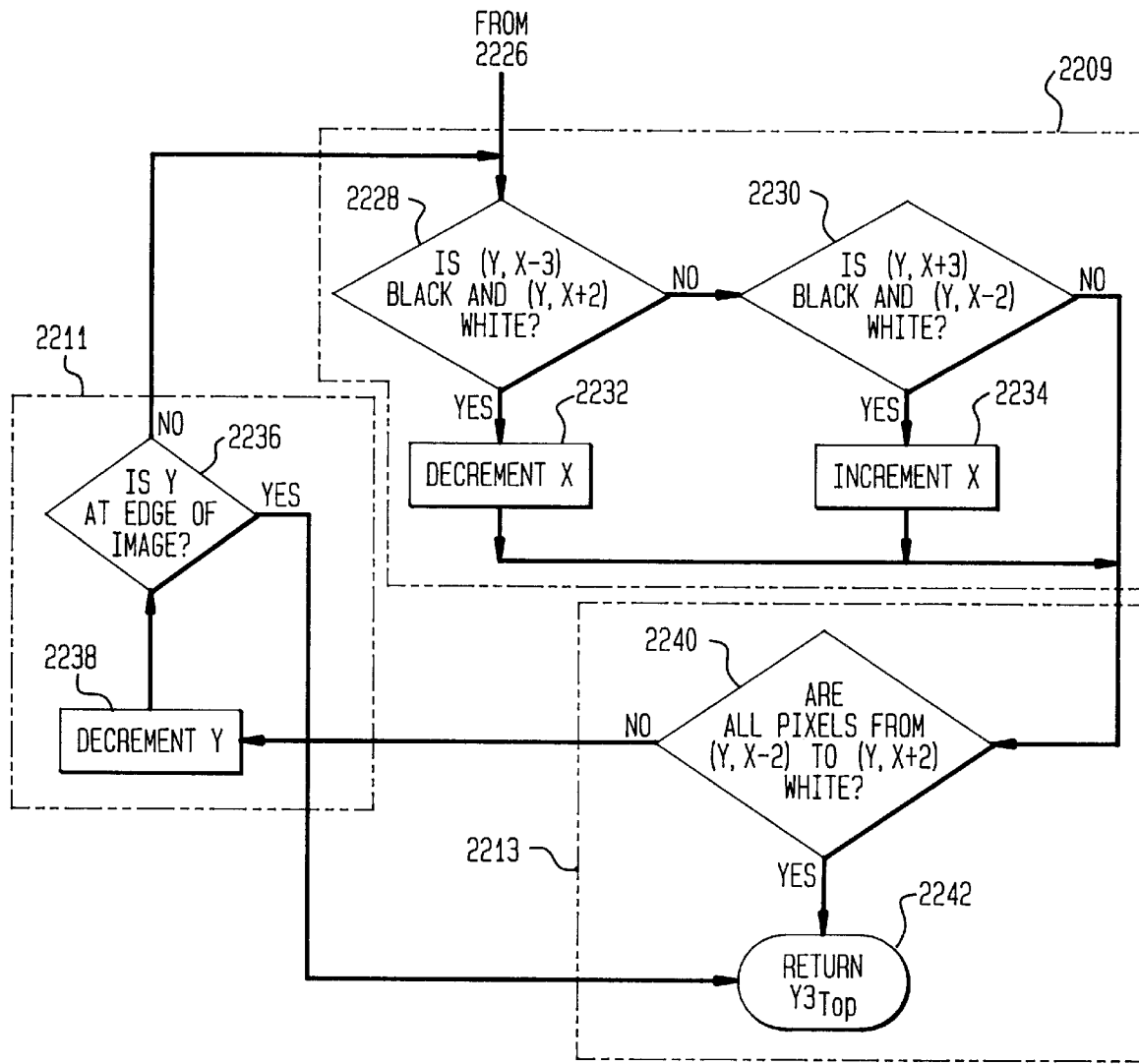

Referring to FIG. 18, when invoked at start box 1702, the textbox top boundary locator 421 receives the initial user-selected point coordinate (X,Y) and begins searching upward from that coordinate. At block 1704, the pixel is tested to determine if it is white. If so, then the top line has not been located and, at block 1706 the value of the Y coordinate is decremented, advancing the search upward by a single row. This process is repeated, until the maximum text field size, $Y_{Field}$, is exceeded at block 1708 or the edge of the image is reached at block 1710. Specifically, in block 1708, it is determined whether ($Y_{BL}-Y$) is less than $Y_{Field}$. As noted, $Y_{BL}$ is the first row at which the search down routine determined that the bottom line boundary existed. $Y_{Field}$ is the maximum height of the text field; 200 pixels in the preferred embodiment. The value ($Y_{BL}-Y$) is the distance that the current search coordinate is above the bottom line boundary. If this value is greater than the maximum height of the text field, then the current coordinate is returned at return block 1712.

When the top line is located in block 1704, processing proceeds to block 1714 wherein intermediate variables $X_{Follow}$ and $Y_{Follow}$ are set equal to the current value of the X and Y variables.

At block 1716 each pixel at ($X_{Follow}$, $Y_{Follow}$) is tested to determine if it is a black pixel. If not, processing continues at block 1718 to determine if the line has drifted. On the other hand, if the current (X,Y) coordinate indicates a candidate for the top line, or if the line has drifted, then processing continues at block 1720 wherein the $X_{Follow}$ coordinate is incremented, advancing the current coordinate right by a single column. If the line has not drifted as determined in block 1718, processing continues at block 1706.

At block 1722 it is determined whether the minimum number of contiguous horizontal black pixels that are considered to constitute a line, referred to as $X_{Line}$, has been reached. If the current distance from the original X coordinate at which the top line boundary was found ($X_{Follow}$–X) is not greater than $X_{Line}$, then the search continues right. On the other hand, if a sufficiently long top line boundary has been located, the (X,Y) coordinate is returned.

10. Checkbox Top Boundary Locator

The checkbox top boundary locator 428 locates a top obstruction above the user-selected coordinate. As noted, the locator 428 is preferably a subroutine, called by the Type 4 (checkbox) field identifier routine 404. When invoked, the locator 428 is provided with the current (X,Y) coordinate, representing the pixel at the user selected coordinate. The locator 428 returns the values $Y2_{Top}$, $X1_{Left}$, and $X1_{Right}$, representing the top line obstruction and its endpoints.

Referring to FIGS. 18A–18B and 19A–19B, the ckeckbox top boundary locator 428 includes a number of code segments, each performing a particular function as the locator 428 advances upward searching for a top line obstruction. The locator 428 includes a ckeckbox top obstruction identifier 488, skew detectors 488, endpoint determinators 490 and search advancers 494.

Generally, checkbox top obstruction identifier 488 performs the functions shown in block 1901 to locate the top line obstruction of the checkbox. Skew detectors 490 performs the functions shown in blocks 1903 and 1909 to track a skewed horizontal line as it drifts vertically. Endpoint determinators 492 performs the functions shown in blocks 1907 and 1913 to determine if the end of the line obstruction has been located. Search advancers 494 perform the functions shown in blocks 1905 and 1911 to advance the search leftward and right, respectively, to the edge of the image. The processing performed by each of these elements, preferably implemented as code segments, is described in detail below with reference to the flow chart of FIGS. 19A and 19B, and the diagrams of 18A and 18B.

Subroutine 1900 is invoked at start block 1902 with the receipt of an (X,Y) coordinate from a calling routine. The (X,Y) coordinate is the user-selected coordinate.

As noted, checkbox top obstruction identifier 488 performs the functions shown in block 1901 to locate the top line obstruction of the checkbox. At block 1904 locator 428 determines whether the current coordinate is at a black pixel. If so, then the checkbox top boundary locator 428 returns the current coordinate as the top boundary, $Y2_{Top}$, at return block 1910.

If at block 1904 it is determined that the current coordinate is not at a black pixel, then processing continues at block 1908 to determine whether the search has advanced to the top of the digital image. If so, then the current Y coordinate is returned at return block 1910. Otherwise, the value of the Y coordinate is decremented at block 1906 and the above procedure is repeated until the top boundary of the checkbox or the edge of the image is located.

Skew detectors 490 perform the functions shown in blocks 1903 and 1909 to track a skewed horizontal line as it drifts vertically. Code segment 490 determines whether the line is drifting and, if so, adjusts the search direction to follow the line in the direction in which it is drifting. Skew detectors 490 performs the similar functions to those performed by skew detector 430 described above.

Endpoint determinators 492 performs the functions shown in blocks 1907 and 1913 to determine if the end of the line obstruction has been located. The endpoint determinators determine whether all pixels in a five column row are white so as to consider the possibility of a drifting line. If so, then the endpoint is considered to be found and the endpoints $X1_{Left}$ and $X1_{Right}$, respectively, are returned (see FIG. 18B).

Search advancers 494 perform the steps shown in blocks 1905 and 1911 to advance the search left and right, respectively, across the digital image by decrementing and incrementing, respectively, the value of the X coordinate. If it is determined that the search has advanced to the edge of the image, then the search returns the (X,Y) coordinate as the endpoint $X1_{Left}$ and $X1_{Right}$, respectively. Otherwise, the above process is repeated.

Thus, the checkbox top boundary locator returns a total of three values, $Y2_{Top}$, $X1_{Left}$, and $X1_{Right}$.

11. Checkbox Bottom Boundary Locator

The checkbox bottom boundary locator 429 locates a bottom obstruction below the user-selected coordinate. As noted, the locator 429 is preferably a subroutine, called by the Type 4 (checkbox) field identifier routine 404. When invoked, the locator 429 is provided with the current (X,Y) coordinate, representing the pixel at the user selected coordinate. The locator 429 returns the values $Y2_{Bottom}$, $X3_{Left}$, and $X3_{Right}$, representing the bottom line obstruction and its endpoints.

Referring to FIGS. 18A–18B and 20A–20B, the ckeckbox bottom boundary locator 429 includes a number of code segments, each performing a particular function as the locator 429 advances downward searching for a bottom line obstruction. The locator 429 includes a ckeckbox bottom obstruction identifier 496, skew detectors 498, endpoint determinators 498 and search advancers 499.

Generally, checkbox bottom obstruction identifier 496 performs the functions shown in block 2001 to locate the bottom line obstruction of the checkbox. Skew detectors 498 perform the functions shown in blocks 2003 and 2009 to track a skewed horizontal line as it drifts vertically. Endpoint determinators 498 perform the functions shown in blocks 2007 and 2013 to determine if the end of the line obstruction has been located. Search advancers 499 perform the functions shown in blocks 2005 and 2011 to advance the search leftward and right, respectively, to the edge of the image. The processing performed by each of these elements is similar to the analogous code segment described above with reference to the checkbox top boundary locator 428, and is illustrated in FIGS. 20A–20B and 18A–18B.

12. Checkbox Right Boundary Locator

The checkbox right boundary locator 427 locates an vertical obstruction to the right of the user-selected coordinate and, based on the location of the obstruction, determines the right-side boundary of the checkbox field. As noted, the locator 427 is preferably a subroutine, called by the Type 4 text field identifier routine 404. When invoked, the locator 427 is provided with the coordinate (X,Y) of the user-selected click point. The locator 427 returns the values. The locator 427 returns the values $X2_{Left}$, $Y1_{Top}$, and $Y1_{Bottom}$, representing the right line obstruction and its endpoints.

Referring to FIGS. 18A–18B and 21A–21B, the ckeckbox right boundary locator 427 includes a number of code segments, each performing a particular function as the locator 427 advances right searching for a right line obstruction. The locator 427 includes a ckeckbox right obstruction identifier 480, skew detectors 482, endpoint determinators 484 and search advancers 486.

Generally, checkbox right obstruction identifier 480 performs the functions shown in block 2101 to locate the right line obstruction of the checkbox. Skew detectors 482 perform the functions shown in blocks 2103 and 2109 to track a skewed vertical line as it drifts horizontally. Endpoint determinators 484 perform the functions shown in blocks 2107 and 2113 to determine if the end of the line obstruction has been located. Search advancers 486 perform the functions shown in blocks 2105 and 2111 to advance the search downward and upward, respectively, to the edge of the image. The processing performed by each of these elements, preferably implemented as code segments, is described in detail below with reference to FIGS. 21A–21B and 18A–18B.

Subroutine 2100 is invoked at start block 2102 with the receipt of an (X,Y) user-selected coordinate from a calling routine. As noted, checkbox right obstruction identifier 480 performs the functions shown in block 2101 to locate the right line obstruction of the checkbox. At block 2104 locator 427 determines whether the current coordinate is at a black pixel. If so, then the checkbox right boundary locator 427 returns the current coordinate as the right boundary, $X2_{Right}$, at return block 2110.

If at block 2104 it is determined that the current coordinate is not at a black pixel, then processing continues at block 2108 to determine whether the search has advanced to the right of the digital image. If so, then the current X coordinate is returned at return block 2110. Otherwise, the value of the X coordinate is incremented at block 2106 and the above procedure is repeated until the right boundary of the checkbox or the edge of the image is located.

Skew detectors 482 perform the functions shown in blocks 2103 and 2109 to track a skewed vertical line as it drifts horizontally. Code segment 482 determines whether the line is drifting and, if so, adjusts the search direction to follow the line in the direction in which it is drifting. Skew detectors 482 performs the similar functions to those performed by skew detector 430 described above.

Endpoint determinators 4842 perform the functions shown in blocks 2107 and 2113 to determine if the end of the line obstruction has been located. The endpoint determinators determine whether all pixels in a five row column are white so as to consider the possibility of a drifting line. If so, then the endpoint is considered to be found and the endpoints $Y3_{Top}$ and $Y3_{Bottom}$, respectively, are returned (see FIG. 18B).

Search advancers 486 perform the steps shown in blocks 2105 and 2111 to advance the search down and up, respectively, across the digital image by decrementing and incrementing, respectively, the value of the X coordinate. If it is determined that the search has advanced to the edge of the image, then the search returns the (X,Y) coordinate as the endpoint $Y3_{Top}$ and $Y3_{Bottom}$, respectively. Otherwise, the above process is repeated.

Thus, the checkbox right boundary locator returns a total of three values, $X2_{Right}$, $Y3_{Top}$ and $Y3_{Bottom}$.

13. Checkbox Left Boundary Locator

The checkbox left boundary locator 426 locates an vertical obstruction to the left of the user-selected coordinate and, based on the location of the obstruction, determines the left-side boundary of the checkbox field. As noted, the locator 426 is preferably a subroutine, called by the Type 4 text field identifier routine 404. When invoked, the locator 426 is provided with the coordinate (X,Y) of the user-selected click point. The locator 426 returns the values. The locator 426 returns the values $X2_{Left}$, $Y1_{Top}$, and $Y1_{Bottom}$, representing the left line obstruction and its endpoints.

Referring to FIGS. 18A–18B and 22A–22B, the ckeckbox left boundary locator 426 includes a number of code segments, each performing a particular function as the locator 426 advances leftward searching for a left line obstruction. The locator 426 includes a ckeckbox left obstruction identifier 472, skew detectors 474, endpoint determinators 476 and search advancers 478.

Generally, checkbox left obstruction identifier 472 performs the functions shown in block 2101 to locate the left line obstruction of the checkbox. Skew detectors 474 perform the functions shown in blocks 2203 and 2209 to track a skewed vertical line as it drifts horizontally. Endpoint determinators 476 perform the functions shown in blocks 2207 and 2213 to determine if the end of the line obstruction has been located. Search advancers 478 perform the functions shown in blocks 2205 and 2211 to advance the search downward and upward, respectively, to the edge of the image. The processing performed by each of these elements, preferably implemented as code segments, is similar to those of the analogous code segments described above with reference to the checkbox right boundary locator 427, and are illustrated in FIGS. 22A–22B and 18A–18B.

E. SUMMARY

The graphics system 126 preferably represents one or more computer programs which reside (during run-time) in the main memory 104, and which are executed by the processors in the computer system 102, such as processor 204. The graphics system may be stored in the main memory 104, and/or the secondary memory 110. Also, the computer programs/libraries associated with the graphics system 126 may be stored in a floppy disk or some other removable storage medium, which is read by a floppy drive or some other storage unit. The graphics system may also be connected to a network. In this case, the source document will be retrieved from storage devices in communication with the computer system 100 via the network.

As noted, in the preferred embodiment of the present invention, the high level function are implemented as routines and the low level functions are implemented as software subroutines invoked by the routines. However, it should be understood that embodiments of the present invention can be implemented in hardware, software or a combination thereof. In such embodiments, the various routines, subroutines, and code elements, or the steps they perform would be implemented in hardware and/or software to perform the functions of the present invention.

The present invention may be implemented in an standardized software program stored in any type of computer-readable medium. Any presently available or future developed computer software language can be employed in such embodiments of the present invention. Furthermore, the present invention may be implemented in dedicated circuits of conventional design with those skilled in the art. Any presently available or future developed circuitry can be employed in such embodiments of the present invention.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An interactive graphics system for precisely locating a boundary of a user-selected field on a digitized form, comprising:

input means for receiving information pertaining to the user-selected text field on the digitized form; and boundary locator means, coupled to said input means, for determining the boundary of the user-selected field based upon said information on the digitized form, wherein said boundary locator means comprises:

one or more field identifiers, each associated with a specific type of field; and one or more locators, each configured to identify a particular portion of a field boundary:

wherein each of said one or more field identifiers implements one or more of said one or more locators to determine the boundary of the user-selected field.

2. The graphics system of claim 1, wherein said information comprises:

a user-selected coordinate of a point within the selected field; and a field type of said selected field.

3. The graphics system of claim 1, further comprising a search array adapted to contain a plurality of pixel values, wherein one or more of said locators utilize said search array to identify obstructions.

4. The graphics system of claim 1, wherein at least one of said one or more locators follows a text entry line, wherein said one or more locators searches an area of pixels around gaps in said text entry line for a continuation of said text entry line, and, when said text entry line continuation is located, recursively calling itself to identify text entry line discontinuities.

5. The graphics system of claim 4, wherein said plurality of field identifiers comprises:

a first field identifier for determining a text field boundary when an associated label is above the text entry line;

a second field identifier for determining a text field boundary when an associated label is below the text entry line; and a third field identifier for determining a text field boundary when an text entry line is part of a box and the associated label is located within that box.

6. The graphics system of claim 5, wherein said boundary locator means comprises:

a bottom line boundary locator configured to search downward from said user-selected text field for a substantially horizontal text entry line, wherein said bottom line boundary locator is implemented by said first, second, and third text field identifiers.

7. The graphics system of claim 5, wherein each said one or more locators comprises:

an above text entry line left boundary locator configured to locate an obstruction to the left of the column containing the user-selected coordinate above the text entry line and, based on the location of the obstruction, determines the left-side boundary of the text field, wherein said above text entry line left boundary locator is implemented by said first and third text field identifiers.

8. The graphics system of claim 5, wherein said one or more field identifiers further comprises:

a fourth field identifier for determining a checkbox text field boundary.

9. The graphics system of claim 1, wherein said one or more field identifiers are individually selectable in accordance with a user-identified field type.

10. The graphics system of claim 1, wherein said one or more locators comprises:

an above text entry line right boundary locator configured to locate an obstruction to the right of the column containing the user-selected coordinate above the text entry line and, based on the location of the obstruction, determines the right-side boundary of the text field, wherein said above text entry line right boundary locator is implemented by said first and third text field identifiers.

11. The graphics system of claim 1, wherein said one or more boundary locators comprises:

a top boundary locator configured to search upward from the row containing the bottom line boundary for an obstruction in the form of either a horizontal line or text, wherein said top boundary locator is implemented by said first, second and third text field identifiers.

12. The graphics system of claim 1, wherein said one or more boundary locators comprises:

a below text entry line left boundary locator for locating an obstruction to the left of the user-selected coordinate below the text entry line and, based on the location of the obstruction, determines the left-side boundary of the text field, wherein said below text entry line left boundary locator is implemented by said first, second and third text field identifiers.

13. The graphics system of claim 1, wherein said one or more boundary locators comprises:

a below text entry line right boundary locator for locating an obstruction to the right of the user-selected coordinate below the text entry line and, based on the location of the obstruction, determines the right-side boundary of the text field, wherein said below text entry line right boundary locator is implemented by said first, second and third text field identifiers.

14. The graphics system of claim 1, further comprising:

a line gap identifier for distinguishing a gap in a line from the actual termination of the line, said left line gap identifier is implemented by said boundary locator means.

15. The graphics system of claim 1, wherein said one or more boundary locators implement a search array of pixels values when searching for obstructions thereby enabling said one or more boundary locators to consider many pixel values when searching for an obstruction.

16. The graphics system of claim 1, wherein one or more of said one or more boundary locators recursively calls itself while tracking said text entry line to avoid misinterpreting a break in a character or line as the end of the character or line.

17. The graphics system of claim 1, wherein said one or more boundary locators comprises:

a checkbox top boundary locator for locating a top obstruction above the row containing the user-selected coordinate, wherein said checkbox top boundary locator is implemented by said fourth text field identifier.

18. The graphics system of claim 1, wherein said one or more boundary locators comprises:

one or more checkbox boundary locators for locating obstructions in the vicinity of the user-selected coordinate and, based on the location of the obstruction, determines the boundary of the checkbox text field, wherein said checkbox right boundary locator is implemented by said fourth text field identifier.

19. A system comprising:

a processor;

memory means, coupled to said processor, for storing a digital image of a form, said form having one or more fields into which a user is to enter information; and a graphics system configured to precisely determine a boundary of a user-selected field of said one or more fields, including, input means for receiving user-supplied information pertaining to the selected text field for the stored digital image, and means for determining the boundary of said user-selected field based upon said user-supplied information of the stored digital image, wherein said determination means comprises:

one or more field identifiers, each associated with a specific type of field; and one or more locators, each configured to identify a particular portion of a field boundary:

wherein each of said one or more field identifiers implements one or more of said one or more locators to determine the boundary of the user-selected field.

20. The system of claim 19, wherein said information comprises:

a coordinate of a user-selected point within said selected field; and a field type value of said selected field.

21. The system of claim 20, wherein said determination means comprises:

a plurality of boundary locator means, each configured to identify a particular portion of a field boundary, said boundary locator means selectively performed to determine the boundary of the selected field in accordance with said field type.

22. The system of claim 21, further comprising a search array adapted to contain a plurality of pixel values, wherein one or more of said plurality of boundary locators utilizes said search array to identify obstructions.

23. The system of claim 21, wherein at least one of said plurality of boundary locators follows a text entry line, wherein said at least one of said boundary locators searches an area of pixels around text entry line gaps for a continuation of said text entry line, and, when said text entry line continuation is located, recursively calling itself to identify text entry line discontinuities.

24. The system of claim 20, further comprising:

a first field identifier for determining a text field boundary when an associated label is above the text entry line;

a second field identifier for determining a text field boundary when an associated label is below the text entry line; and a third field identifier for determining a text field boundary when an text entry line is part of a box and the associated label is located within that box.

25. The system of claim 19, further comprising:

an input means for receiving said digitized image of a form.

26. A method for precisely determining a boundary of a user-selected field on said digitized form, comprising the steps of:

a) receiving information pertaining to the selected text field of the digitized form; and b) determining the boundary of the selected field based upon said information, wherein said determining step comprises the steps of:

associating one or more field identifiers with a specific type of field; and configuring one or more locators to identify a particular portion of a field boundary:

wherein each of said one or more field identifiers implements one or more of said one or more locators to determine the boundary of the user-selected field.

27. The method of claim 26, further comprising the step of:

c) selectively performing one or more of a plurality of boundary locators to identify a particular portion of the field boundary in accordance with said field type.

28. The method of claim 27, wherein said step c) comprises the steps of:

1) following a text entry line, 2) searching an area of pixels around gaps in said text entry line for a continuation of said text entry line; and 3) when said text entry line continuation is located, recursively repeating said steps 1) and 2) to identify text entry line discontinuities.

29. The method of claim 26, further comprising the steps of:

(c) searching downward from a user-selected coordinate for a substantially horizontal text entry line, said substantially horizontal text entry line forming a bottom line boundary;

(d) searching for a left obstruction to the left of the column containing said user-selected coordinate above said text entry line and creating a left-side boundary of said field based upon said left obstruction;

(e) searching for a right obstruction to the right of the column containing the user-selected coordinate above the text entry line and creating a right-side boundary of the text field based upon said right obstruction; and (f) searching upward from a row containing said bottom line boundary for a top obstruction.

30. The method of claim 26, further comprising the steps of:

(c) searching downward from a user-selected coordinate for a substantially horizontal text entry line, said substantially horizontal text entry line forming a bottom line boundary;

(d) searching for a left obstruction left of said user-selected coordinate below said text entry line and, based on a location of said obstruction, determining a left-side boundary of said text field;

(e) searching for a right obstruction right of said user-selected coordinate below said text entry line and, based on a location of said obstruction, determines a right-side boundary of the text field; and (f) searching upward from a row containing said bottom line boundary for a top obstruction.

31. The method of claim 26, further comprising the steps of:

(c) searching downward from a user-selected coordinate for a substantially horizontal text entry line, said substantially horizontal text entry line forming a bottom line boundary;

(d) creating a left-side boundary of said field;

(e) creating a right-side boundary of said field; and (f) searching upward from a row containing said bottom line boundary for a top obstruction.

32. The method of claim 31, wherein said step (d) comprises the steps of:

(1) searching for an upper left obstruction left of a column containing said user-selected coordinate above said text entry line and creating a first left-side boundary of said field based upon said obstruction;

(2) searching for a lower left obstruction left of said user-selected coordinate below said text entry line and, based on a location of said obstruction, determining a second left-side boundary of said field; and (3) selecting one of said first and second left-side boundary, said selected left-side boundary being closest to said user-selected coordinate.

33. The method of claim 31, wherein said step (e) comprises the steps of:

(1) searching for an upper right obstruction right of a column containing said user-selected coordinate above said text entry line and creating a first right-side boundary of said field based upon said obstruction;

(2) searching for a lower right obstruction right of said user-selected coordinate below said text entry line and, based on a location of said obstruction, determining a second right-side boundary of said field; and (3) selecting one of said first and second right-side boundary, said selected right-side boundary being closest to said user-selected coordinate.

34. A computer medium having computer readable program code embodied thereon for causing a computer system having a processor, an output device, an input device and a memory, to precisely determine a boundary of a user-selected field on a form, the digitized embodiment of which is stored in the memory, the computer medium performing the steps of:

a) receiving user-provided information pertaining to a user-selected field on the digitized form; and b) determining the boundary of the selected field of the digitized form based upon said user-provided information, wherein said determining step comprises the steps of:

associating one or more field identifiers with a specific type of field: and configuring one or more locators to identify a particular portion of a field boundary;

wherein each of said one or more field identifiers implements one or more of said one or more locators to determine the boundary of the user-selected field.

35. The computer medium of claim 34, further comprising the step of:

c) selectively performing one or more of a plurality of boundary locators to identify a particular portion of the field boundary in accordance with said user-provided information.

36. The computer medium of claim 35, wherein said step c) comprises the steps of:

1) following a text entry line;

2) searching an area of pixels around gaps in said text entry line for a continuation of said text entry line; and 3) when said text entry line continuation is located, recursively repeating said steps 1) and 2) to identify text entry line discontinuities.

* * * * *